Aug. 1, 1961 H. P. LUHN ET AL 2,994,429

ELECTRONIC SEARCHING SELECTOR

Filed Aug. 30, 1955 46 Sheets-Sheet 1

*INVENTORS*

HANS P. LUHN, EDWARD S. WILSON
DONALD P. BERG, WILLIAM S. DUSTMAN
WILLIAM L. STAHL

BY *Joe L. Koerber*

ATTORNEY

Aug. 1, 1961 H. P. LUHN ET AL 2,994,429

ELECTRONIC SEARCHING SELECTOR

Filed Aug. 30, 1955 46 Sheets-Sheet 2

Aug. 1, 1961 H. P. LUHN ET AL 2,994,429

ELECTRONIC SEARCHING SELECTOR

Filed Aug. 30, 1955 46 Sheets-Sheet 3

*INVENTORS*
HANS P. LUHN, EDWARD S. WILSON,
DONALD P. BERG, WILLIAM S. DUSTMAN,
WILLIAM L. STAHL

BY Joe L. Koerber

ATTORNEY

Aug. 1, 1961

H. P. LUHN ET AL 2,994,429

ELECTRONIC SEARCHING SELECTOR

Filed Aug. 30, 1955

46 Sheets-Sheet 4

Aug. 1, 1961 H. P. LUHN ET AL 2,994,429

ELECTRONIC SEARCHING SELECTOR

Filed Aug. 30, 1955 46 Sheets-Sheet 5

INVENTORS
HANS P. LUHN, EDWARD S. WILSON
DONALD P. BERG, WILLIAM S. DUSTMAN
WILLIAM L. STAHL

BY Joe L. Koerber

ATTORNEY

ELECTRONIC SEARCHING SELECTOR

Filed Aug. 30, 1955

46 Sheets-Sheet 6

INVENTORS
HANS P. LUHN
EDWARD S. WILSON, DONALD P. BERG
WILLIAM S. DUSTMAN, WILLIAM L. STAHL
BY Joe L. Koerber
ATTORNEY INVENTORS
HANS P. LUHN, EDWARD S. WILSON,
DONALD P. BERG, WILLIAM S. DUSTMAN,
WILLIAM L. STAHL
BY Joe L. Koerber
ATTORNEY INVENTORS
HANS P. LUHN, EDWARD S. WILSON,
DONALD P. BERG, WILLIAM S. DUSTMAN,
WILLIAM L. STAHL BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 9

*INVENTORS*
HANS P. LUHN, EDWARD S WILSON
DONALD P. BERG, WILLIAM S. DUSTMAN
WILLIAM L. STAHL
BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 12

INVENTORS
HANS P. LUHN, EDWARD S. WILSON,
DONALD P. BERG, WILLIAM S. DUSTMAN,
WILLIAM L. STAHL
BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 15

INVENTORS
HANS P. LUHN, EDWARD S. WILSON,
DONALD P. BERG, WILLIAM S. DUSTMAN,
WILLIAM L. STAHL

BY *Joe L. Koerber*

ATTORNEY

INVENTORS
HANS P. LUHN, EDWARD S. WILSON
DONALD P. BERG, WILLIAM S. DUSTMAN
WILLIAM L. STAHL
BY Joe L. Koerber
ATTORNEY

*INVENTORS*
HANS P. LUHN, EDWARD S. WILSON,
DONALD P. BERG, WILLIAM S. DUSTMAN
WILLIAM L. STAHL
BY Joe L. Koerber
ATTORNEY INVENTORS
HANS P. LUHN, EDWARD S. WILSON,
DONALD P. BERG, WILLIAM S. DUSTMAN,
WILLIAM L. STAHL
BY Joe L. Koerber
ATTORNEY INVENTORS
HANS P. LUHN, EDWARD S. WILSON,
DONALD P. BERG, WILLIAM S. DUSTMAN,
WILLIAM L. STAHL
BY Joe L. Koerber
ATTORNEY

*INVENTORS*
HANS P. LUHN, EDWARD S. WILSON,
DONALD P. BERG, WILLIAM S. DUSTMAN,
WILLIAM L. STAHL

BY Joe L. Koerber

ATTORNEY

INVENTORS
HANS P. LUHN, EDWARD S. WILSON,
DONALD P. BERG, WILLIAM S. DUSTMAN
WILLIAM L. STAHL
BY Joe L. Koerber
ATTORNEY

*INVENTORS*
HANS P. LUHN, EDWARD S. WILSON
DONALD P. BERG, WILLIAM S. DUSTMAN
WILLIAM L. STAHL
BY Joe L. Koerber
ATTORNEY INVENTORS
HANS P. LUHN, EDWARD S. WILSON,
DONALD P. BERG, WILLIAM S. DUSTMAN,
WILLIAM L. STAHL
BY Joe L. Koerber
ATTORNEY INVENTORS
HANS P. LUHN, EDWARD S. WILSON,
DONALD P. BERG, WILLIAM S. DUSTMAN
WILLIAM L. STAHL
BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 27

INVENTORS
HANS P. LUHN, EDWARD S. WILSON,
DONALD P. BERG, WILLIAM S. DUSTMAN,
WILLIAM L. STAHL

BY Joe L. Koerber

ATTORNEY

*INVENTORS*
HANS P. LUHN, EDWARD. S. WILSON,
DONALD P. BERG, WILLIAM S. DUSTMAN,
WILLIAM L. STAHL
BY *Joe L. Koerber*
ATTORNEY Aug. 1, 1961 H. P. LUHN ET AL 2,994,429
ELECTRONIC SEARCHING SELECTOR
Filed Aug. 30, 1955 46 Sheets-Sheet 29

INVENTORS
HANS P. LUHN, EDWARD S. WILSON,
DONALD P. BERG, WILLIAM S. DUSTMAN,
WILLIAM L. STAHL
BY Joe L. Koerber
ATTORNEY

PHOTO SENSING UNIT

Aug. 1, 1961 H. P. LUHN ET AL 2,994,429

ELECTRONIC SEARCHING SELECTOR

Filed Aug. 30, 1955 46 Sheets-Sheet 32

Aug. 1, 1961

H. P. LUHN ET AL 2,994,429

ELECTRONIC SEARCHING SELECTOR

Filed Aug. 30, 1955

46 Sheets-Sheet 33

INVENTORS
HANS P. LUHN, EDWARD S WILSON,
DONALD P. BERG, WILLIAM S. DUSTMAN,
WILLIAM L. STAHL

BY Joe L. Koerber

ATTORNEY

INVENTORS
HANS P. LUHN, EDWARD S. WILSON,
DONALD P. BERG, WILLIAM S. DUSTMAN
WILLIAM L. STAHL
BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 38

INVENTORS
HANS P. LUHN, EDWARD S. WILSON,
DONALD P. BERG, WILLIAM S. DUSTMAN
WILLIAM L. STAHL.

BY Joe L. Koerber

ATTORNEY

INVENTORS
HANS P. LUHN, EDWARD S. WILSON,
DONALD P. BERG, WILLIAM S. DUSTMAN,
WILLIAM L. STAHL

BY Joe L. Koerber

ATTORNEY

Aug. 1, 1961 H. P. LUHN ET AL 2,994,429

ELECTRONIC SEARCHING SELECTOR

Filed Aug. 30, 1955

46 Sheets-Sheet 41

Aug. 1, 1961 H. P. LUHN ET AL 2,994,429

ELECTRONIC SEARCHING SELECTOR

Filed Aug. 30, 1955 46 Sheets-Sheet 43

Aug. 1, 1961 H. P. LUHN ET AL 2,994,429

ELECTRONIC SEARCHING SELECTOR

Filed Aug. 30, 1955 46 Sheets-Sheet 44

INVENTORS
HANS P. LUHN, EDWARD S. WILSON
DONALD P. BERG, WILLIAM S. DUSTMAN
WILLIAM L. STAHL
BY Joe L. Koerber
ATTORNEY Aug. 1, 1961 H. P. LUHN ET AL 2,994,429

ELECTRONIC SEARCHING SELECTOR

Filed Aug. 30, 1955 46 Sheets-Sheet 46

INVENTORS
HANS P. LUHN, EDWARD S. WILSON,
DONALD P. BERG, WILLIAM S. DUSTMAN,
WILLIAM L. STAHL

BY Joe L. Koerber

ATTORNEY

United States Patent Office 2,994,429

Patented Aug. 1, 1961

2,994,429

ELECTRONIC SEARCHING SELECTOR

Hans P. Luhn, Armonk, Edward S. Wilson, Poughkeepsie, and William L. Stahl, Fishkill, N.Y., and Donald P. Berg, Shaker Heights, and William S. Dustman, Cleveland, Ohio, assignors to International Business Machines Corporation, New York, N.Y., a corporation of New York Filed Aug. 30, 1955, Ser. No. 531,419

38 Claims. (Cl. 209—111.5)

This invention relates to a data searching machine wherein data bearing records are serially scanned and compared with other data and records containing matching data are selected.

This machine comprises a record processing unit and a logical unit. The record processing unit is for physically handling the records whereby each record may be scanned, and for operating upon the records in accordance with the results of scanning and comparing data. The operation as described herein consists of physically separating matching records from non-matching records. If the records are in the form of tapes or drums, means may be provided for reproducing the matching data therefrom into a more convenient form such as a record card or a tape containing only matching data. It will be understood that the form of the record handling unit is only exemplary and it is desired to limit the invention only as indicated hereinafter in the claims.

The logical unit of this machine must be capable of comparing each character of the record with each character of question data. It must be capable of recognizing whether a series of such characters spell out given words and whether those words appear in a prescribed sequence and under prescribed conditions. If a match occurs between the scanned data and the question data fulfilling all conditions, the affected cards or cards must be selected. In certain instances, it might be desirable to take statistical counts of matches of a variety of combinations other than that set up for selection. Such counts may be taken by unit counters, one for each class of combinations.

Prior art discloses record scanning and selecting devices wherein the comparison of recorded data with question data is accomplished by superimposing the record card upon the question card which is punched in a complementary fashion so that a blackout condition exists when matching data is compared with the question card. One shortcoming in that type of comparison is that the comparison of a bit of data is not complete until the part of the compared record containing the bit of data has completely traversed the question card. In the present invention each character of a record, when sensed at the scanning station, is simultaneously compared with each bit of question data.

The principal object of the invention is to provide an improved scanning machine for serially comparing recorded data with selected question data and for selecting matching data records.

Another object of the invention is to provide an improved scanning machine having light responsive means for scanning data bearing records, for detecting a favorable comparison between the scanned data and selected question data, and to isolate matching data records from non-matching data records.

A further object of the invention is to provide a scanning device whereby each bit of record data as it is scanned, is simultaneously compared with all bits of a question data.

Still another object of the invention is to provide a scanning device for searching for the presence of a plurality of selected data representations in a specified sequence or in random sequence selectively.

Yet another object of the invention is to provide a scanning device for searching for the presence of two or more selected data representations alternatively.

Another object of the invention is to provide a scanning device for searching for the presence of one or more selected data representations and the concurrent absence of one or more additional selected data representations.

A further object of the invention is to provide a scanning machine wherein the scanning of a record is performed in a column-by-column fashion for serial comparison with selected question data.

Another object of the invention is to provide transit storage means for data records after scanning whereby the decision to select or reject a record may be delayed for some time after scanning.

A further object of the invention is to provide a scanning machine which is adapted for detecting the presence of correlated data which are distributed over a plurality of records that may be either successive records or may be separated by one or more records and for selecting the related records as a group.

Yet another object of the invention is to provide a scanning machine having means for sensing records arranged in a predetermined sequence and for detecting any variation from the predetermined sequence.

Another object of the invention is to provide a scanning machine having means for scanning records marked in a variable number element code and converting the scanned data to a fixed number element code that may be more readily compared with question data set up in accordance with the latter code.

Another object of the invention is to provide means for taking statistical counts of the occurrences of various data combinations.

Still another object of this invention is to provide means for stacking transient records selectively in response to control signals.

Another object of the invention is to provide an electrical storage unit adapted for facilitating the delayed selection of groups of records containing data that compare favorably with selected question data.

Other objects of the invention will be pointed out in the following descriptions and claims and illustrated in the accompanying drawings, which disclose, by way of example, the principle of the invention and the best mode, which has been contemplated, of applying that principle.

FIGS. 28*a*–39*a* and FIG. 83*a* are schematic diagrams of various cathode follower units, FIGS. 28*b*–39*b* and 83*b* being the respective block diagrams thereof.

Figures 39A, 39B, 40A, 40B, 41A, 41B, 42A, 42B, 43A, 43B, 44A, 44B:
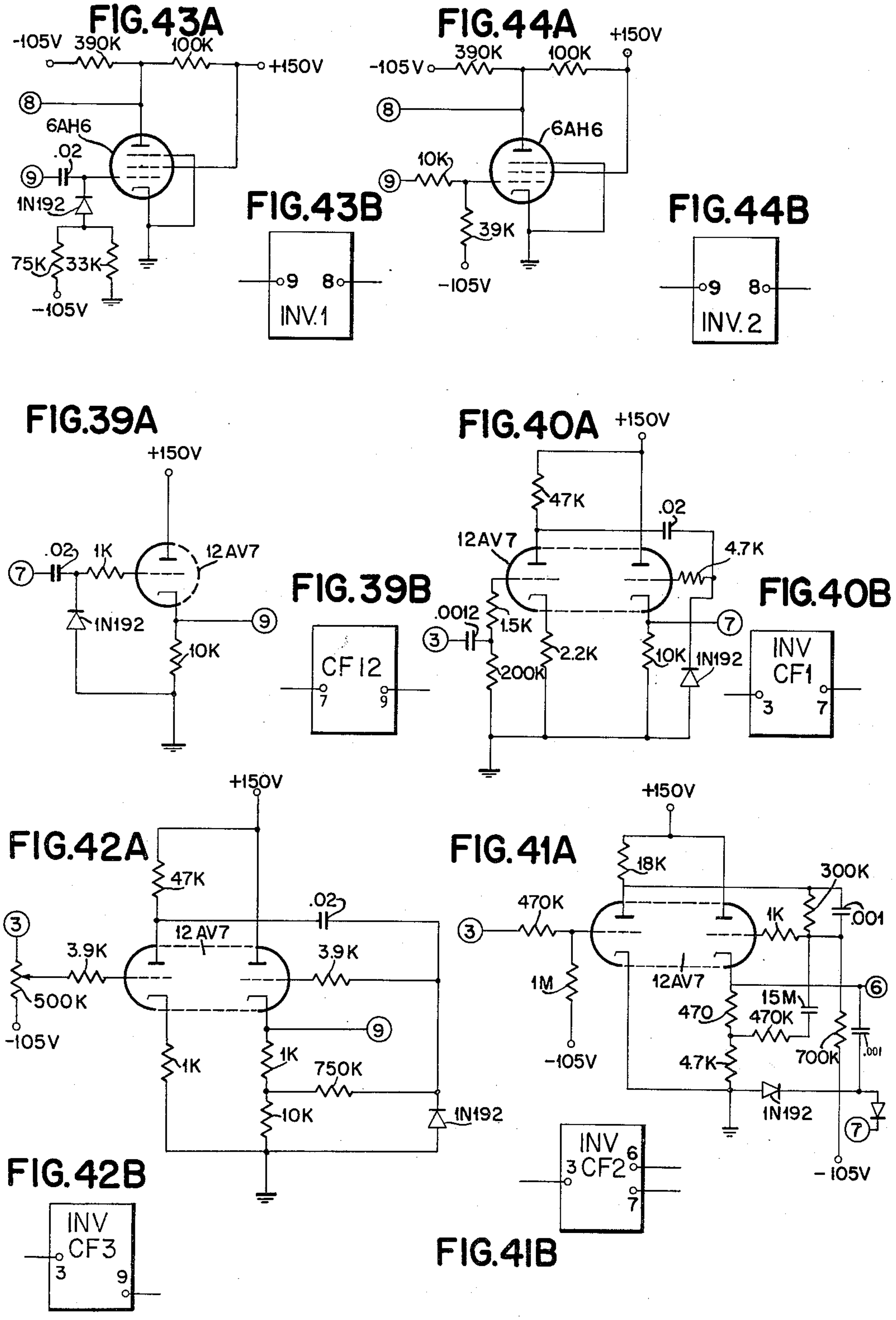

FIGS. 40*a*, 41*a* and 42*a* are schematic diagrams of inverted-cathode follower units, FIGS. 40*b*, 41*b* and 42*b* being respective block representations thereof.

FIGS. 43*a* and 44*a* are schematic diagrams of inverter units, FIGS. 43*b* and 44*b* being respective block representations thereof.

FIGS. 45*a*–49*a* are schematic diagrams of gating units, FIGS. 45*b*–49*b* being respective representations thereof.

FIGS. 50*a*–59*a* are schematic diagrams of single shot multivibrator units, FIGS. 50*b*–59*b* being respective block representations thereof.

FIGS. 60*a*–63*a* are schematic diagrams of OR units, FIGS. 60*b*–63*b* being respective block representations thereof.

Figure 64A:
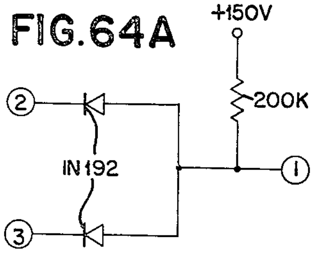
Figure 64B:
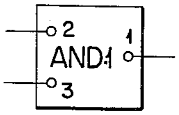
Figure 65A:
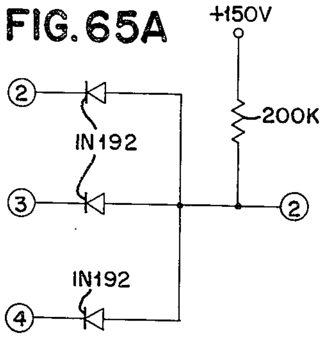
Figure 65B:
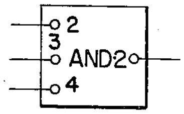

FIGS. 64*a* and 65*a* are schematic diagrams of AND units, FIGS. 64*b* and 65*b* being respective block representations thereof.

Figures 66A, 66B:
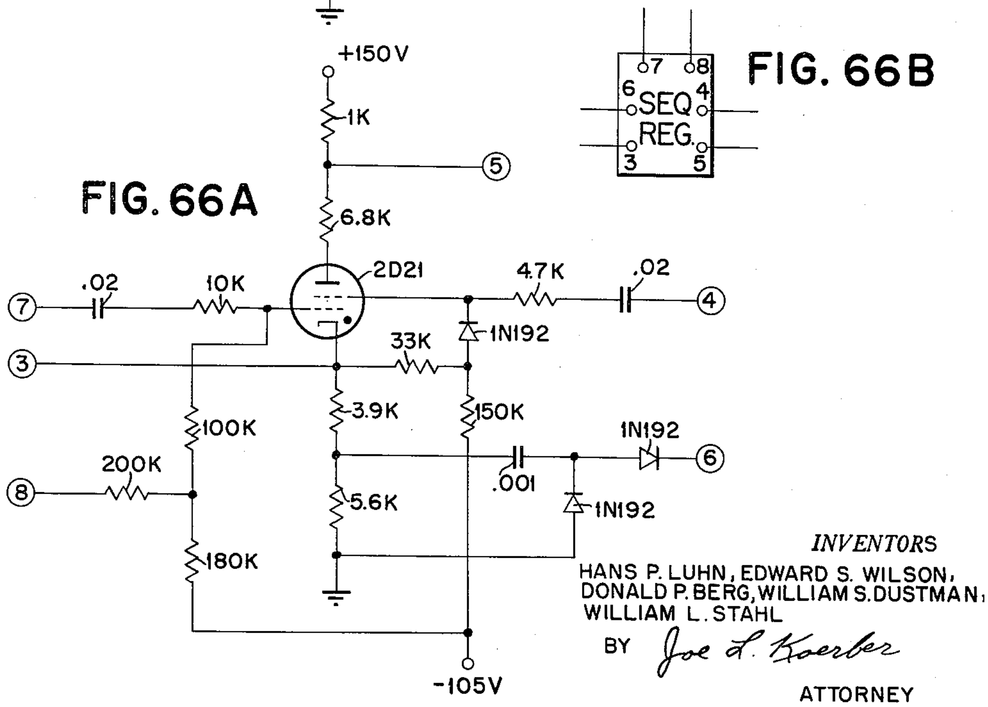

FIG. 66*a* is a schematic diagram of a sequence register, FIG. 66*b* being the block representation thereof.

Figures 67A, 67B, 68A, 68B, 69A, 69B, 70A, 70B, 71A, 71B:
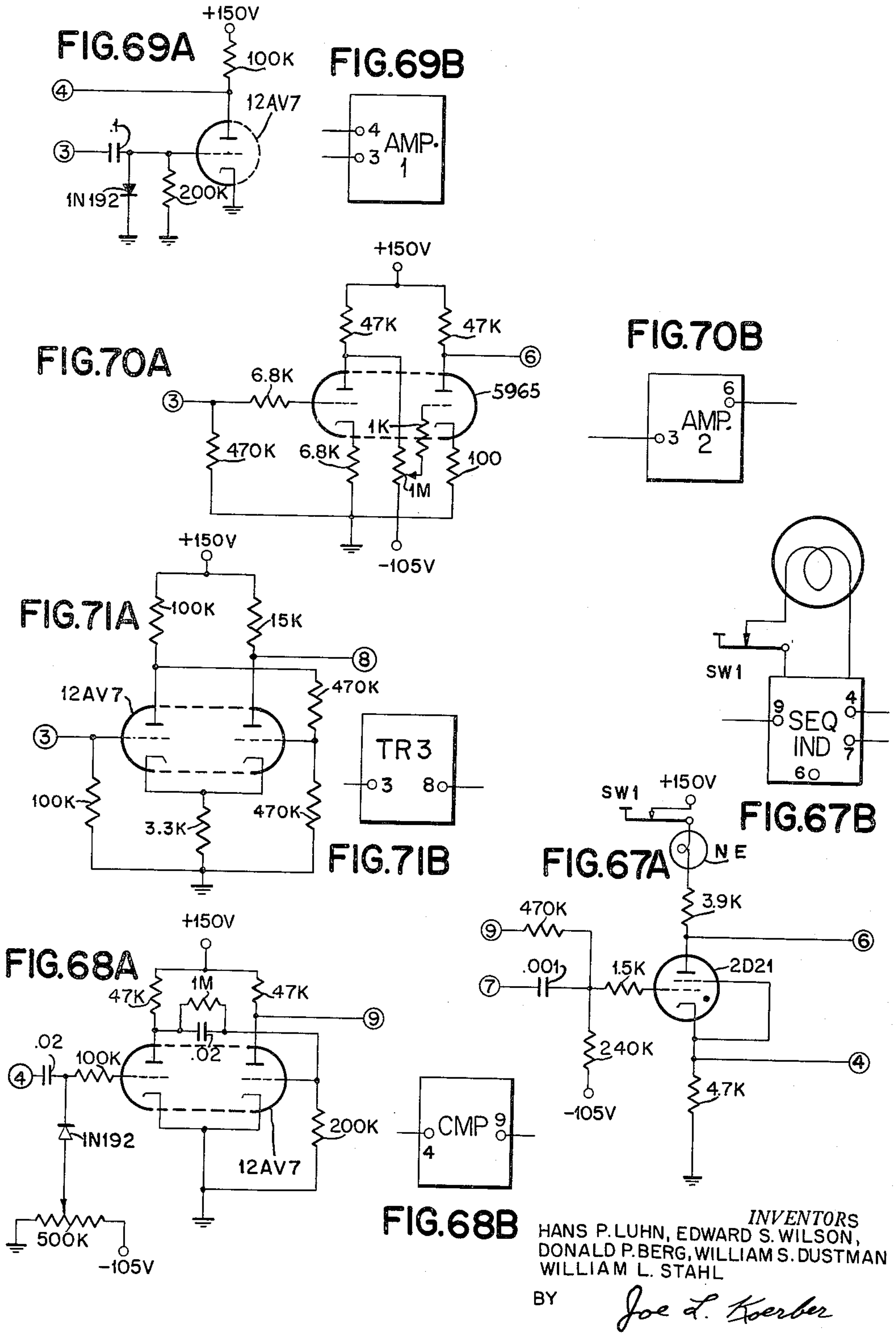

FIG. 67*a* is a schematic diagram of a sequence indicator, FIG. 67*b* being the block representation thereof.

FIG. 68*a* is a eschematic diagram of a comparator output unit, FIG. 68*b* being the block representation thereof.

FIGS. 69*a*, 70*a*, and 72*a*–77*a* are schematic diagrams of amplifiers, FIGS. 69*b*, 70*b*, and 72*b*–77*b* being respective block representations thereof.

Figure 78A:
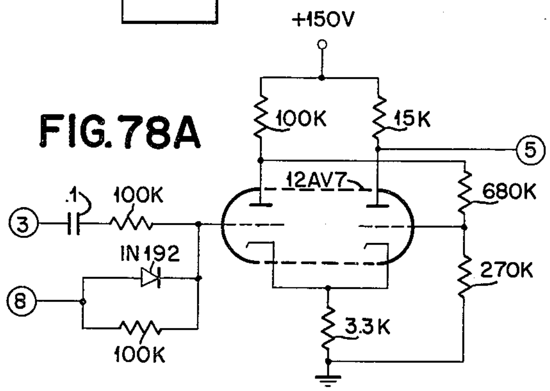
Figure 78B:
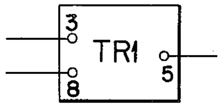
Figure 79A:
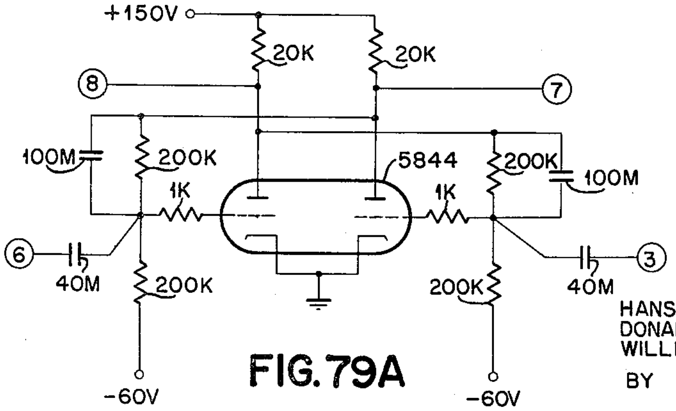
Figure 79B:
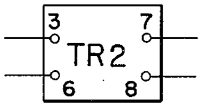

FIGS. 71*a*, 78*a*, and 79*a*, are schematic diagrams of trigger units, FIGS. 71*b*, 78*b* and 79*b* being the respective block representations thereof.

Figures 80A, 80B:
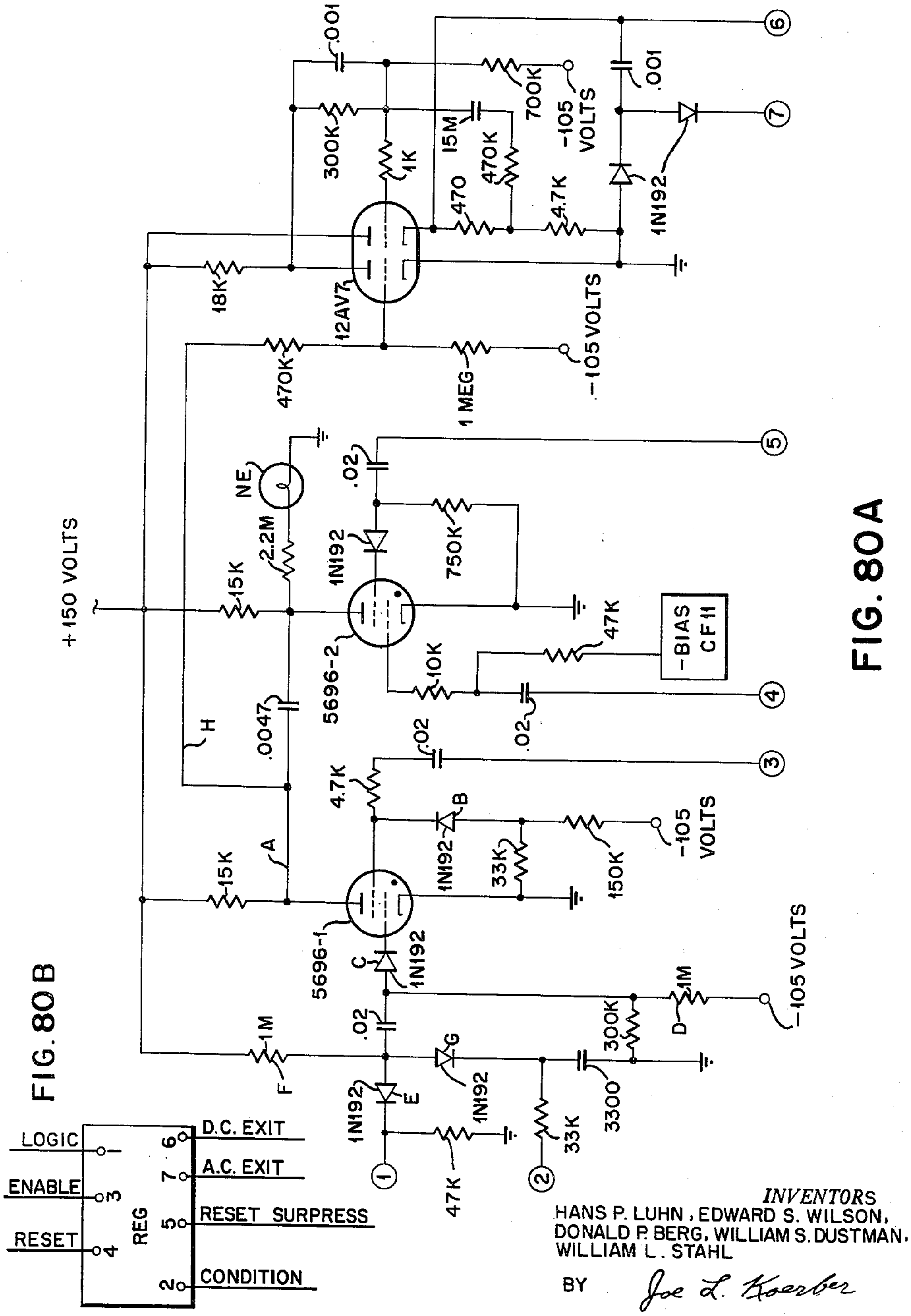

FIG. 80*a* is a schematic diagram of a register, FIG. 80*b* being the block representation thereof.

Figures 81A, 81B, 82A, 82B, 83A, 83B, 84A, 84B, 85A, 85B:
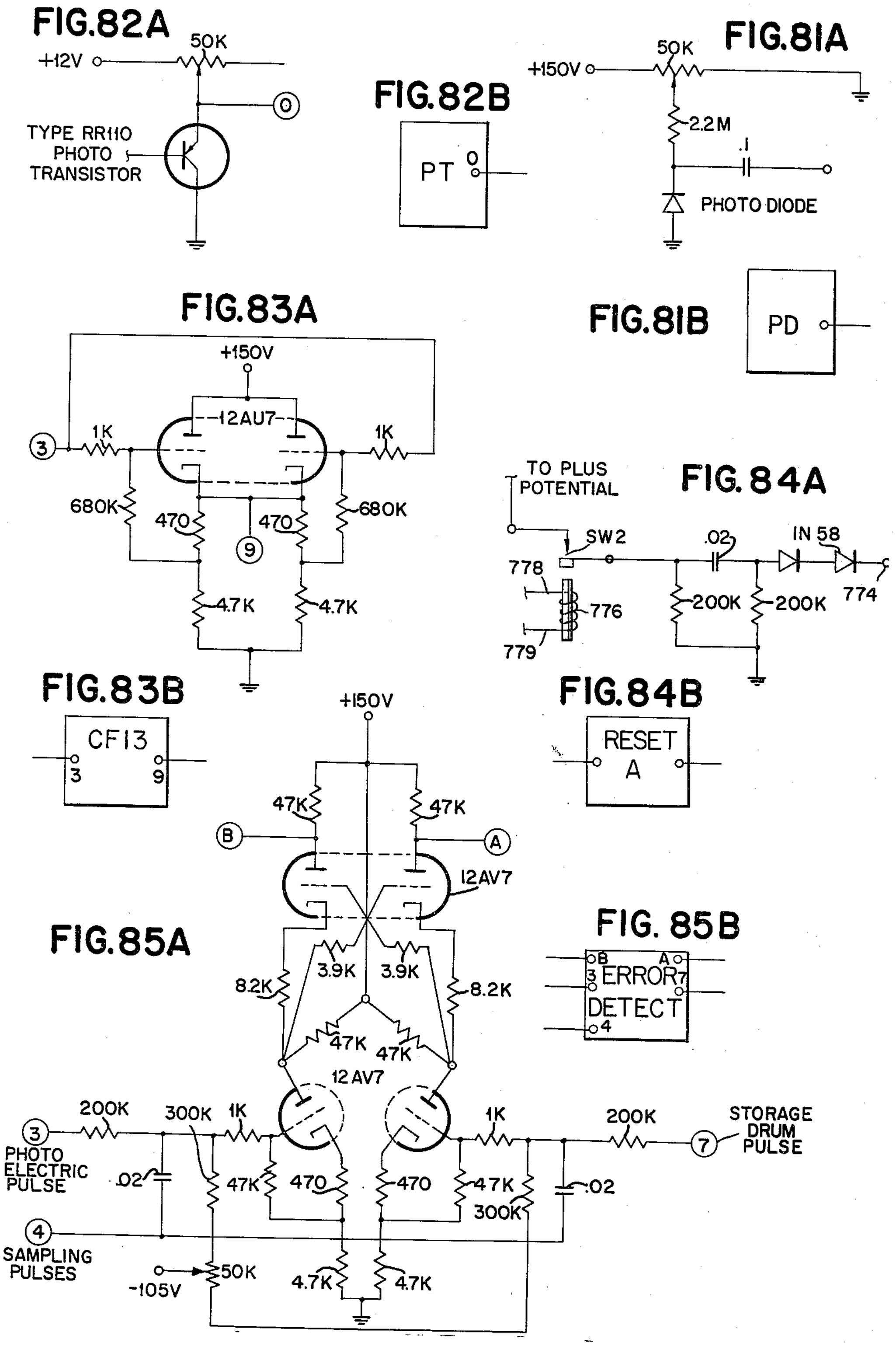

FIG. 81*a* is a schematic diagram of a photodiode unit, FIG. 81*b* being the block representation thereof.

FIG. 82*a* is a schematic diagram of a phototransistor unit, FIG. 82*b* being the block representation thereof.

FIG. 84*a* is a schematic diagram of a register reset unit, FIG. 84*b* being the block representation thereof.

FIG. 85 is a schematic diagram of an error detecting unit, FIG. 85*b* being the block representation thereof.

Figure 86:
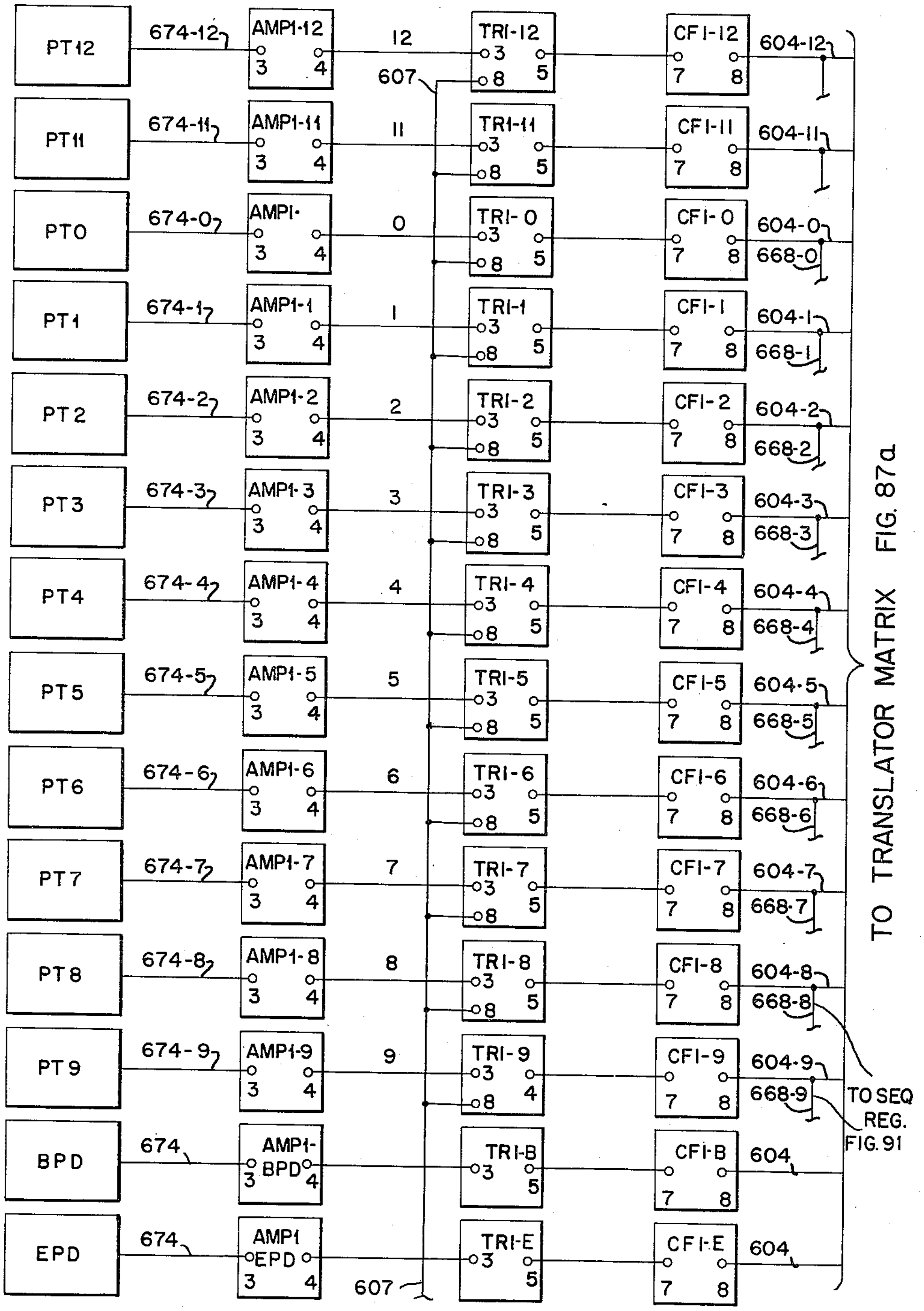

FIG. 86 shows the photo sensing and output units in block form.

Figure 87A:
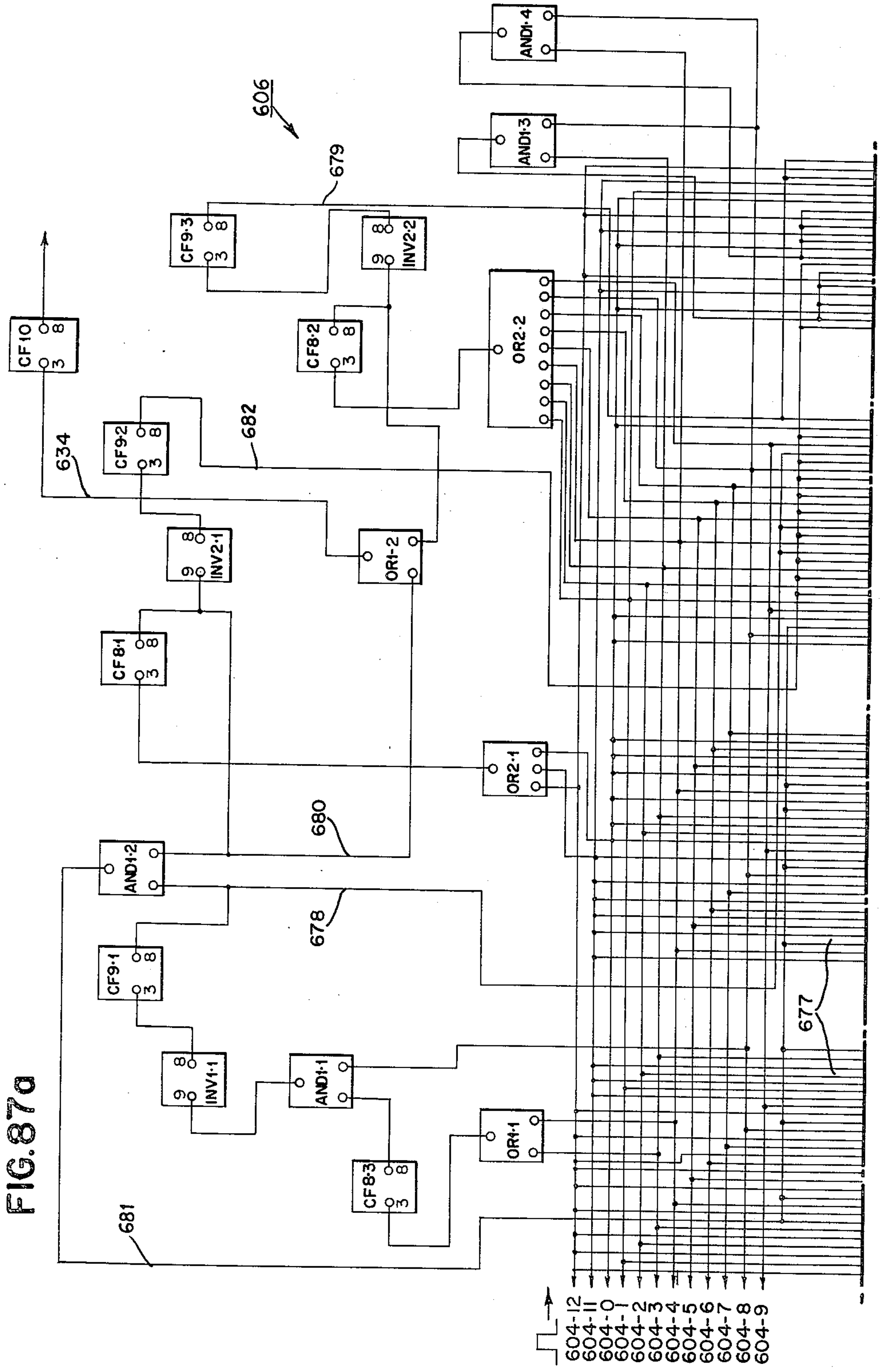
Figure 87B:
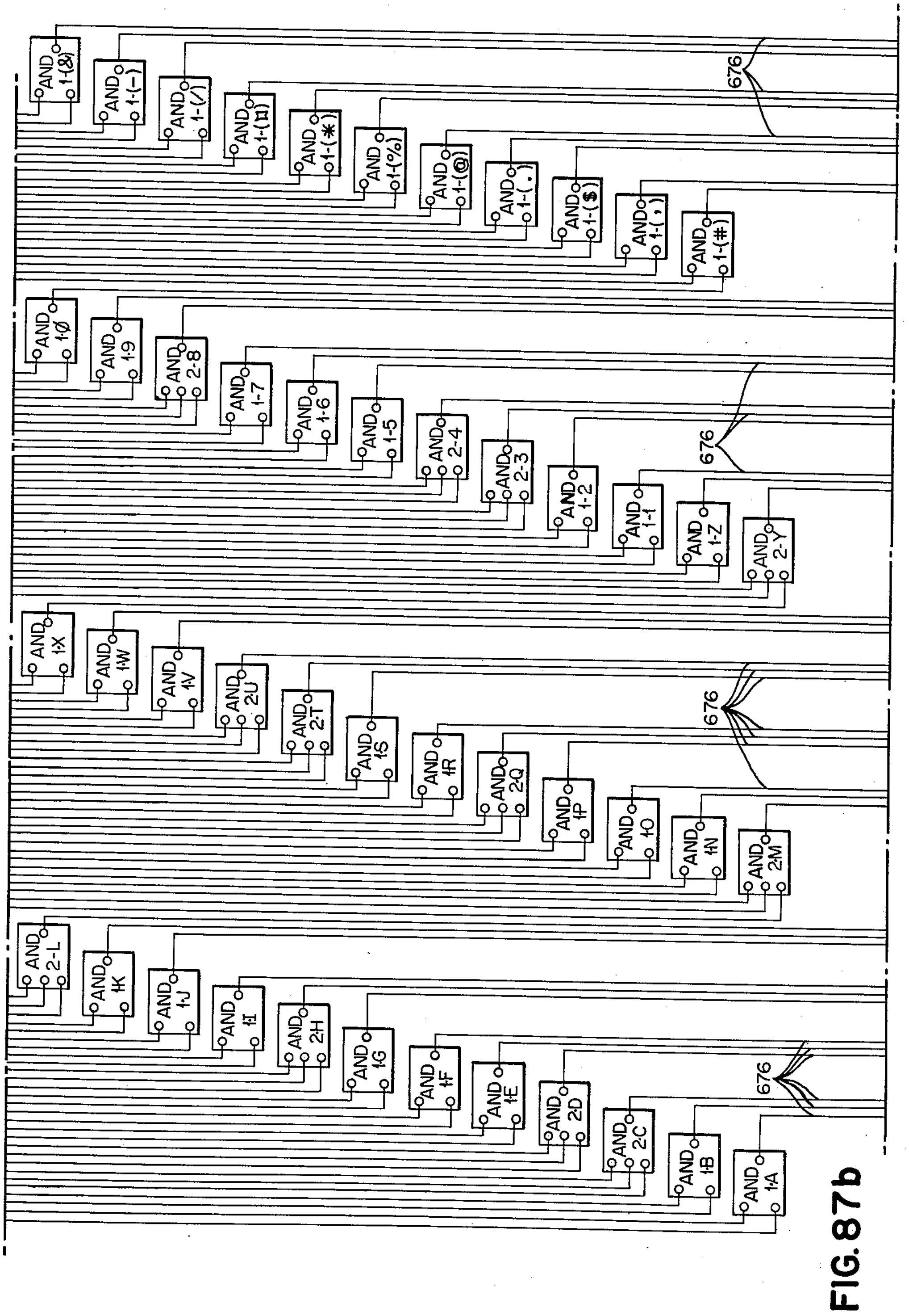
Figure 87C:
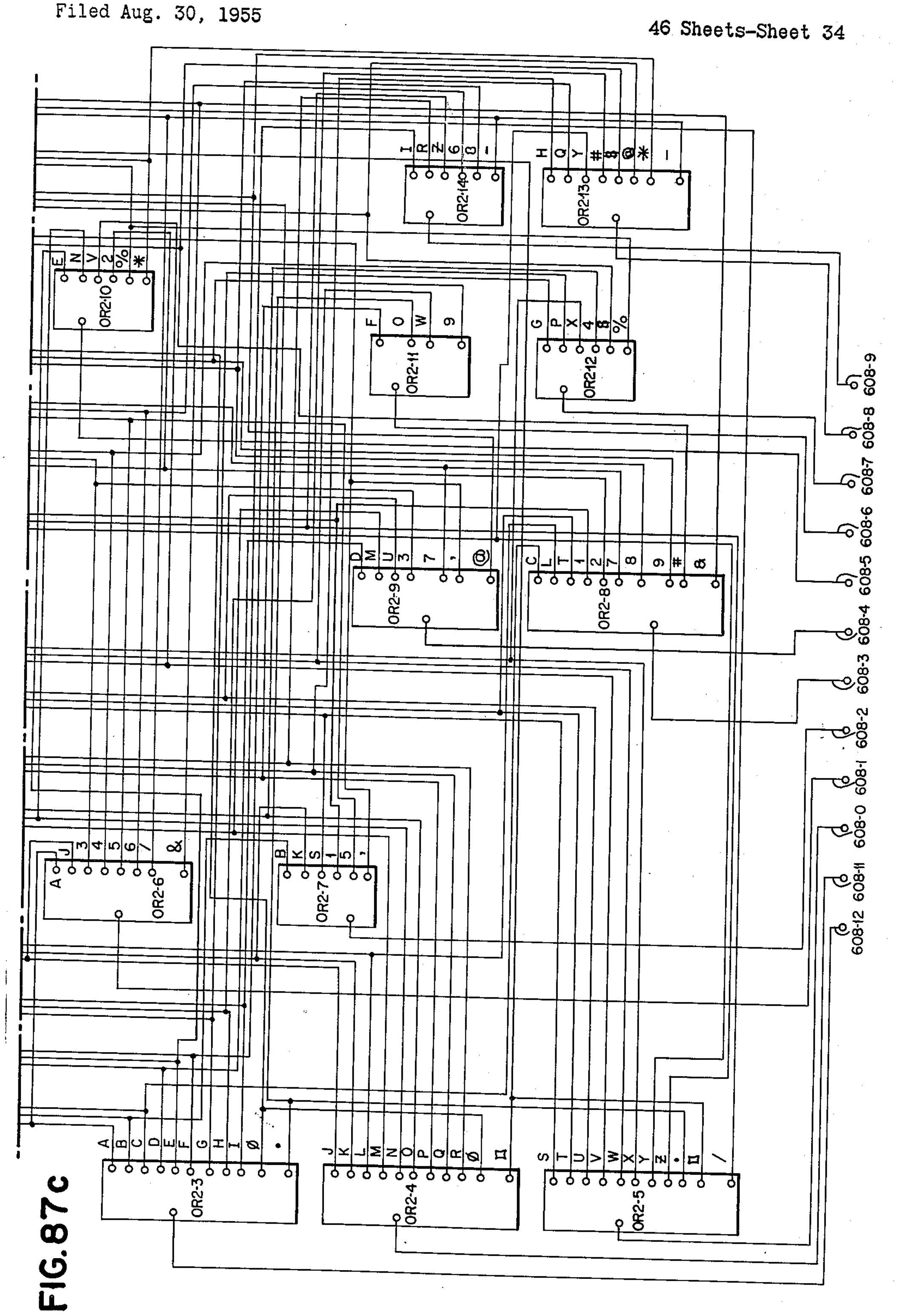

FIGS. 87*a*, 87*b* and 87*c* form a complete schematic representation of the translator matrix.

Figure 88:
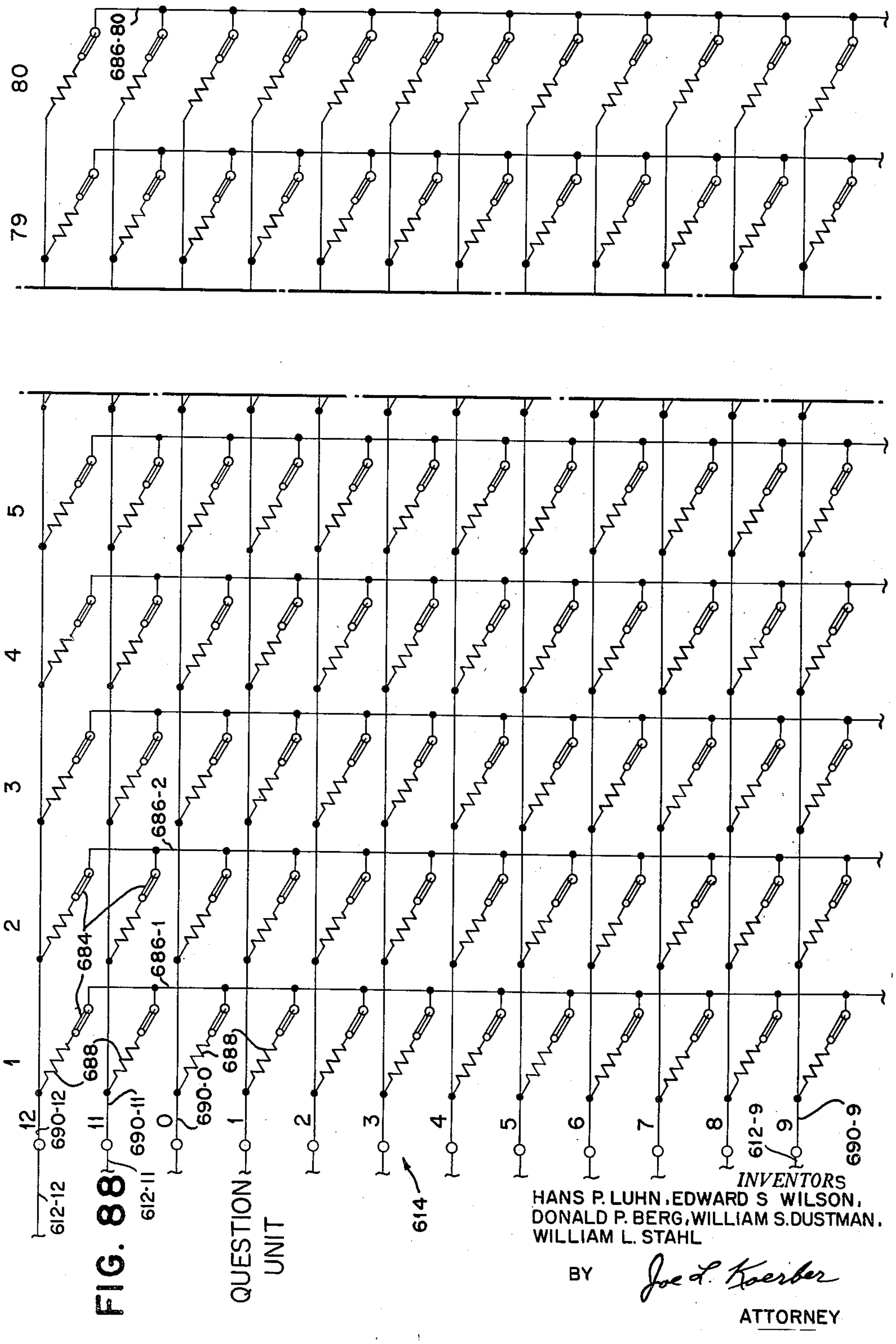

FIG. 88 is a schematic showing of the question card unit.

Figure 89:
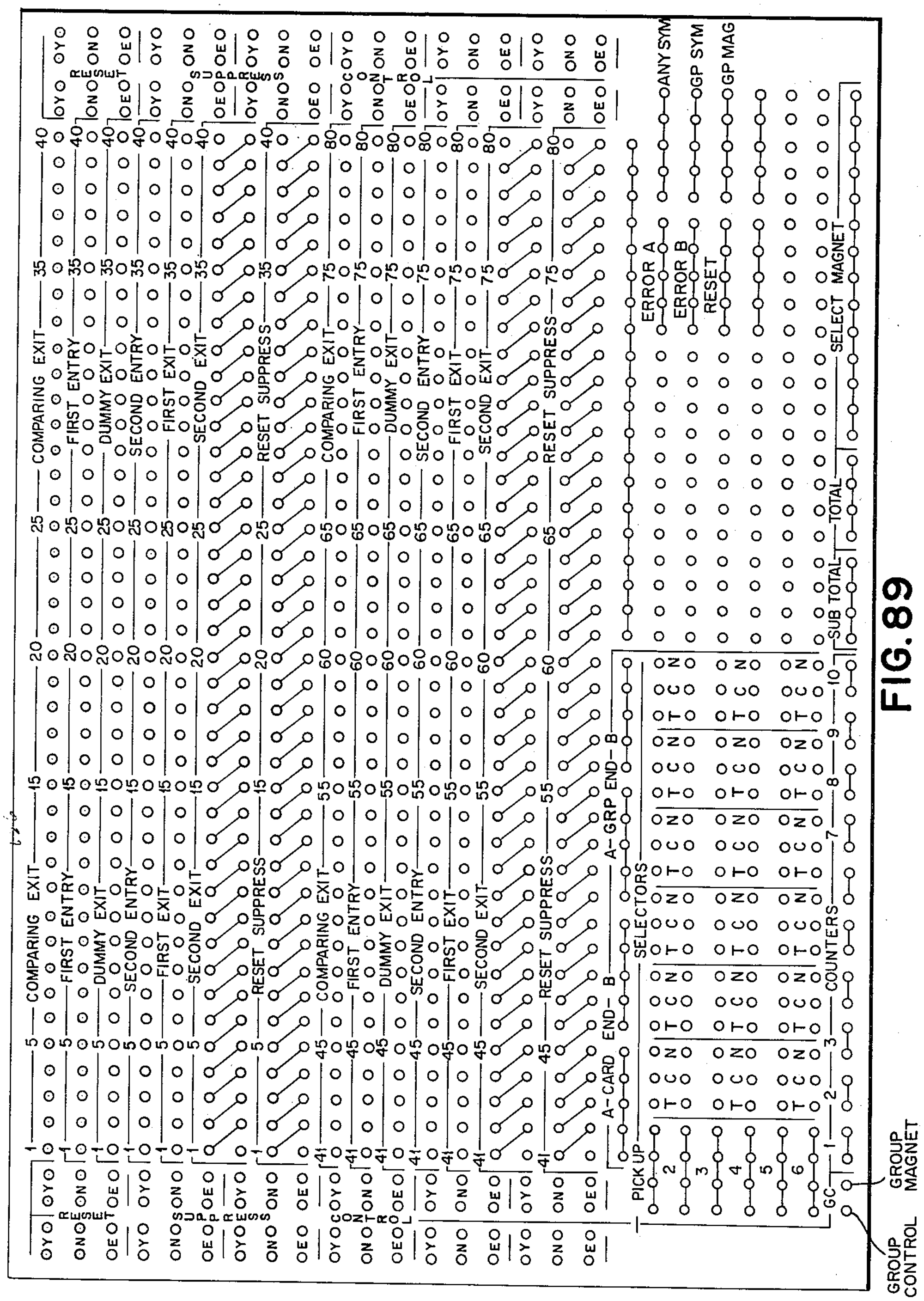

FIG. 89 shows the panel board.

Figure 90:
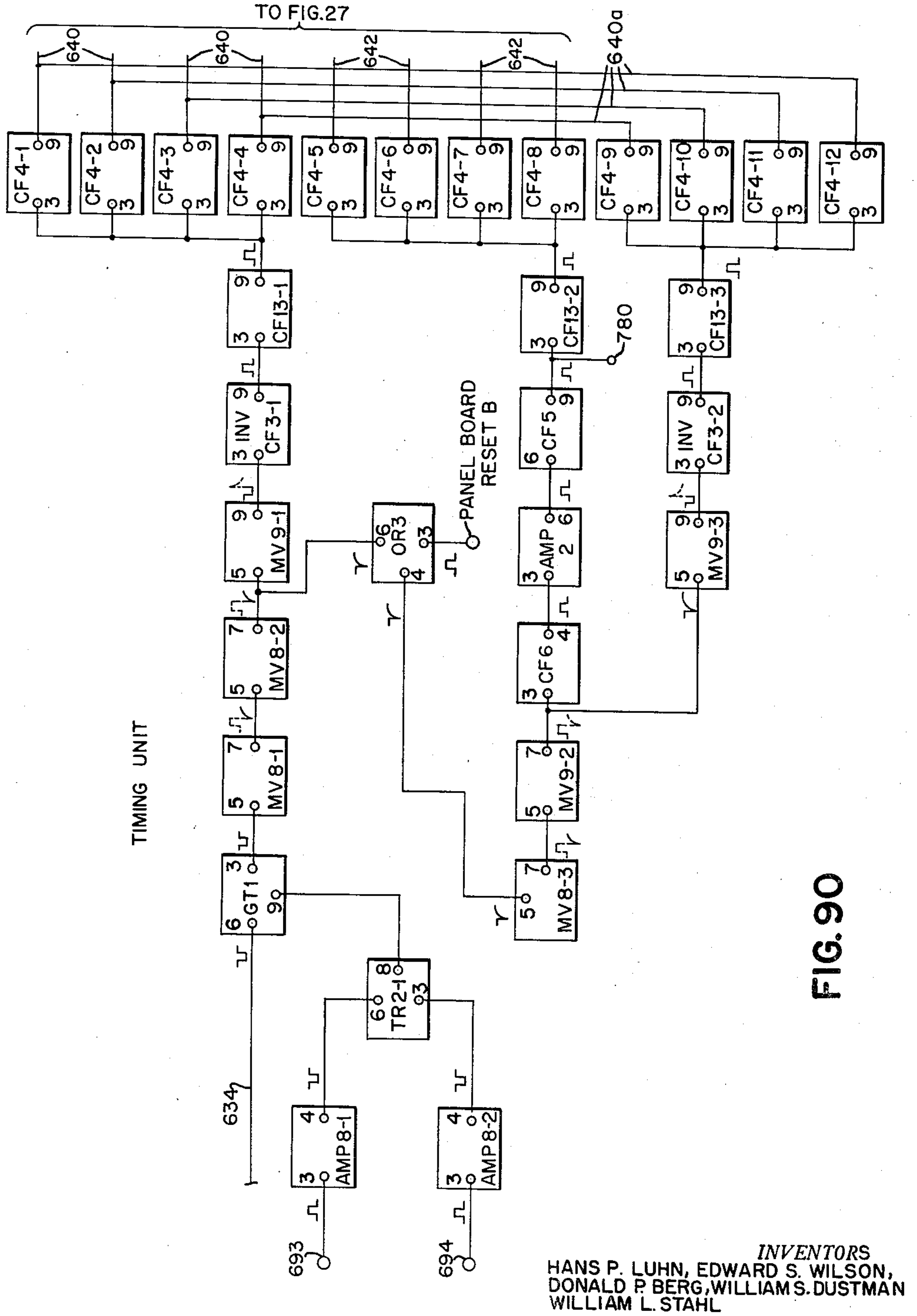

FIG. 90 is a block representation of the timing unit.

Figure 91:
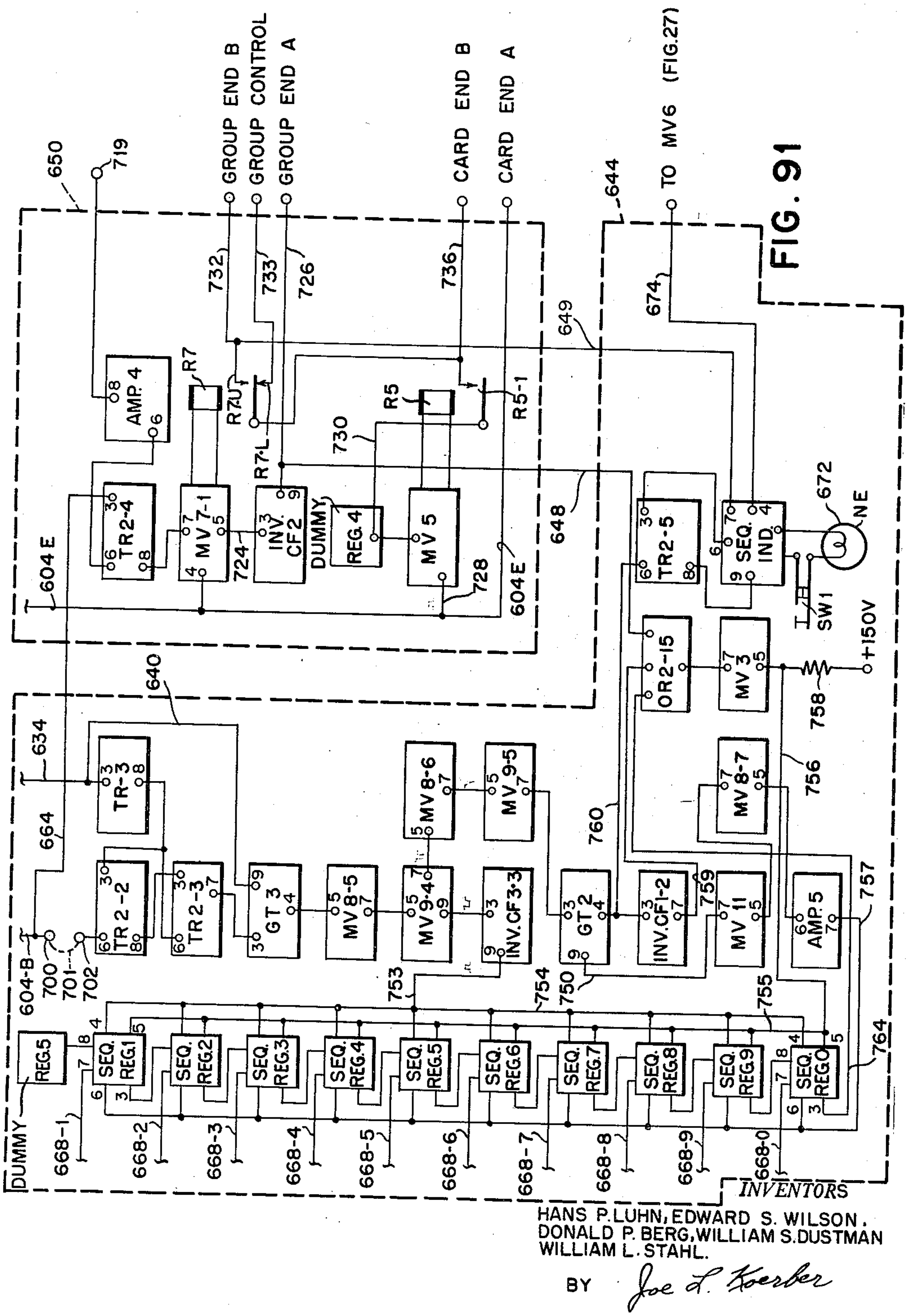

FIG. 91 is a block representation of the grouping and sequence units.

Figures 92, 93, 94:
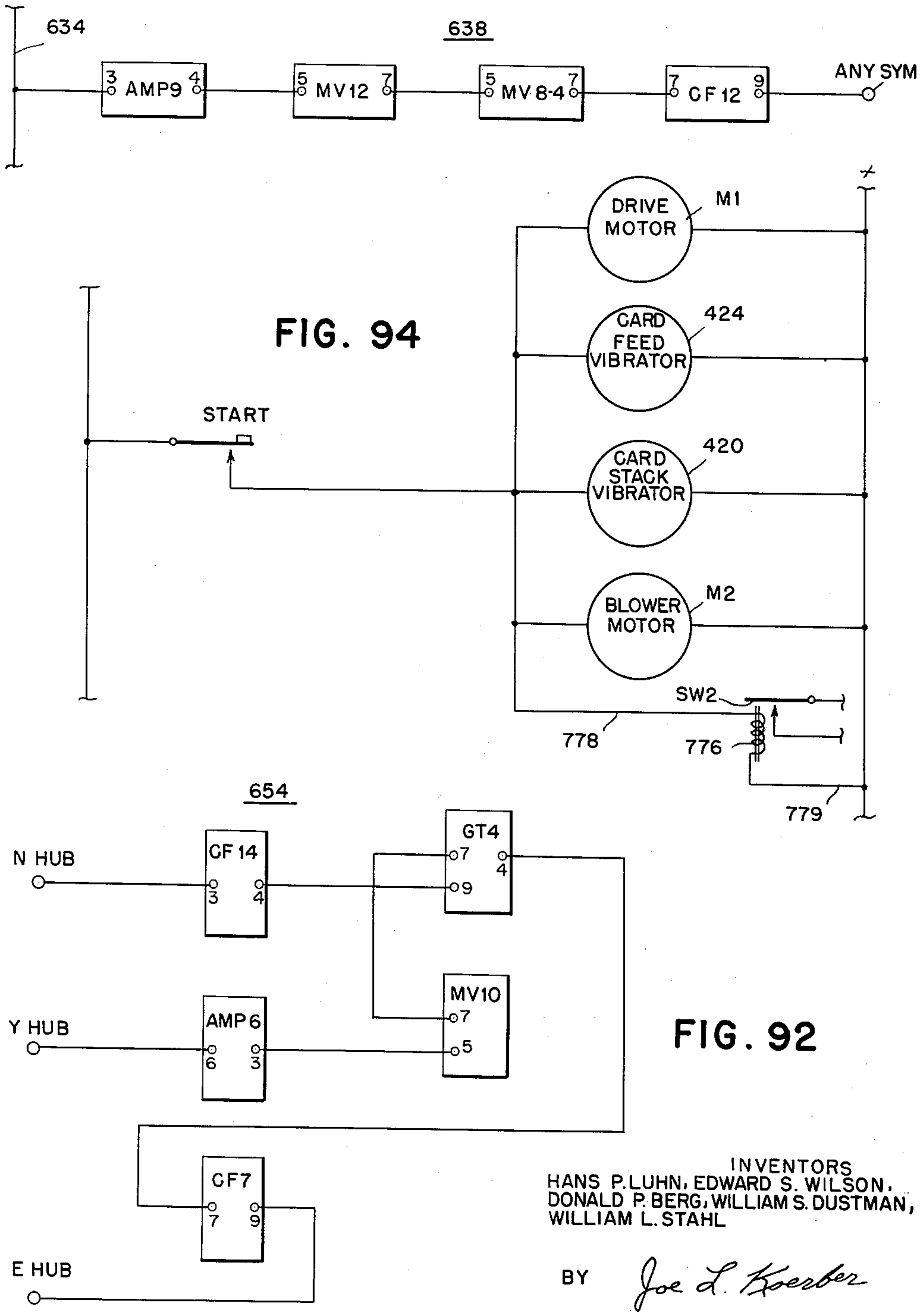

FIG. 92 is a block representation of the reset suppress unit.

FIG. 93 is a block representation of a pulse delay unit.

FIG. 94 shows the electrical drive connections for the mechanical unit and a register reset solenoid.

Figure 95:
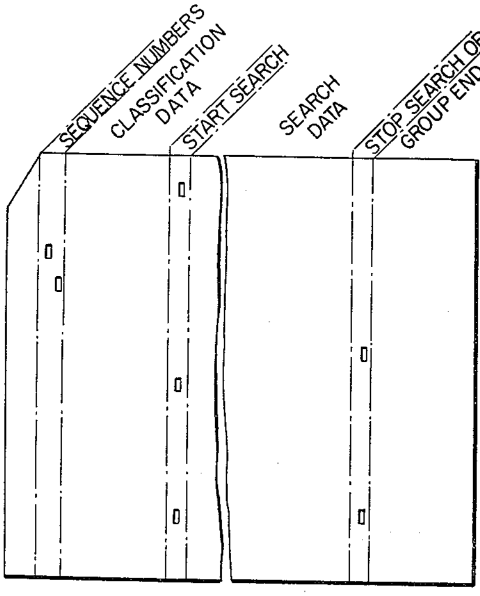

FIG. 95 is a fragmentary view of a detail card.

Figure 96:
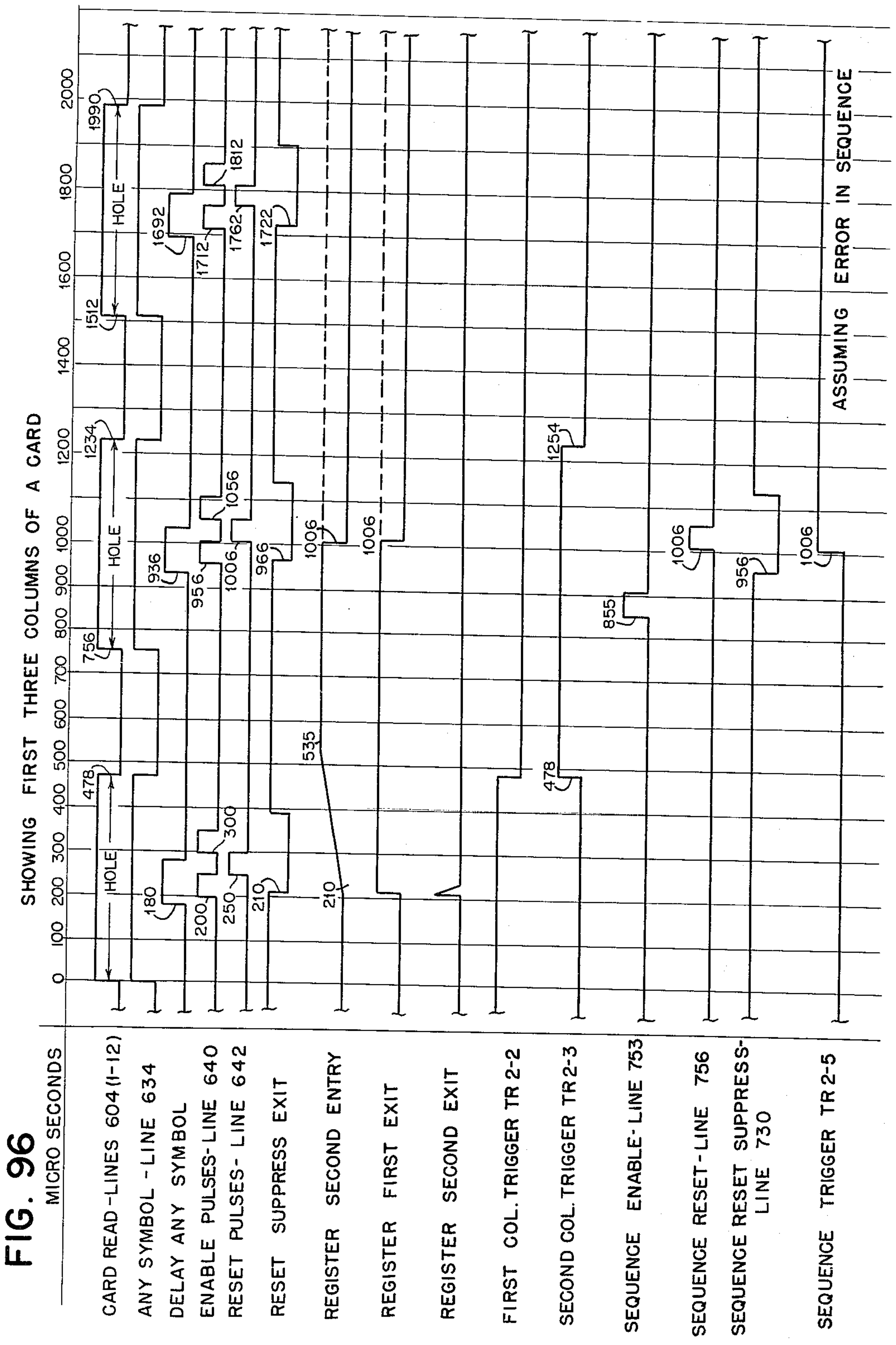
Figure 97:
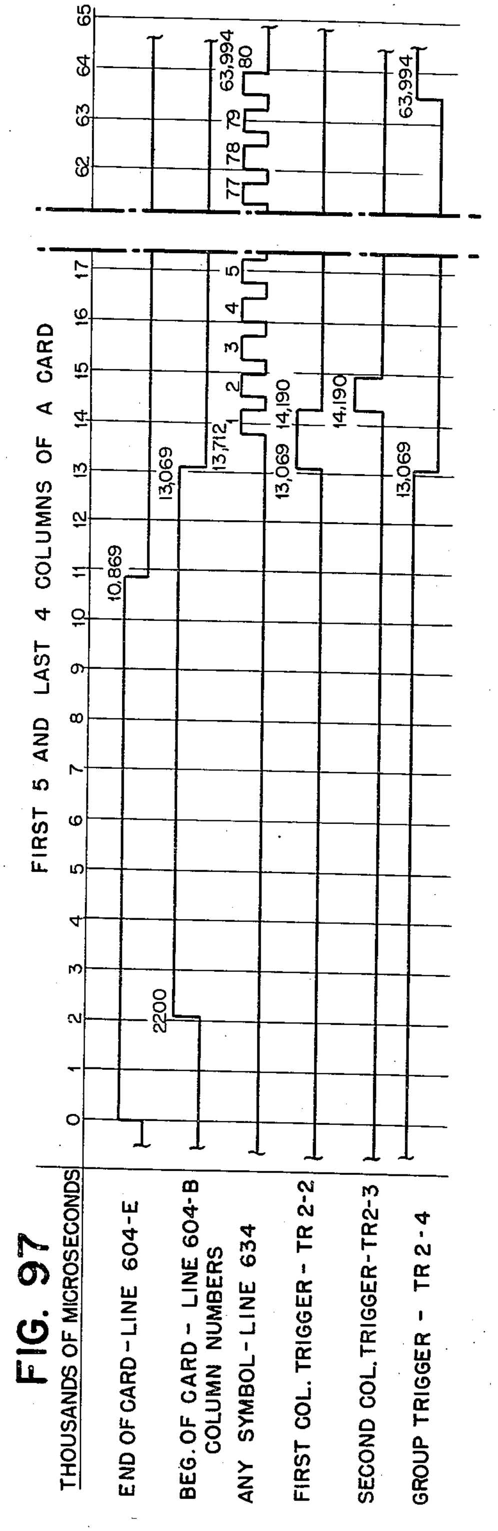
Figure 98:
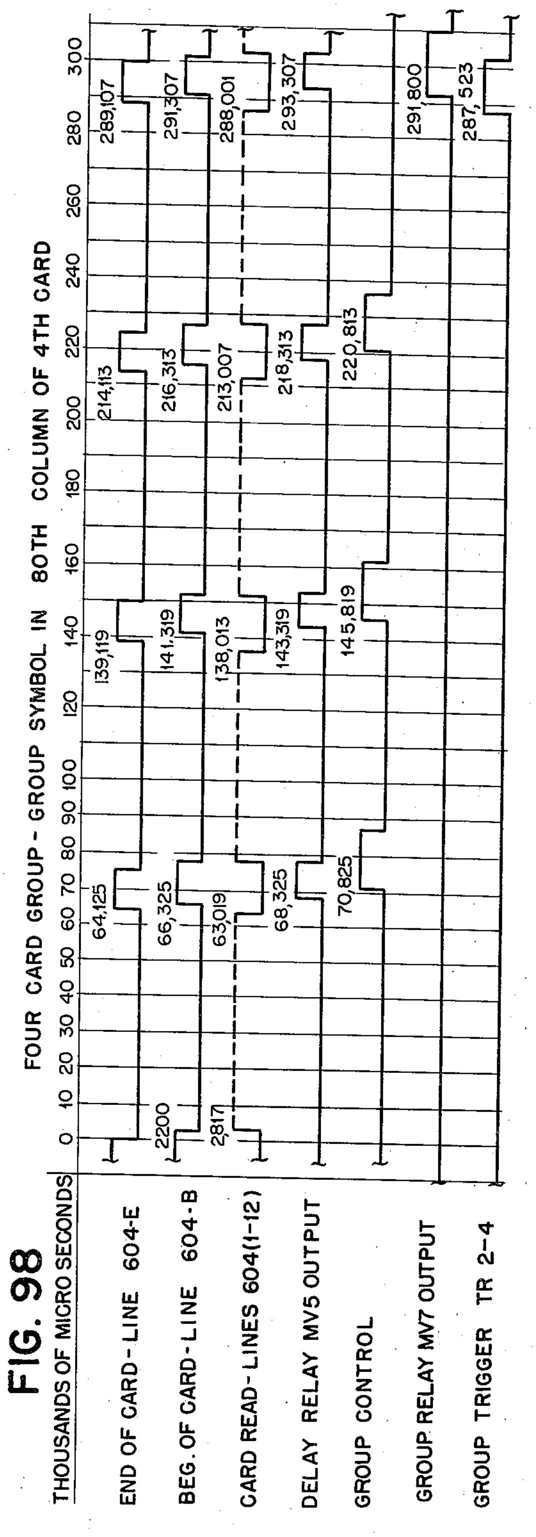

FIGS. 96, 97, and 98 are timing charts showing the various pulses in time relation to one another.

FIGS. 99 through 105 show the panel board wiring for a specific search example.

Figure 106:
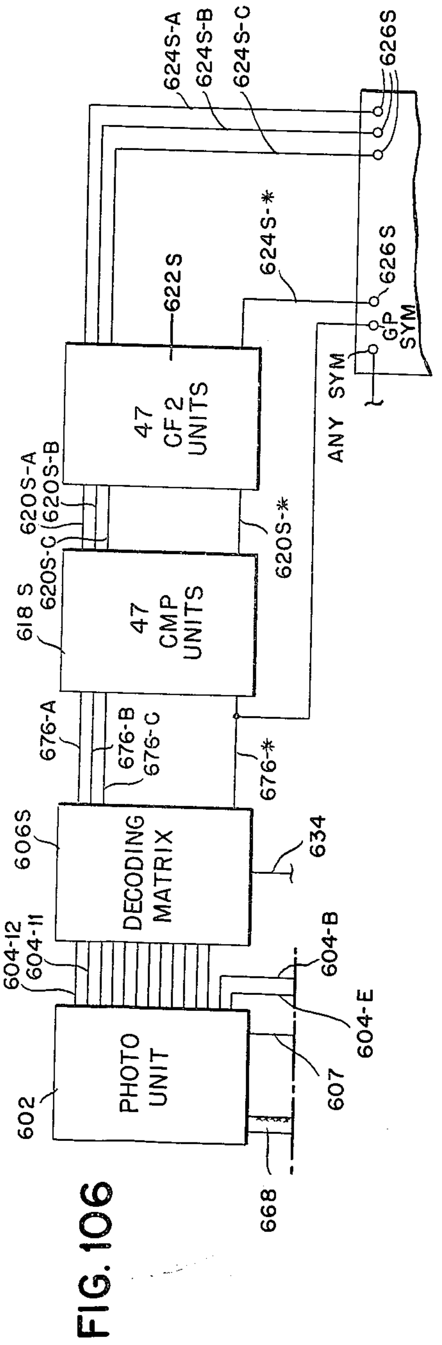

FIG. 106 is a partial block diagram of an alternate design.

Figure 107:
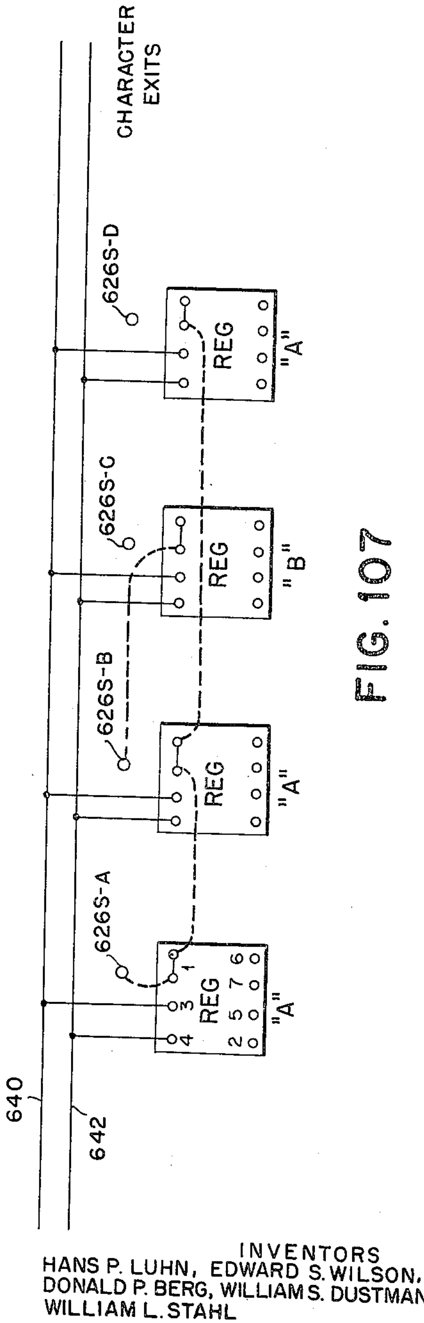

FIG. 107 shows registers modified for an alternate design.

*Mechanical description*

Figure 1:
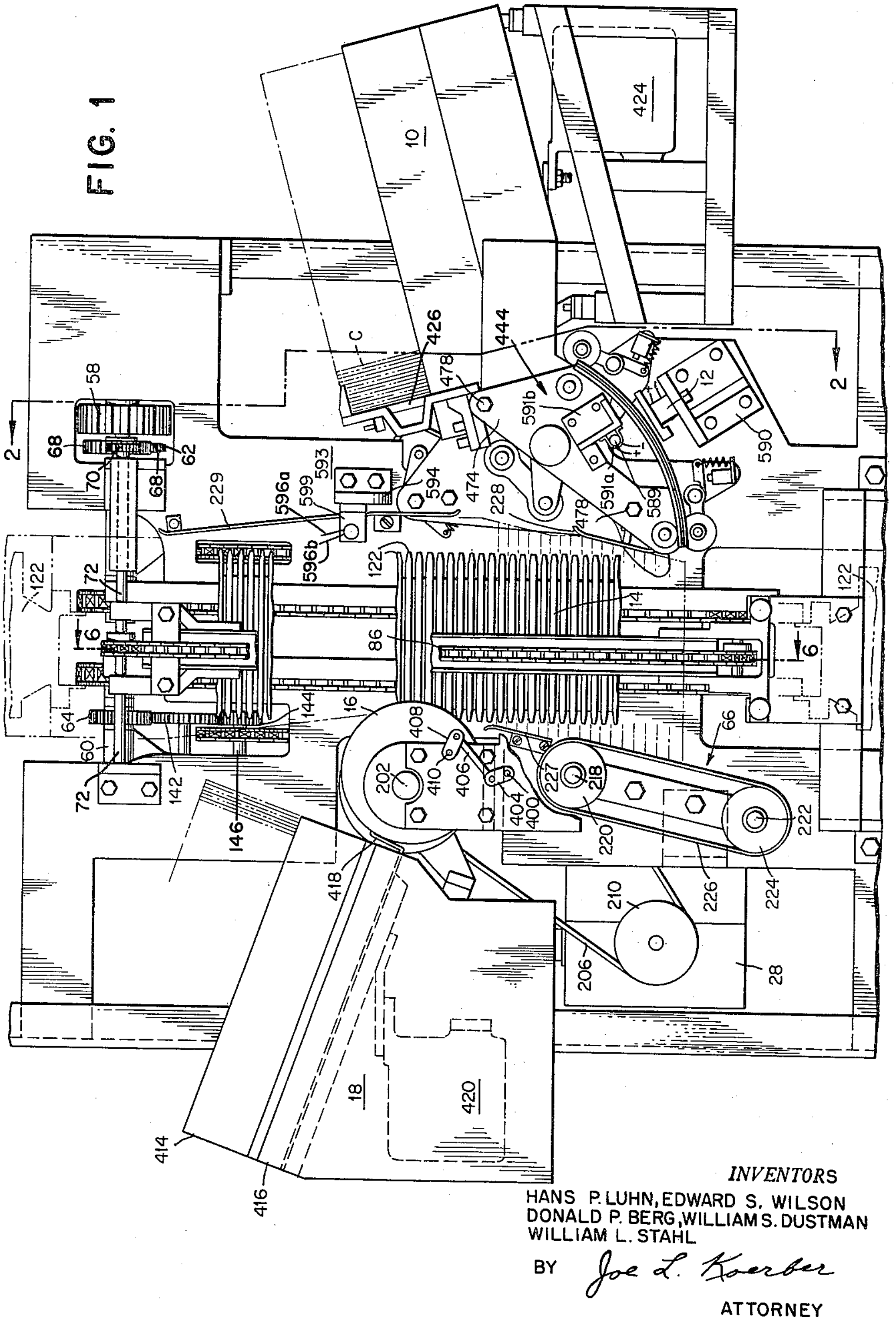
FIG. 1 is a front elevation of the machine with the base broken away and the cover removed.
Figure 2:
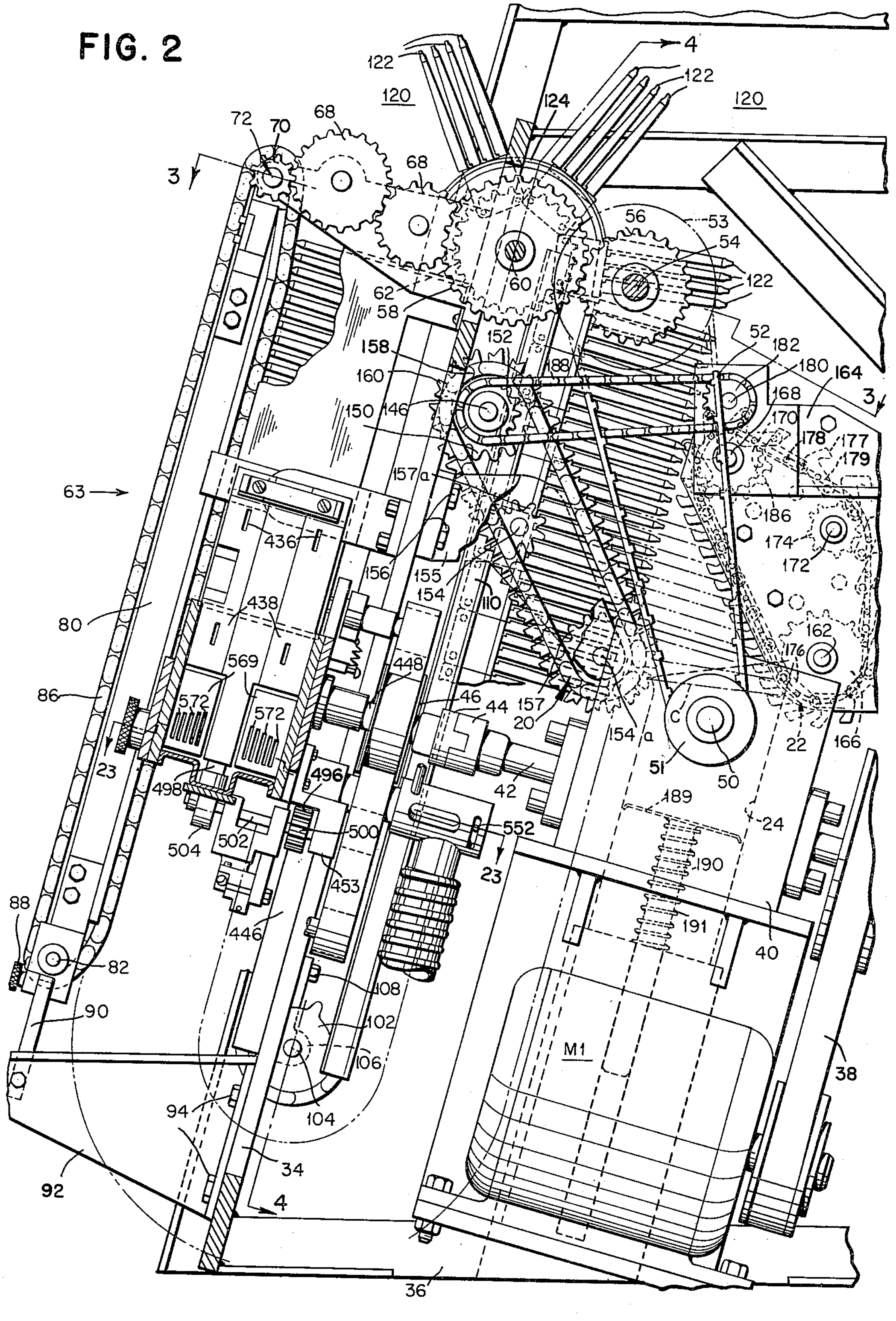
FIG. 2 is a side elevation taken approximately on the line 2—2 in FIG. 1.

Referring to FIGS. 1 and 2, the general layout and functioning of the mechanical structure will be described.

A great plurality of cards C, that are to be scanned, are placed in a card hopper 10 and are fed one at a time, endwise, past a scanning unit 12 and into a transit storage belt 14 that moves continuously. Twenty-five cards have been arbitrarily selected as the maximum number of cards in a group. However, in the structure described hereinafter, the number may be varied merely by changing the position of a sensing brush on a storage drum 26. Even larger groups may be provided for by enlarging the drum 26. Using the arbitrary group of twenty-five, as many as twenty-five cards, if they comprise a single group, may be scanned before a determination is made to select or reject the group. Twenty-five card spaces after a card is fed into the transit storage belt 14, it comes opposite a reject card stacker 16, and, if that card is not to be selected it is automatically picked from the belt 14 by the reject stacker 16 and stacked in a reject hopper 18. If the card is to be selected, the stacker 16 is disabled as the card comes opposite thereof. The card C then continued moving up the front side of the storage belt, over the top, and descends until it is removed from the belt 14 by a card pusher belt 20 that moves in a clockwise direction and a card support belt 22 that moves in a counterclockwise direction, as viewed in FIG. 2. When the card C is wholly removed from the storage belt 14, it is dropped into a selected card pocket 24.

The contact storage drum 26 is contained in the housing 28 that is shown in FIG. 1, and is used to accomplish the delayed determination to select or reject groups of cards.

All mechanical components except a drive motor M1 are mounted on a base plate 34 that is supported at an angle of approximately 75° from horizontal, as shown in FIG. 2. The base plate 34 is mounted in a suitable frame 36.

*Drive motor and drive connections*

Figure 4:
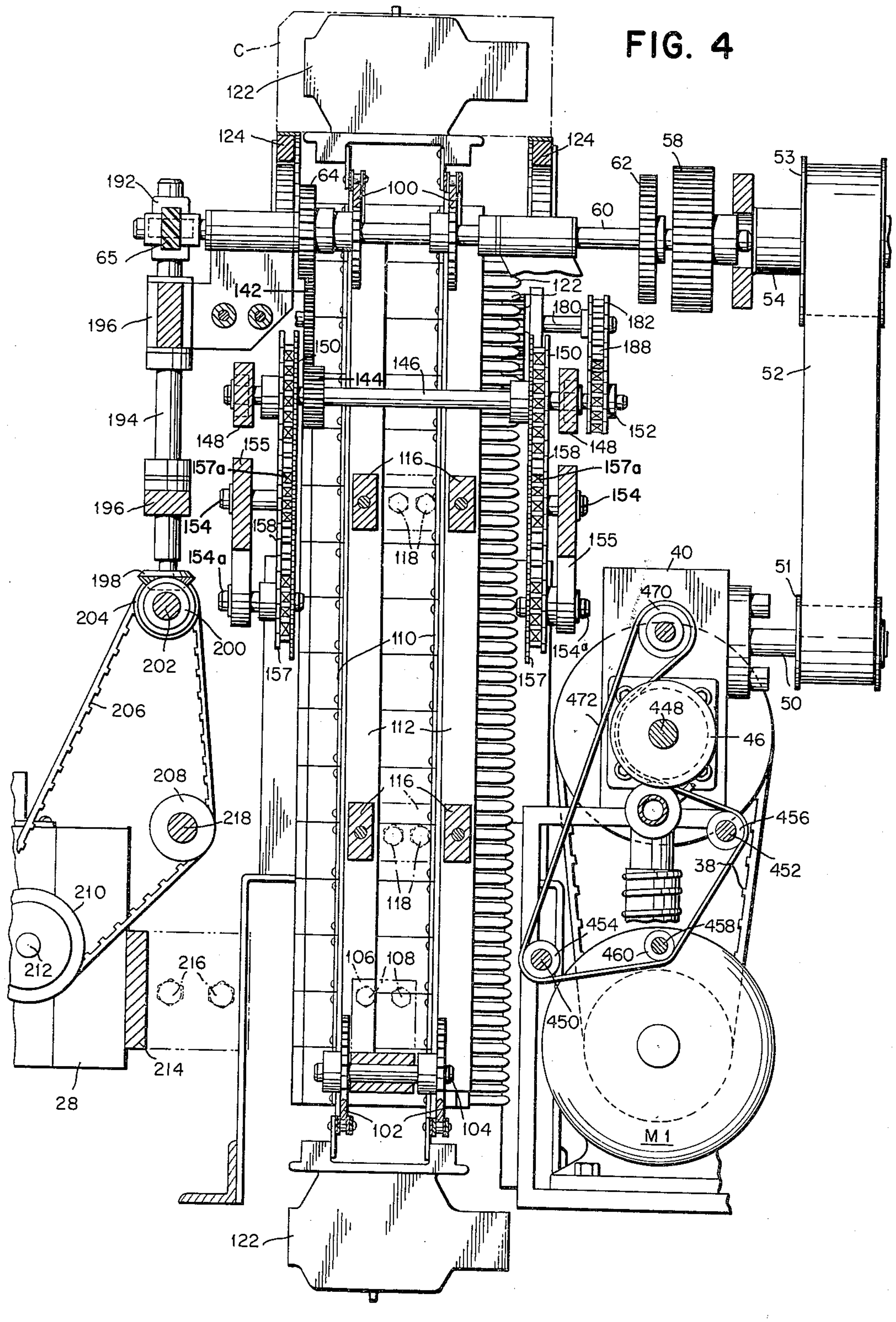
FIG. 4 is a section taken on the line 4—4 in FIG. 2.

Referring to FIGS. 2 and 4, the mechanical drive will be outlined. The constantly running motor M1 is mounted on the frame 36 and is connected through a belt 38 and a plurality of pulleys to a gear box 40 having two outputs. One drive is taken from the gear box 40 through a shaft 42, shown in FIG. 2, through a coupling 44 to a pulley 46 from which a card feed unit 48 is driven in a manner to be described hereinafter.

A second drive is taken from the gear box 40 through a shaft 50 and pulley 51, as shown in FIG. 4 and through a belt 52 and a pulley 53 and a shaft 54. The shaft 54 carries a gear 56 that drives a gear 58 on a shaft 60. The shaft 60 carries two other gears 62 and 64 and a worm gear 65.

Figures 5, 6, 22:
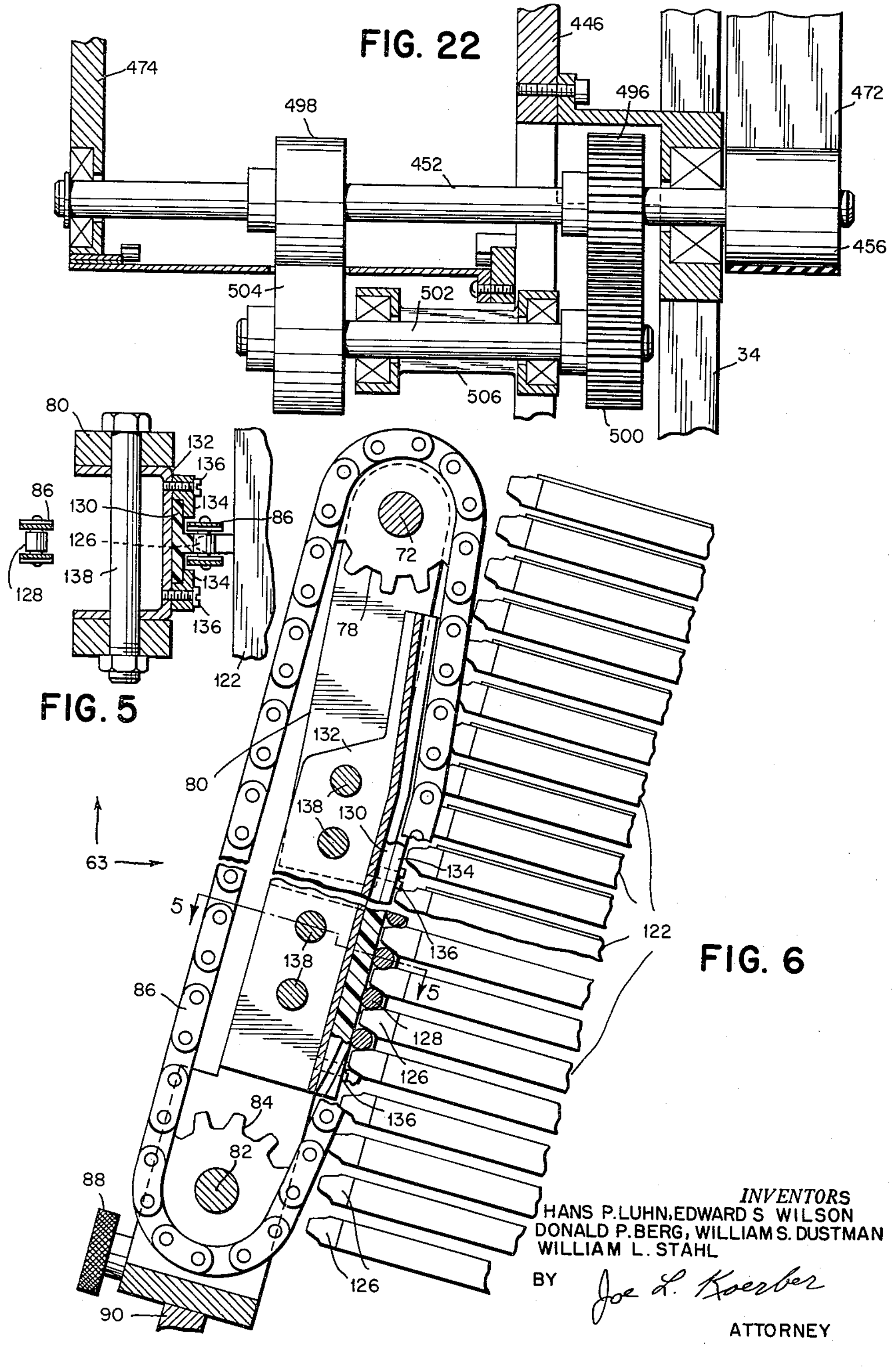
FIG. 5 is a section taken on the line 5—5 in FIG. 6.
FIG. 6 is a section taken on the line 6—6 in FIG. 1.
FIG. 22 is a section taken approximately on the line 22—22 in FIG. 20.

Through the gear 62, the transit storage belt 14 is driven, as well as guide means 63, shown in FIGS. 2, 5, and 6 for the belt 14. Through the gear 64, the card pusher mechanism 20 and the card support mechanism 22 are driven. Through the worm gear 65, a card aligning device 66, shown in FIG. 1, and the contact storage unit 26, shown in FIGS. 7–11, contained in the box 28, shown in FIG. 1 and FIG. 4, are driven.

*Transit storage belt*

Figure 3:
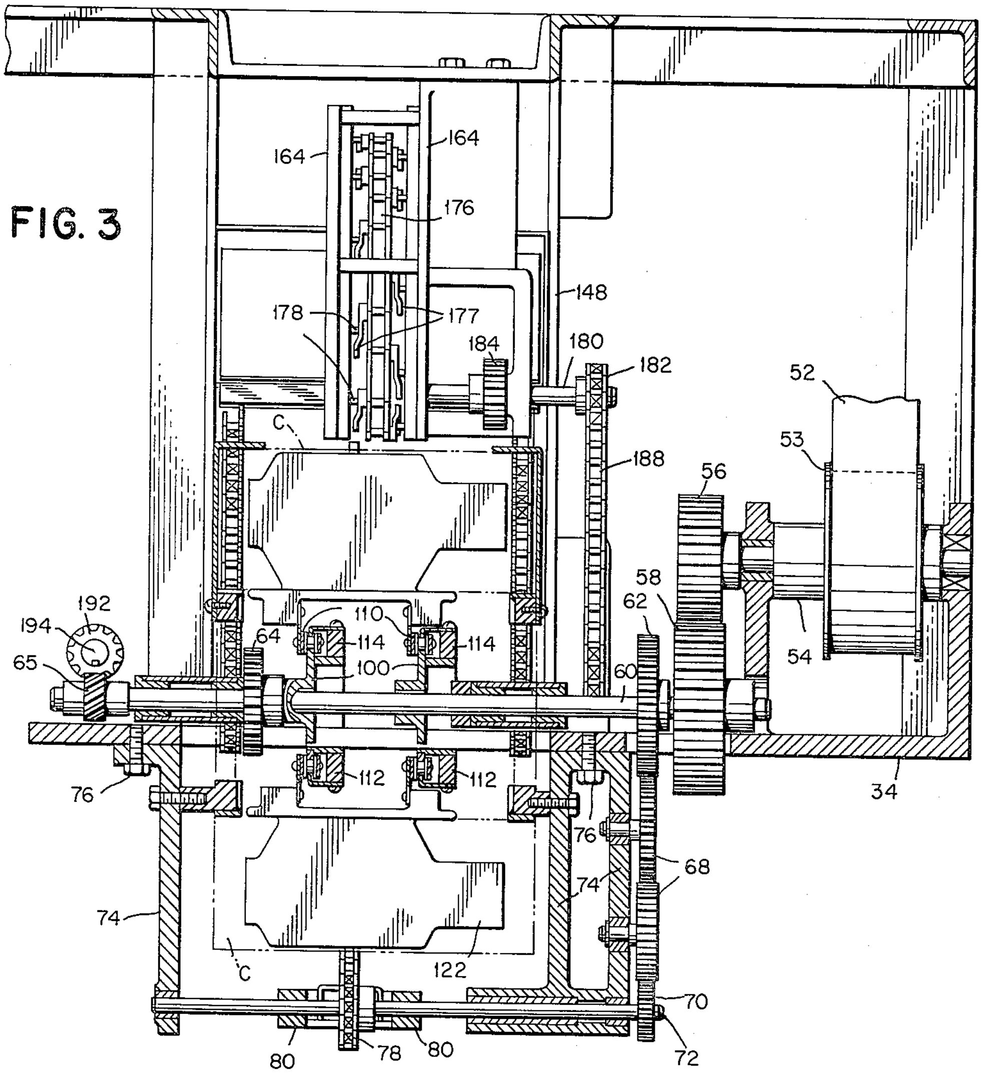
FIG. 3 is a top view when on the line 3—3 in FIG. 2.

Referring to FIGS. 1, 2, and 3, the gear 62 drives a pair of idler gears 68 that in turn drive a gear 70 that is mounted on a shaft 72 that is journaled in a pair of frame members 74 that are fixed to the base plate 34 by bolts 76. The shaft 72 carries a sprocket 78.

The shaft 72, as shown in FIGS. 3 and 6, has two elongated members 80 pivotally mounted thereon that have a shaft 82 journaled therein that carries a sprocket 84. A bicycle type chain 86 is mounted on the sprockets 78 and 84. A thumb screw 88 connects the frame members 80 to an arm 90 that is mounted on a bracket 97 that, in turn, is fixed to the base plate 34 by bolts 94, as shown in FIG. 2. By loosening the thumb screw 88, the frame and belt unit comprising the members 80 and 86 may be pivoted in a clockwise direction about the shaft 72. Pivoting the latter belt unit will facilitate clearing card jams from the machine if they should occur.

Figures 15, 16:
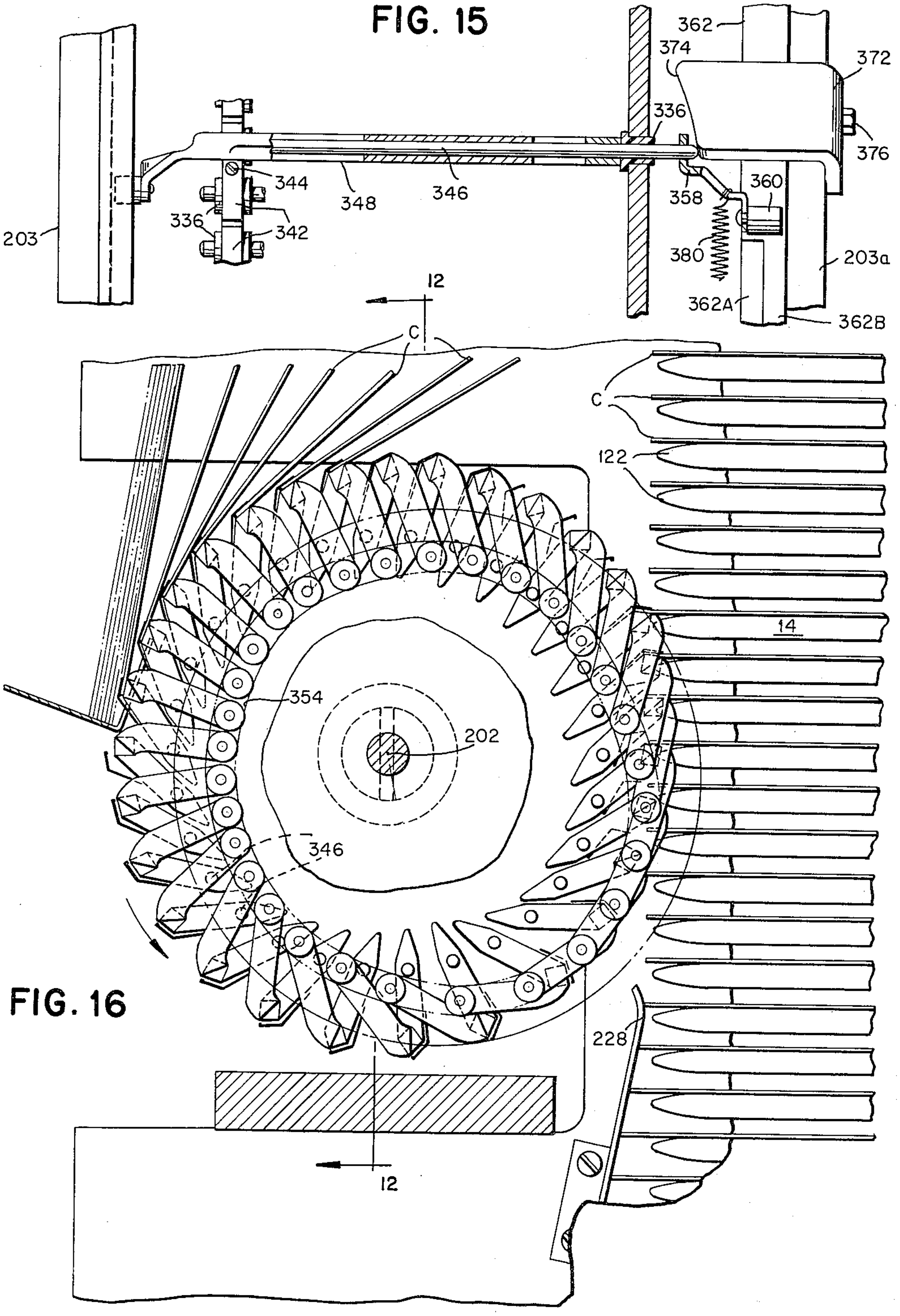
FIG. 15 is a top plan detail view taken substantially on the line 15—15 in FIG. 12 with parts broken away.
FIG. 16 is a simplified somewhat diagrammatic sectional view taken on the line 16—16 in FIG. 12.

Referring to FIGS. 3 and 4, a pair of sprockets 100 are fixed to the shaft 60. A pair of sprockets 102 are fixed to a shaft 104 that is journaled in a support member 106 that is fixed to the base plate 34 by a pair of bolts 108. A pair of bicycle type chains 110 are carried by the sprockets 100 and 102 and run in two front channels 112 and two rear channels 114. The front channels 112 are mounted directly on the base plate 34 whereas the rear channels 112 are mounted on brackets 116 that are fixed to the base plate by bolts 118. The chains 110 carry a plurality of card transporting units 120, best shown in FIG. 2. Each unit 120 comprises four paddle members 122 having spaces therebetween whereby a card may be inserted between two of said paddles and will rest on the upper side of the paddle member that is under the card until it is carried over the sprockets 100 and descends toward the selected card pocket 24 when the card then rests on the paddle 122 that forerly was above it. The relationship of the cards C and the paddles 122 is shown in FIG. 16. The last paddle of one unit 120 and the first paddle of the adjacent unit 120 also form a space for carrying a card but, as shown in FIG. 2, when the units 120 pass over the sprockets 100, this space opens up and the cards, which are then standing on edge would drop down to the chains 110. A pair of card guides 124, as shown in FIGS. 2 and 4, support each card at that time to prevent it from dropping down to the chains 110. The card guides 124 are mounted on the base plate 34.

Each paddle 122 carries a pin 126 in the shape of a sprocket tooth on the edge thereof as shown in FIGS. 5 and 6. The pins 126 mesh with crossbars 128 of the hereinbefore described chain 86 to provide accurate alignment of the paddles 122 with the card feed unit 48. The chain 86 is cammed toward the paddles 122 by a nylon guide member 130 that is mounted on a channel member 132 by angle members 134 and screws 136. The channel member 132 is mounted on the hereinbefore described frame member 80 by bolts 138.

*Selected card stacker*

Referring to FIG. 2, the selected card pushing and supporting belts 20 and 22 respectively are driven from the gear 64, FIG. 1, on the shaft 60, through an idler gear 142 that meshes with a gear 144 on a shaft 146. Shaft 146 is shown in FIG. 2. The shaft 146 is journaled in frame members 148, FIG. 4, that are mounted on the base plate 34. The shaft 146 carries a pair of sprockets 150 and a sprocket 152. Pairs of studs 154 and 154*a*, FIGS. 2 and 4, are mounted on a pair of brackets 155 bolted to the base plate 34 by bolts 156, FIG. 2, and have sprockets 157 and 157*a* rotatably mounted thereon. The belt 20 comprising a pair of chains 158, FIGS. 2 and 4, carrying card pusher segments 160, shown in FIG. 2, are mounted on the sprockets 150 and 157. The sprockets 157*a* are adjustable to take up slack in the chains 158.

Referring to FIG. 2, a shaft 162 that is mounted between frame members 164, FIG. 3, has a sprocket 166 rotatably mounted thereon. A second shaft 168 that also is mounted between the frame members 164 has a sprocket 170 rotatably mounted thereon. A third shaft 172 also is mounted between the frame members 164 and has a sprocket 174 rotatably mounted thereon. The belt 22 comprising a chain 176 carrying a plurality of card support segments 177 is mounted on the sprockets 166, 170 and 174. Pins 178 on the card support segments 177 run in grooves 179, FIG. 2 in the frame members 164 to support and guide the segments 177. A shaft 180 shown in FIG. 3, is journaled in the frame members 148 and 164 and carries a sprocket 182 and a gear 184. The gear 184 meshes with a gear 186 on the shaft 168. A chain 188, shown in FIGS. 2 and 3 is carried by the sprocket 182 and the sprocket 152 on the shaft 146. The drive for the unit 22, is therefore, from the shaft 60 through the gear 64, the idler 142, the gear 144 on the shaft 146, the sprocket 152 on the shaft 146, the chain 188, the sprocket 182, the shaft 180 and the gear 184 to the gear 186 on the shaft 168.

When a selected card C reaches the lower ends of the belts 20 and 22, it drops into the selected card pocket 24 that is of a well-known design comprising rectangular box having a movable bottom 189 that is mounted on a rod member 190 and is resiliently supported by a spring 191 so that the weight of additional cards moves the bottom downwardly until the box is filled to capacity.

*Contact storage drum*

Referring to FIGS. 3 and 4, the worm gear 65 on the shaft 60 meshes with a gear 192 on a vertical shaft 194 that is journaled in brackets 196 that are fixed to the base plate 34. A bevel gear 198, also shown in FIG. 12, meshes with a bevel gear 200 that is carried on a shaft 202. The shaft 202 is journaled in stacker drum side plates 203 and 203*a*, shown in FIG. 12, that are affixed to the base plate 34, and carries a pulley 204, shown in FIGS. 4 and 12, that through a belt 206 running over an idler 208, drives a pulley 210 on a shaft 212 that carries the hereinbefore referred to contact storage drum 26 that is enclosed in the housing 28. The housing 28 is mounted on the machine frame work by brackets 214 and bolts 216. The idler 208 is mounted on a shaft 218 that is journaled in the machine frame. The shaft 218 also carries a pulley 220, shown in FIG. 1. A stud 222 mounted on the machine frame carries a pulley 224. A belt 226 is carried by the pulleys 220 and 224. When cards are inserted into the transit storage belt 14 from the card feed unit, they overshoot and are stopped by the belt 226 that moves at the same speed as the belt 14. The cards are urged back into the belt 14 by the belt 226 and are further positioned by contact with a guide plate 227 relative to the reject stacker 16. The pulleys 220 and 224 and the belt 226 comprise the hereinbefore referred to card aligning device that is generally designated 66. A pair of guide members 228 and 229 are positioned opposite the card guide 227 to prevent the cards from being pushed too far to the right, as viewed in FIGS. 1 and 20.

Figure 7:
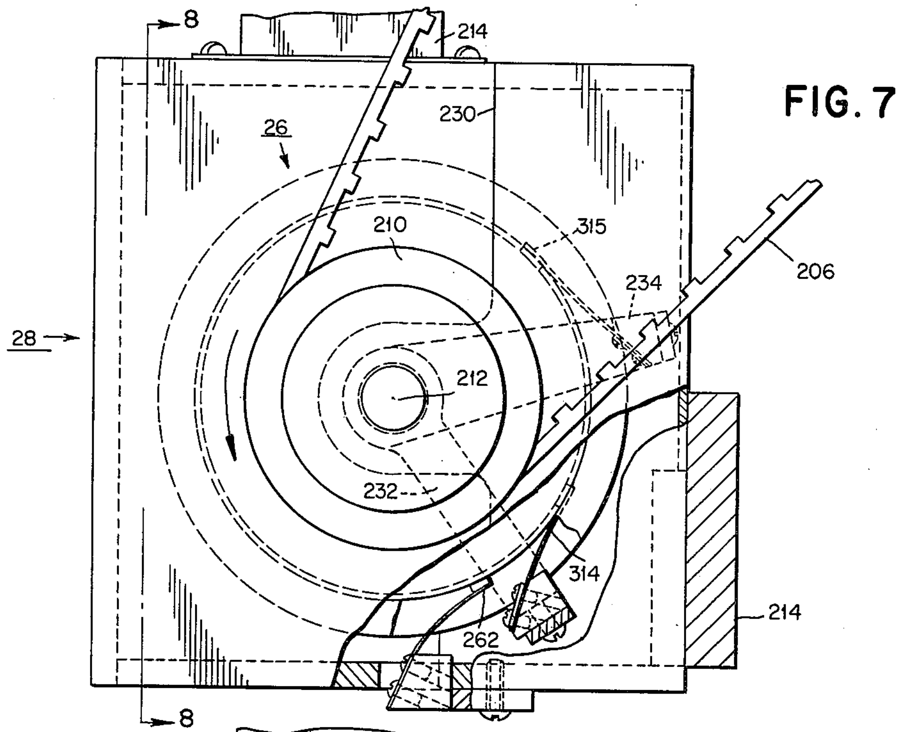
FIG. 7 is a front elevation of the contact storage drum with parts broken away.
Figure 8:
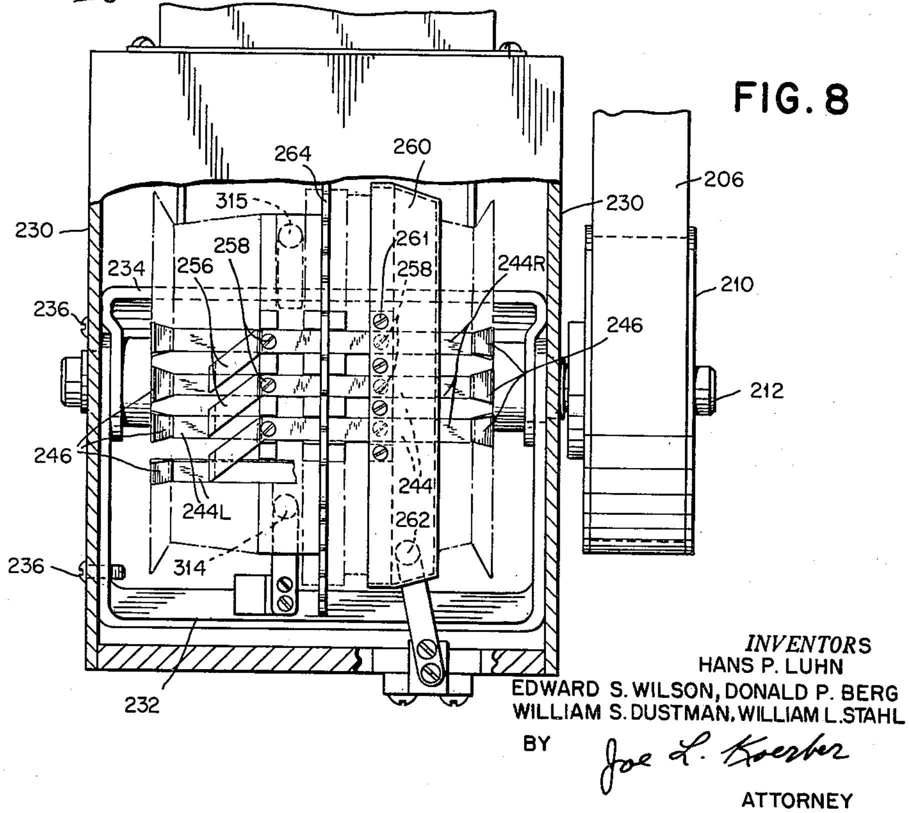
FIG. 8 is a section taken on the line 8—8 in FIG. 7.
Figure 9:
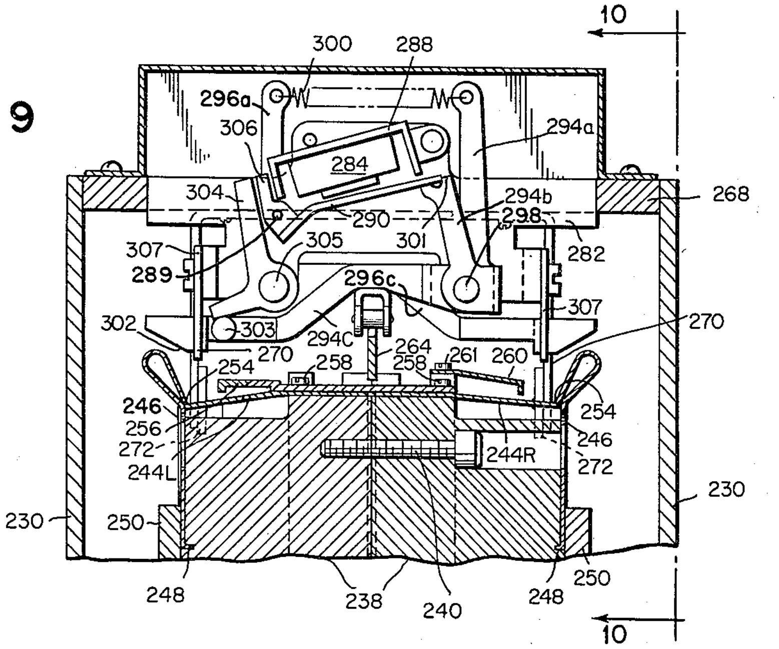
FIG. 9 is a section taken on the line 9—9 in FIG. 10.
Figure 10:
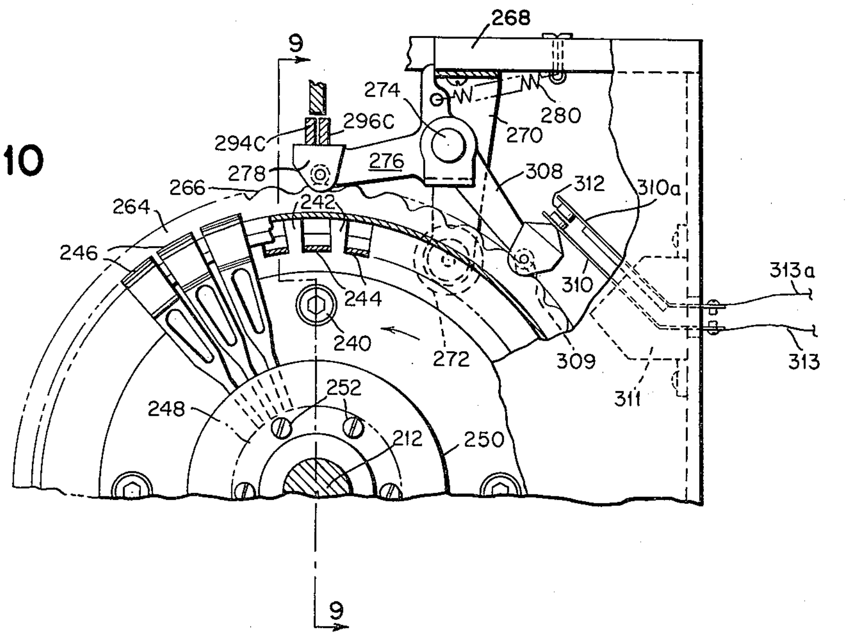
FIG. 10 is a partial side elevation taken in direction 10—10 in FIG. 9 with parts broken away.

The contact storage drum 26, contained in the housing 28, is shown in FIGS. 7, 8, 9, and 10. The shaft 212 is journaled in a pair of parallel frame members 230. Referring first to FIG. 7, a pair of U-shaped members 232 and 234 are pivotally mounted on the shaft 212 and are retained in position by screws 236 through one frame member 230 and the U-shaped members 232 and 234. The drum rotates in a counterclockwise direction as viewed in FIGS. 7 and 10. Referring to FIG. 9, the drum 26 comprises two cylindrical sections 238 of non-conducting material held together by countersunk screws 240. The periphery of each of the sections 238, contains thirty-six evenly spaced teeth 242, as shown in FIG. 10. In the spaces between the teeth 242, thirty-six conducting spring blades 244 are placed, as shown in FIGS. 9 and 10. The blades 244, the respective ends being designated 244L (Left) and 244R (Right) extend the width of both of the sections 238 and are adapted to be latched under tension by latch spring members 246 that engage grooves 248 in the sections 238 and are retained by circular non-conducting plates 250 that are held in place by screws 252. The ends of the spring contacts 244 are engaged by the looped ends 254 of the latch member 246.

Offset contact members 256, shown in FIGS. 8 and 9, are placed atop the spring members 244 and the members 244 and 256 are held in place by screws 258. Each contact 256 is in contact with the spring member 244 thereunder, and also is shaped to cross over and contact the adjacent member 244 as shown in FIG. 8. A contact ring 260 is mounted on the right-hand non-conducting section 238 by screws 261 and is adapted to be contacted by the spring members 244R when they are unlatched from the latch members 246 and are allowed to spring upwardly. A contact 262 that is mounted on the frame member 230 wipes on the ring 260.

Referring to FIGS. 9 and 10, a ring 264 having thirty-six teeth 266 is mounted at the joint of the sections 238. An inverted U-shaped member is screwed to a frame piece 268 that separates the frame members 230. Each side 270 of the U-shaped member has a roller 272 rotatably mounted thereon and adapted to cam down and relatch the ends of the spring contact members 244 as the latter pass the rollers 272. A shaft 274 is mounted between the sides 270 of the U-shaped member and pivotally supports a reset lever 276 that carries a roller 278 that is adapted to act with the teeth 266. The reset lever 276 is biased in a clockwise direction by a spring 280.

A plate 282, shown in FIG. 9, is fastened to the frame member 268 and has two electromagnets 284 and 286 affixed, one to each side thereof, by brackets 288. Only the electromagnet 284, further designated "group magnet," and one bracket 288 are visible in FIG. 9, the select magnet 286 being hidden behind the plate 282 and being slanted upwardly to the left rather than upwardly to the right as in the case of the group magnet 284. An armature 290 for the group magnet 284 is pivoted at its left end on the pin 289. An armature 292 for the select magnet 286 is pivoted at its right end. A bell crank comprising arms **294*a*, 294*b*, and 294*c*, cooperates with the armature 290 and a similar, but reversed, bell crank comprising arms 296*a*, 296*b*, and 296*c*, cooperates with the armature 292. It will be understood that the following description applies equally to both bell cranks 294 and 296 which are pivoted on studs 298 and 298*a* in the plate 282. The two bell cranks are biased one toward the other by a spring 300. A lug 301 on the bell crank arm 294*b* (or 296*b*) engages the armature 290 (or 292) and is held against the tension of the spring 300. When the electromagnet 284 (or 286) is energized, the armature 290 (or 292) is attracted, the lug 301 is disengaged, and the bell crank 294 (or 296) is pivoted in a counterclockwise (or clockwise) direction. A cam surface 302 on the bell crank arm 294*c* (or 296*c*) flexes the spring latch 246 outwardly thereby releasing the latched end of the spring member 244 which springs upwardly into contact with the member 256 (or 260). When either bell crank 294 or 296 is actuated, the reset lever 276 is pushed downwardly between teeth 266 against the tension of the spring 280. As soon as the electromagnet is deenergized, the reset lever 276 is pivoted in a clockwise direction by its spring 280 and carries both crank arms 294*c* and 296*c* upwardly. Studs 303 on the arms 294*c* and 296*c* actuate knock-off levers 304 that are pivoted on studs 305 in the plate 282. The knock-off levers 304 strike extensions 306 of the armatures 290 and 292 and knock them off the electromagnets if they happen to be held there by residual magnetism. The bell cranks 294 and 296 are pivoted far enough that the armature ends latch the lugs 301. A pair of guide members 307 having inverted open end slots act as guides for the bell crank arms 294*c* and 296*c*. The teeth 266 act as timing interlocks so that contact members 244 are properly positioned when released. The rollers 272 are positioned to relatch each contact 244 thirty-four spaces after it is unlatched, where a space is the distance between adjacent contacts 244**.

Referring to FIG. 10, a lever 308, similar to the lever 276, also is mounted on the shaft 274, and similarly carries a roller 309 adapted to act with the teeth 266. The lever 308 is biased in a clockwise direction against the teeth 266 by a contact spring blade 310 that is mounted on the housing 230 by means of an insulating block 311. The spring blade 310 and a blade **310*a* carry contacts 312 that are adapted to be opened and closed alternately for use in an error checking circuit that is described hereinafter, in the circuit description. The contact blades 310 and 310*a* are connected to leads 313 and 313*a***.

A contact 314, FIG. 7, is mounted on the U-shaped bracket 232 and wipes each contact member 256 twenty-five card spaces after it is closed. The contact 314 is used in selecting cards in a manner to be described hereinafter.

A contact 315, FIG. 7, is mounted on the U-shaped bracket 234 and wipes each contact member 256 thirty-two spaces after the contact is closed. The contact 315 is used in an error circuit in a manner to be described hereinafter.

Assume for example that a group of four cards A1, A2, A3 and A4 is followed by a group of four cards B1, B2, B3, and B4, that is followed by a group comprising a single card C1, that in turn is followed by a group comprising a single card D1. Assume further that the cards A3 and D1 contain data that will cause those cards and, in the case of the multiple card group, the cards A1, A2, and A4, to be selected. The electromagnets 284 and 286 are actuated selectively through circuits that are described hereinafter in the circuit description. Means for actuating the select magnet 286 are conditioned each time a card is sensed that contains matching data indicating that the matching card and all cards in the same group are to be selected. The select magnet 286 is actuated at the end of the group containing the matched card. The group magnet 284 is actuated for each card sensed, except for the last card of a group and closes the contact 244L of the adjacent contact strip 244.

In the case of a one-card group, that card also is the last card of a group and the group magnet 284 is not actuated.

Figure 11:
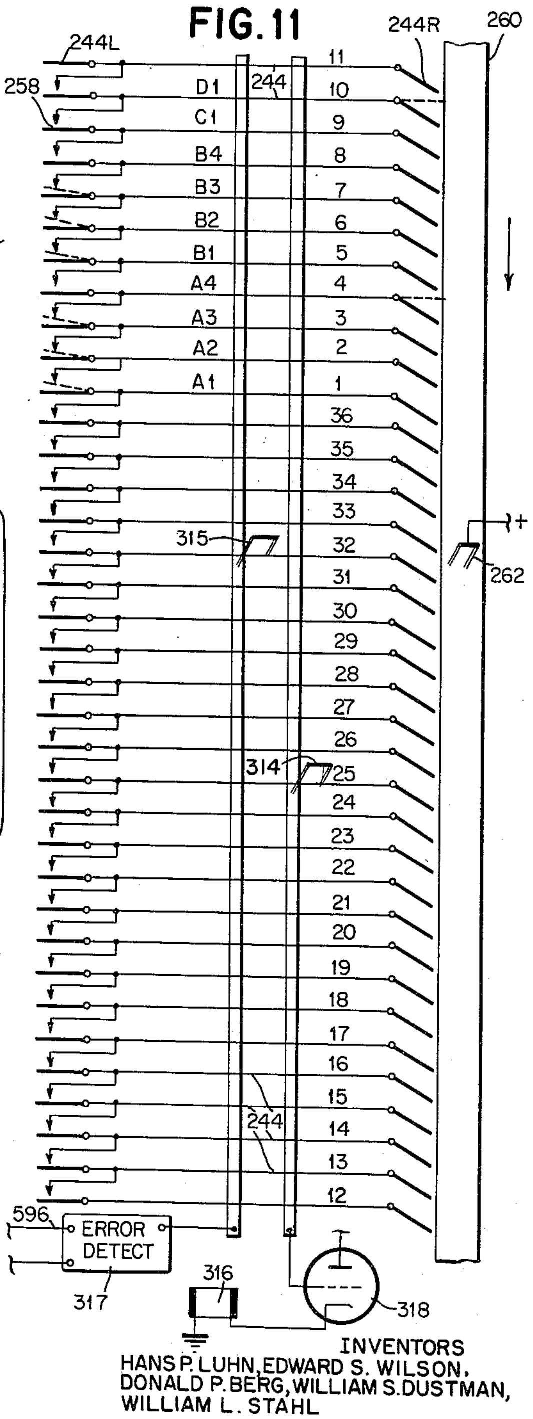
FIG. 11 is a schematic showing of the contact storage drum.

Referring to FIG. 11, a schematic representation is shown including the common contact ring 260, the common brush 262, the contact strips 244 and the latched ends thereof 244L and 244R, the selecting brush 314, the crossover contacts 258, a select solenoid 316, an error detect brush 315, and an Error Detect Unit 317. The unit is described hereinafter in the circuit description. The contacts 244 corresponding to the various cards in the groups A, B, C, and D are indicated in FIG. 11. The contact drum 26 rotates in the direction of the arrows in FIGS. 7 and 11, and as the ten numbered cards are sensed, the following contacts are closed by actuation of the electromagnets 284 and 286.

| Cards Sensed | Contacts Actuated | |
|---|---|---|
| | 244L | 244R |
| A1 | Closed | |
| A2 | do | |
| A3 | do | (Actuating means conditioned.) |
| A4 | | Closed. |
| B1 | Closed | |
| B2 | do | |
| B3 | do | |
| B4 | | |
| C1 | | |
| D1 | | Conditioned and Closed. |

Each time a circuit is completed between the brushes 262 and 314, the card then opposite the reject stacker 16 is permitted to pass on to the select stacker pocket 24 because a triode 318 having the select solenoid 316 in its cathode circuit is fired and the solenoid 316 is energized to disable the reject stacker fingers adjacent the card. The triode is shown in FIG. 11. When the above described circuit is completed from the brush 262 to the brush 314, the triode grid is positively biased and the triode that is normally non-conducting conducts. Twenty-five cards after the card A1 is sensed, the contact strip 244 comes under the select brush 314 and the card A1 is opposite the reject stacker 16. The group comprising the cards A1 through A4 is to be selected and a circuit is complete from the common brush 262, through the common ring 260 the closed contact 244R–A4, the contact strip 244–A4, the contact 258–A4, the contact 244L–A3, the contact 258–A3, the contact 244L–A2, the contact strip 244–A2, the contact 258–A1, the contact 244–A1, and the select brush 314 to the select solenoid 316, thereby disabling gripper fingers 371, FIG. 17, described hereinafter, that normally remove the card A1 to the reject hopper 18. One card space later the strip 244–A2 comes under the brush 314 and the circuit is as follows: Brush 262, ring 260, contact 244R–A4, contact 258–A4, contact 244L–A3, contact 258–A2, contact 244L–A2, the strip 244–A2, brush 314, to the solenoid 316. One card space later the contact strip 244–A3 comes under the brush 314 and the circuit is as follows: Brush 262, ring 260, contact 244R–A4, the contact 258–A4, the contact 244L–A3, the contact strip 244–A3, and the brush 314 to the solenoid 316. One card space later the strip 244–A4 comes under the brush 314 and the circuit is as follows: Brush 262, ring 260, contact 244R–A4, strip 244–A4, and brush 314 to the solenoid 316.

One card space after the strip 244–A4 is under the brush 314, the strip 244–B1 comes thereunder. The group comprising the cards B1 through B4 is not to be selected. Since the contact 244L–A4 is open, a circuit is not complete from the ring 260 through the contact 244L–A4 to the contact 258–B1. If a circuit is completed it must be through one of the contacts 244R–B1 through 244R–B4 and since none of the latter contacts are closed, a circuit is not complete to the solenoid 316 even though the contacts 244L–B1 through 244L–B3 are closed.

Twenty-five card spaces after the sensing of the card C1, the strip 244–C1 comes under the brush 314. The contact 244R–C1 is not closed so the solenoid 316 is not actuated at that time. One card space thereafter, the strip 244–D1 comes under the brush 314, a circuit is complete from the brush 262 through the ring 260, the closed contact 244R–D1, the strip 244–D1, and the brush 314 to the solenoid 316 and the card D1 is permitted to pass the reject stacker and proceed to the select pocket 24.

*Reject stacker*

Figure 19:
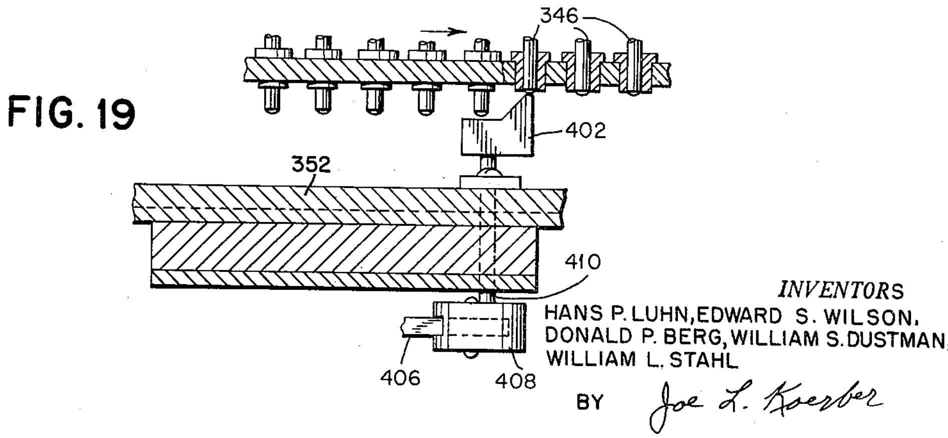
FIG. 19 is a section taken on the line 19—19 in FIG. 12 with the cam rotated 90 degrees.
Figures 12, 12A:
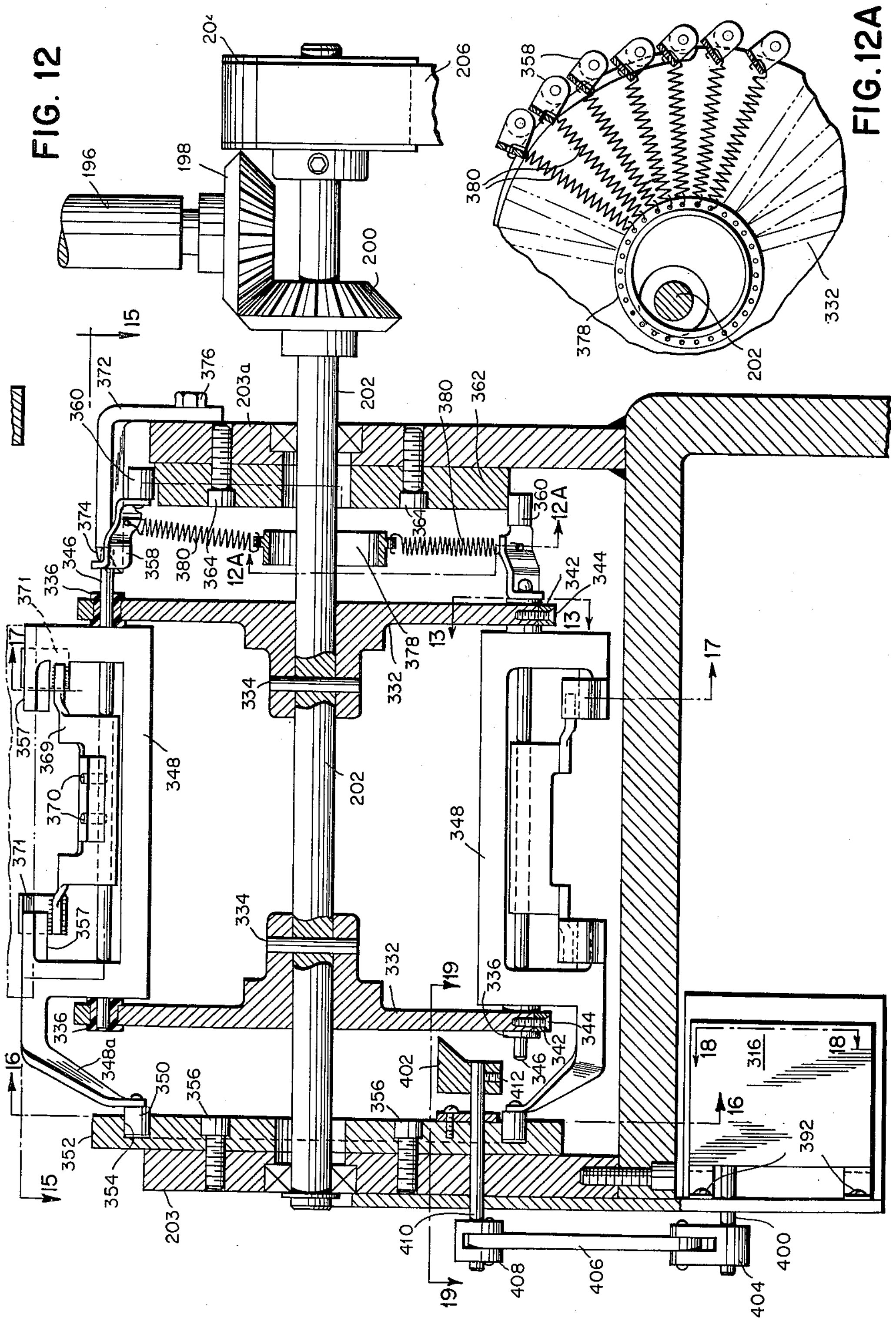
FIG. 12 is a transverse section through the stacker taken in the direction 12—12 in FIG. 16.
FIG. 12A is a section taken on the line 12A—12A in FIG. 12.
Figure 13:
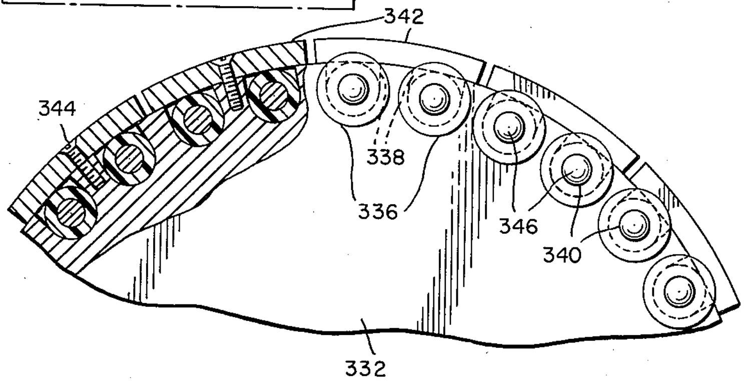
FIG. 13 is a section taken on the line 13—13 in FIG. 12.
Figure 14:
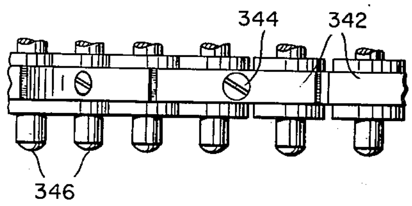
FIG. 14 is a section taken on the line 14—14 in FIG. 13.
Figures 17, 21:
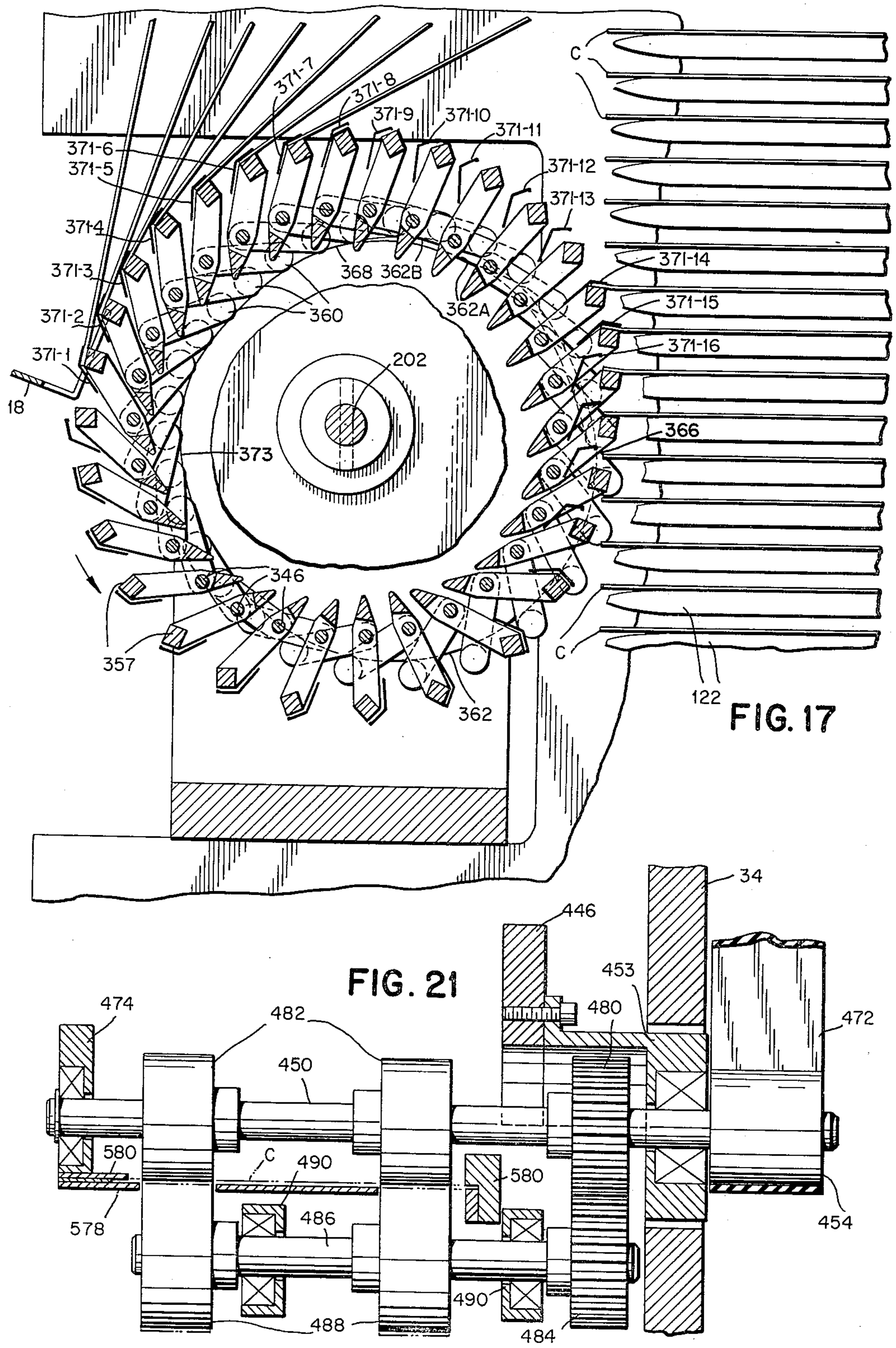
FIG. 17 is a simplified somewhat diagrammatic sectional view taken on the line 17—17 in FIG. 12.
FIG. 21 is a section taken on the line 21—21 in FIG. 20.

The general location of the reject stacker 16 is shown in FIG. 1. Similar views, enlarged and in section are shown in FIGS. 16 and 17. Other partial views are shown in FIGS. 12, 15, and 19. Referring to FIG. 12, the shaft 202 has a pair of circular plates 332 pinned thereto by pins 334. Each plate 332 has thirty nylon bushings 336 mounted therein, in a circle concentric with the plate 332 and spaced equidistantly one from the other. The manner of maintaining the bushings 336 is illustrated in FIGS. 13 and 14. Each plate 332 has a plurality of recesses 338 into which notches 340 in the bushings 336, fit. Arcuate members 342 are fixed to the plates 332 by screws 344 and each member 342 retains two bushings 336.

Rods 346 are slidably supported in aligned pairs of bushings 336 in the plates 332. Each rod 346 has a U-shaped member 348 pivotally mounted thereon as shown in FIG. 12. Each member 348 has an arm **348*a* that has a roller 350 rotatably mounted thereon. A face cam 352 having a cam track 354 is fixed by bolts 356 to the stacker support plates 203. The rollers 350 follow the cam track 354 and pivot the members 348 about the shafts 346 in accordance with the configuration of the cam track 354 as shown in FIG. 16. Each member 348 carries a pair of gripper members 357, shown in FIGS. 12 and 17. On the right-hand end of each rod 346, as viewed in FIGS. 12 and 15, an arm 358 is fixed and a roller 360 is pivotally mounted on the arm. An external cam 362, shown in FIGS. 12, 15, and 17, is fixed by bolts 364 to the frame piece 203*a*. The cam 362 comprises a single cam surface throughout most of its circumference but for approximately ninety degrees of its circumference between the points 366 and 368, in FIG. 17, comprises a lower cam surface 362A and an upper cam surface 362B, that are also partially shown in FIG. 12. Normally, the rollers 360 ride on the lower cam surface 362A, but, when a rod 346 is moved to the right in a manner to be described hereinafter, the associated roller 360 rides on the upper cam surface 362B**.

A member 369 is fixed to each shaft 346 by a pair of set screws 370. Each member 369 carries a pair of flexible gripper fingers 371 that co-act with the gripper members 357 to grip record cards when it is desirable to do so. Under the influence of the cams 354 and 362, the gripper fingers 371 and the gripper members 357 are held apart from a point 373 where they pass the reject hopper 18 to the point 366 that is indicated in FIG. 17. Just prior to reaching the point 366, the members 357 and 371 are separated even further. When a particular pair of gripper fingers 371 and the associated gripper members 357 reach the point 366, the rod 346 and roller 360 associated with the particular members 361 and 357 are shifted to the right, if the card then opposite the point 366 is to be permitted to pass on to the select pocket 24, so that the roller 360 rides on the upper cam surface 362B. If the card is to be rejected, the rod 346 and roller 360 are not shifted to the right and the roller 360 rides on the lower cam surface 362A.

A reset cam 372 having a cam surface 374, shown in FIGS. 12 and 15, is fixed to the machine frame by a bolt 376. As the reject stacker 16 rotates, each rod 346 passes the point 368 where the split cam surfaces 362A and 362B come together, and passes the cam surface 374. If a particular rod 346 was shifted to the right, as described hereinbefore, the cam surface 374 resets it back to the left.

Referring to FIGS. 12, 12A and 15, means are provided for keeping the rollers 360 in contact with the external cam 362. A ring 378 encircling the shaft 202 is resiliently connected to the arms 358 by springs 380. The ring 378 is free floating about the shaft 202 and the action of the springs 380 holds the roller 360 in contact with the cam 362 at all times.

Referring to FIGS. 16 and 17, the cards C resting on the paddle members 122 are moved upwardly and are urged into position by the hereinbefore described belt 226 and the guide members 227, 228 and 229. As each card C comes opposite the reject stacker 16, the left end thereof moves between a pair of the gripper members 357, described hereinbefore, and the associated flexible gripper fingers 371. The gripper fingers and gripper surfaces move in a counterclockwise direction about the shaft 202 and when the fingers 371 grip a card, the card is withdrawn from the belt 14 that is moving upwardly. Approximately one-half revolution of the shaft 202 after the card is gripped by the fingers 371, the leading edge of the card reaches the bottom of the card hopper 18 and the gripper fingers 371 and gripper members 357 are cammed apart by the cams 362 and 354 to release the card.

As shown in FIG. 17, seven consecutive gripper fingers that are designated 371–1 through 371–7 are shown carrying cards C to the hopper 18; the next six fingers 371–8 through 371–13 have their associated rollers 360 riding on the upper cam surface 362B, as shown in FIG. 17, whereby the fingers 371 are prevented from closing on the cards C, and the cards move upwardly in the belt 14 past the reject stacker 16; the next two fingers 371–14 and 371–15 are shown gripping cards and the associated rollers 360 are shown riding on the lower cam surface 362A. The fingers 371–16 are open and the associated roller 360 has not yet reached the point 366 so it is not apparent whether the fingers 371–16 will grip the associated card.

Figure 18:
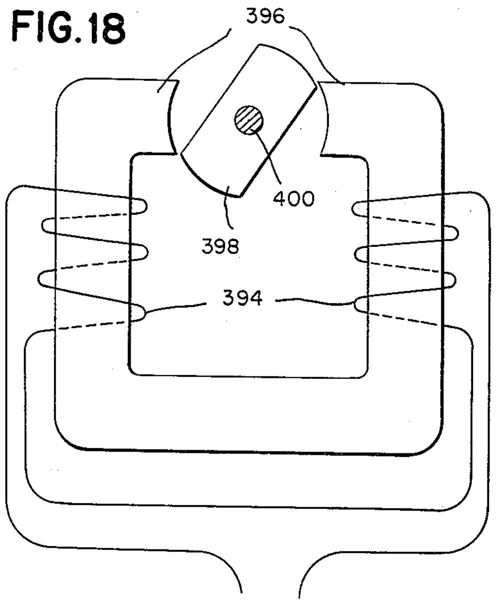
FIG. 18 is a section taken on the line 18—18 in FIG. 12.

Referring to FIG. 12, the select solenoid 316, shown schematically, is fixed to the framework by screws 392. The solenoid is shown in detail in FIG. 18 and is of the type used in the well-known Veeder type counter comprising a pair of field coils 394, a pair of pole pieces 396, and an armature 398, pivoted between the pole pieces 396 on a shaft 400. When the field coils 394 are energized, the armature 398 is pivoted into alignment with the pole pieces 396. When the field coils are deenergized, the armature returns to its normal position by virtue of the weight of a cam member 402 and the intervening linkage described hereinafter. The shaft 400 has a link 404 fixed thereto that is pivotally pinned to one end of a rod 406, as shown in FIGS. 1 and 12, the other end of the rod 406 is pivotally pinned to a link 408 that is fixed to a shaft 410. The shaft 410 is journaled in the machine framework and the fixed cam 352 and has the hereinbefore referred to cam member 402 affixed thereto by a set screw 412. When the solenoid 316 is energized, in a manner described hereinafter in the circuit description, the shaft 400 is rotated as described, and, through the links 404 and 408, the shaft 410 is rotated. Rotation of the shaft 410 swings the cam member 402 into a position to engage the hereinbefore described rods 346, as shown in FIG. 19, whereby the rod 346 and the attached roller 360 are shifted to the right so that the roller 360 is caused to ride on the upper cam surface 362B thereby preventing the associated fingers 371 from gripping the card.

In accordance with the foregoing description, each card C, as it comes opposite the reject stacker 16, is stacked in the hopper 18 unless a signal is sent to the solenoid 316 at the time the card is in a position to be gripped by the fingers 371. When the solenoid is so actuated, the shaft 346 is cammed to the right, as described. When the cammed rod 346 passes the reset cam 372, it is returned to the left to its normal position.

*Reject hopper*

The reject stacker 18, shown in FIG. 1, is bolted to the machine framework and comprises a trough having a rear side 414 that is higher than a front side 416, and a slotted end flange 418 adjacent the stacker 16. The cards are deposited on end inside the flange 418. An electric vibrator 420 that vibrates at line frequency is mounted on the lower side of the hopper 18 and jostles the cards C so that they advance up the inclined hopper as additional cards are stacked therein by the stacker 16.

*Card feed hopper*

Figure 20:
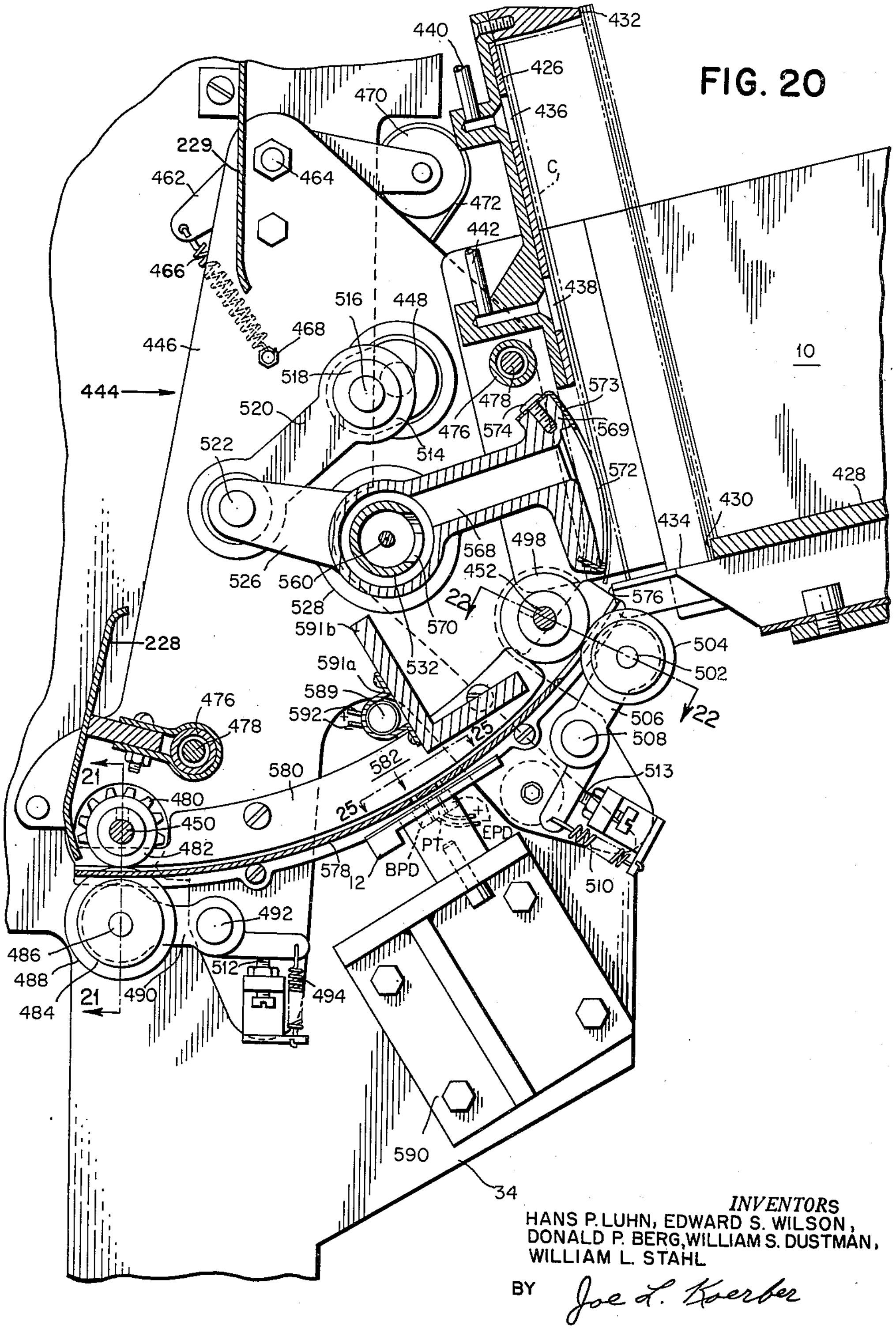
FIG. 20 is a section taken on the line 20—20 in FIG. 23.

Referring to FIGS. 1 and 20, the card feed hopper 10 is similar to the reject hopper 18 and similarly is provided with an electric vibrator 424, FIG. 1, to jostle the cards C down the inclined hopper against a vacuum plate 426. If the weight of a complete hopper full of cards were allowed to rest against the vacuum plate 426, difficulty would be encountered in feeding the cards one at a time from the bottom of the stack. To relieve this pressure, the floor 428 of the hopper 10 contains a step 430 and at the top of the hopper a stop 432. When a card reaches the step 430, it is jostled off the step by the vibrator 424, down to the surface 434, and the top end of the card slips under the card stop 432. The cards remaining on the surface 428 and behind the stop 432 do not rest their weight on the cards that have dropped off the step 430 to the surface 434. The vacuum plate 426 contains an upper pair 436 and a lower pair 438 of vacuum ports that are connected through tubes 440 and 442 respectively to a vacuum supply that is described hereinafter. Vacuum applied through the ports 436 and 438 grips the lowermost card in the hopper 10.

*Card feed*

A card feed unit 444, FIGS. 1 and 20, is positioned adjacent the hopper 10 to feed the cards C one at a time. Referring to FIG. 2, a plate 446 is bolted to the base plate 34. The hereinbefore described pulley 46 is mounted on a shaft 448, FIG. 4, that is journaled in the plate 446. A pair of shafts 450 and 452, FIGS. 4 and 20, are journaled in the plate 446 and carry respectively steel rollers 454 and 456, FIG. 4. A shaft 458, FIG. 4, is journaled in the base plate 34 and carries a roller 460. Referring to FIG. 20, a bell crank 462 is pivotally pinned by a nut and bolt 464 to the plate 446 and is biased counterclockwise, as viewed in FIG. 20 by a spring 466 that is pinned to a bolt 468 in the plate 446. The bell crank 462 has a steel roller 470 rotatably mounted thereon. A belt 472 runs on the pulley 46 and the rollers 454, 456, 460, and 470. The spring biased roller 470 keeps the belt 472 under tension and the roller 460 serves merely as a guide roller.

The shafts 450 and 452 also are journaled in a front plate 474, shown in FIGS. 1 and 21, that is parallel to the plate 446 and spaced therefrom by spacers 476 and bolts 478, as shown in FIGS. 1 and 20.

Referring to FIG. 21, the shaft 450 carries a gear 480 and also a pair of steel card feed rollers 482. The gear meshes with a gear 484 carried on a shaft 486. The shaft 486 carries a pair of rubber covered feed rolls 488 and is rotatably mounted in a bracket 490, shown in FIG. 20, that is pivoted on a shaft 492 fixed in the plate 446 and is spring biased by a spring 494 whereby the feed rolls 488 are kept in yielding contact with the feed rolls 482.

Referring to FIGS. 20 and 22, the shaft 452 carries a gear 496 and also a steel card feed roll 498. The gear meshes with a gear 500 carried on a shaft 502. The shaft 502 carries a rubber covered feed roll 504 and is rotatably mounted in a bracket 506, shown in FIG. 20, that is pivoted on a shaft 508 that is fixed in the plate 446 and is spring biased by a spring 510 whereby the feed roll 504 is kept in yielding contact with the feed roll 498. The feed rolls 488 and 504 are kept from exerting excessive pressure on the associated feed rolls 482 and 498 by adjustable stops 512 and 513, shown in FIG. 20, against which the brackets 490 and 506 are biased by the springs 494 and 510.

The feed rolls 498, 504, 482, and 488, are constantly rotating at the same peripheral speeds and in directions adapted to move a card C to the left as viewed in FIGS. 1 and 20, and the pairs of feed rolls are so spaced that the rolls 482 and 488 will engage a card before it is disengaged by the rolls 498 and 504.

Figures 23, 24:
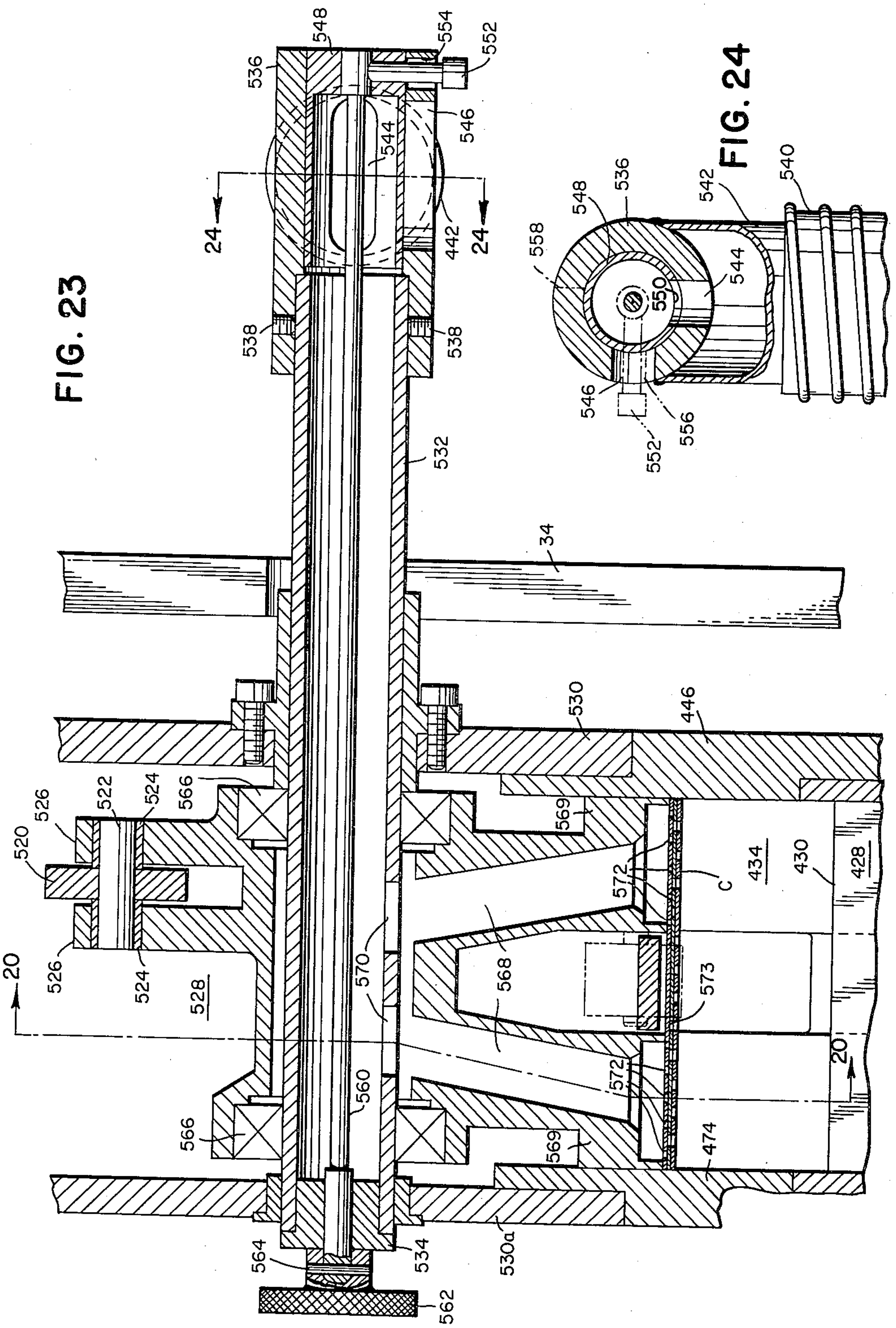
FIG. 23 is a section taken on the line 23—23 in FIG. 2.
FIG. 24 is a section taken on the line 24—24 in FIG. 23.

Referring to FIG. 20, the shaft 448 extends through the plate 446 and, on the front side thereof, has a crank 514 pinned thereto. The crank 514 carries a stud 516 located eccentrically from the shaft 514, and the stud in turn rotatably joins a bearing 518 that is fixed in a crank 520 that also is shown in FIG. 23. The opposite end of the crank 520 carries a pin 522 and a bearing 524, FIG. 23, through which the pin 522 is rotatably joined with a pair of arms 526 of a vacuum unit 528.

Referring to FIGS. 23 and 24, the vacuum unit 528 is mounted on the plates 446 and 474 by circular plates 530 and 530*a*. A vacuum cylinder 432 is fixedly mounted in the plates 34, 530 and 530*a* and is closed at one end by a cap 534. The cylinder 532 is joined to a cylindrical chamber 536 in an airtight manner and is held by set screws 538. A hose 540 is joined to the cylinder 536 through a connector tube 542. The cylinder 536 contains two elongated openings 544 and 546. The opening 544 is to the hose connector 542 through which vacuum is supplied from a source described hereinafter, and the opening 546 is to the atmosphere. A valve member 548 having an elongated opening 550 similar to the openings 544 and 546 in the cylinder 536 fits snugly inside the cylinder 536. When the valve member 548 is rotated to align the hole 550 with the vacuum hole 544, the vacuum cylinder 532 is connected with the vacuum supply. When the valve member 548 is rotated to align the hole 550 with the atmosphere hole 546, the vacuum cylinder 532 is connected with the atmosphere. A pin 552 is mounted in the valve member 548 to determine the limits of movement of the valve and operates in a slot 554 in the cylinder 536, the ends of the slot being indicated in FIG. 24 as 556 and 558. When the pin 552 is at the end of the slot designated 556, the valve is connected to the vacuum supply. When pin 552 is at the end of the slot designated 558, the valve is connected to the atmosphere. The valve member 548 is operated by a rod 560 that extends axially of the vacuum cylinder 532 and through the cap 534. The rod 560 is rotated by a knurled knob 562 that is fixed to the rod 560 by a pin 564.

The vacuum unit 528 is rotatably mounted on the vacuum cylinder 532 by bearings 566 and is oscillated through the linkage members 520 and 514 as the shaft 448 rotates. Two vacuum channels 568 are connected with the vacuum cylinder 532 through vacuum ports 570 and to twin vacuum heads 569. The vacuum is applied to the cards C through slotted ports 572 contained in a vacuum head shoe 573 that is held on the heads 569 by screws 574 as shown in FIGS. 2, 20, and 23.

When a card is to be fed to the feed rolls 498 and 504, the vacuum applied through the ports 570 and 572 draws the lower end of the first card C against the vacuum heads 569, thus moving it clear of the edge 576 of the hopper floor plate 434, as shown in FIG. 20. When the vacuum unit 528 is rocked in a clockwise direction, the first card is gripped by the vacuum through the ports 572 and slides across the hereinbefore described vacuum ports 436 and 438. When the first card moves clear of the ports 436 and then the ports 438, the next card is attracted thereto. Consequently, the next card is held by the vacuum through the ports 436 and 438 and by the card hopper surface 434 since only the first card was moved clear of the edge 576.

Vacuum is supplied to the vacuum tubes 440, 442, and 540, from an ordinary exhaust blower that is driven by a motor M2. The blower and motor may be of conventional design and therefore are not shown. The vacuum supply is represented in FIG. 24 by the vacuum hose 540. The motor M2 is shown circuitwise in FIG. 94.

Referring to FIGS. 20 and 22, a card is fed through the feed rolls 498 and 504 onto an arcuate card bed 578 and into the card feed rolls 482 and 488. A card C (shown in dotted outline in FIG. 21) is held in close contact with the card bed 578 by card guides 580 at each side of the card bed 578.

Figure 25:
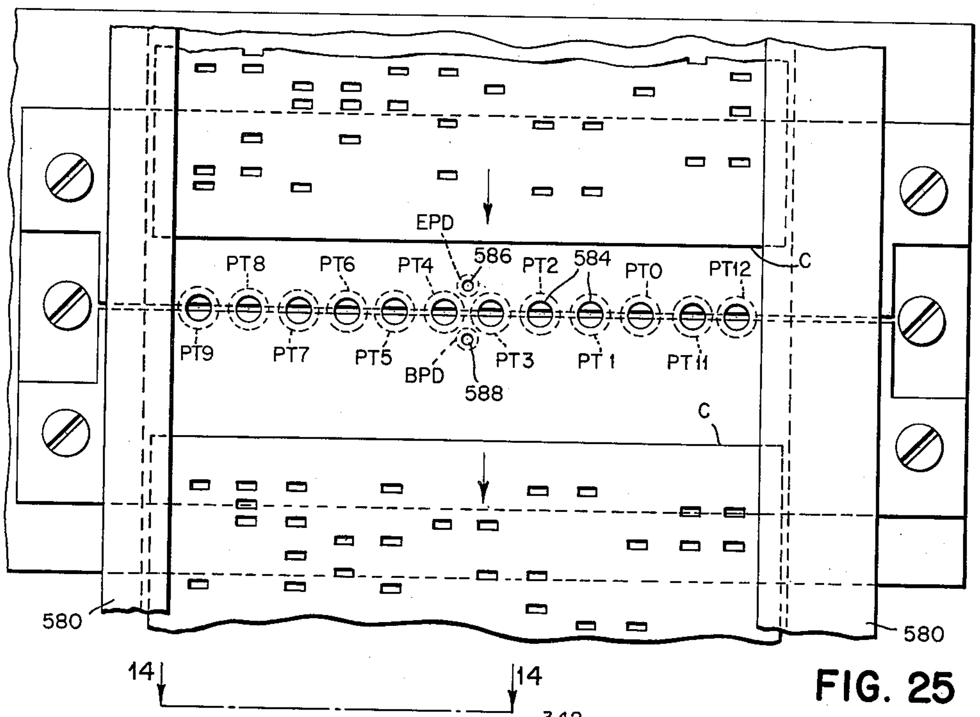
FIG. 25 is a section taken on the line 25—25 in FIG. 20.

Referring to FIG. 20, a plurality of holes are arranged in the card bed 578 at a point designated 582 and are shown in FIG. 25. Twelve holes 584 are arranged in a row transversely of the direction of card travel and are so spaced that the twelve rows of punch positions on the well-known Hollerith type cards align therewith when a card is fed from the hopper 10.

Two holes 586 and 588 are arranged adjacent the row of holes 584 so that the hole 586 is covered by a card before the holes 584 and the hole 588 is covered after the holes 584. The hereinbefore referred to scanning unit 12, comprising twelve photo-transistors PT12–9 (12, 11, 0, 1, 2, 3, 4, 5, 6, 7, 8, 9), the beginning of card photo diode BPD and the end of card photo diode EPD, is mounted on a bracket 590 on the base plate 34 beneath the holes 584, 586 and 588. The photo transistors PT12–9 are positioned one under each of the holes 584. The end of card photo diode EPD is positioned under the hole 586 and the beginning of card photo diode BPD is under the hole 588. A light 589, extending the full length of the row of holes 584 is mounted by a clamp 591*a* on a bracket 591*b* that is screwed to the plate 474, as shown in FIG. 1. Electrical connections are made to the light 589 through leads 592.

Figure 26:
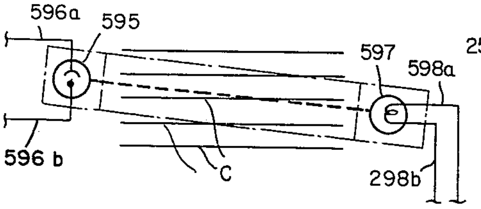
FIG. 26 is a schematic showing of the photoelectric error check unit.

Referring again to FIG. 1, a photo-electric unit 593 is fixed to the base plate 34 by a bracket 594. The photo-electric unit is shown schematically in FIG. 26 and comprises a photocell 595 having lead wires 596*a* and 596*b* and a light source 597 having lead wires 598*a* and 598*b*. The cell 595 and the light 597 are mounted at opposite ends of a bracket 599, shown in FIG. 1. The cell and light are separated sufficiently to allow the cards C in the belt 14 to pass therebetween as indicated in FIG. 26 and are positioned at an angle to the cards so that each card, as it passes therebetween, breaks the light beam from the light 597 to the cell 595 thereby effecting an output from the cell. The function of the photo-electric unit is described in detail hereinafter in the circuit description.

A fragment of a detail card is shown in FIG. 95 indicating the sequence field, classification field, start search symbol, stop search symbol and group end symbol. It will be understood from the description hereinafter that the stop search and group end symbols need not appear on the same card since a group end signal may be plug wired to act as a stop search signal as well as a group end signal. It will also be understood that data carried by the card may be varied within the scope of this invention.

*General circuit description*

Before searching operation commences, the data that is to be searched for is punched in a question card in a hereinafter described two-out-of-twelve code, and the question card is inserted in a comparator unit. The panel board terminals are plug wired, in a manner described hereinafter, in accordance with the combination of data that satisfy the questions being searched.

Figure 27:
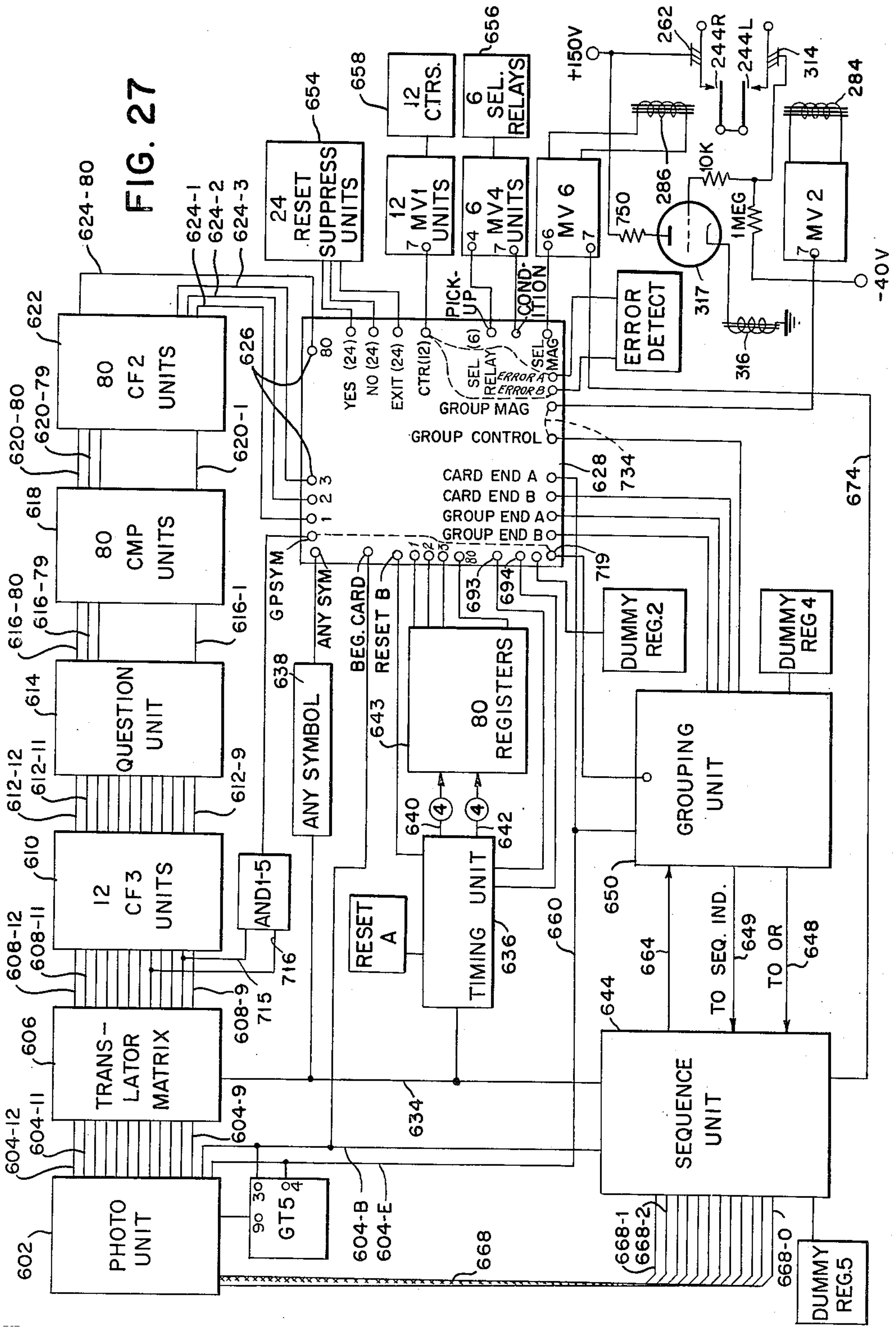
FIG. 27 is a general block diagram of the circuitry.

When a detail card is fed from the card feed hopper 10 past the photo-electric sensing unit 12, the leading edge of the card blacks out the end-of-card photo diode, EPD, then blacks out the row of twelve phototransistors, PT, and then blacks out the beginning-of-card photo diode BPD. A positive output is derived from the photo unit 602, FIG. 27, each time one of the phototransistors PT12 through PT9 is exposed to the light source 592 through a hole in the detail card C. A negative pulse is derived when the beginning-of-card and end-of-card diodes BPD and EPD are cut off from the light source, and a positive output pulse is derived when they are exposed to light after the card has passed. Referring to FIG. 27, the above fourteen photo units (PT and PD) as well as fourteen amplifying units AMP1, and fourteen shaping units TR1 and CF1 are contained in the box 602. The shaped and amplified pulses of the phototransistors PT12–PT9 are fed through twelve lines designated 604–12 through 604–9 to a box designated 606 that contains a translator matrix that translates the Hollerith code to the two-out-of-twelve code described hereinafter. Twelve output lines designated 608–12 through 608–9 lead from the translator matrix 606 to a unit 610 containing twelve cathode followers CF3–12 through CF3–9. The output of the latter twelve cathode followers is fed through lines designated 612–12 through 612–9 to a question unit 614, that is adapted to hold a question card, where the signals derived from the sensing of data in the detail cards are compared with data punched in the question card. Eighty lines, designated 616–1 through 616–80, corresponding to the eighty columns of the conventional record card, emerge from the question unit 614. When the data sensed in a column of the detail card matches the data in one or more columns of the question card, output pulses appear on the ones of the lines 616–1 through 616–80 that correspond to the matched columns of the question card.

The eighty lines 616–1 through 616–80 lead into a unit 618 containing eighty comparator output circuits CMP and thence, through eighty lines 620–1 through 620–80 into a unit 622 containing eighty cathode followers CF2. The circuits in the unit 618 standardize the input signals fed thereto, and power gain and impedance reduction is accomplished in the cathode follower unit 622. The output pulses of the unit 622 are fed through eighty comparator lines designated 624–1 through 624–80 that lead to comparing exits 626 on a panel board that is designated 628, and through selective plug wiring to storage means in the form of eighty registers, REG1 through REG80. The panel board is shown schematically in FIG. 27 and is shown in full in FIG. 89.

For any positive signal entering the translator matrix 606, a positive output pulse is delivered to a line 634 emerging from the matrix 606 and is fed to an electronic timing unit 636 and to an Any Symbol delay unit 638. When both of the diodes BPD and EPD are exposed to light the photo unit 602 is disabled by a unit GT5 so that pulses cannot be fed to the lines 604 due to the lighting of the phototransistors PT. The phototransistors are covered by an oncoming card before an actuating pulse is derived from the beginning of card diode and a disabling pulse is derived from the end of card diode before the card uncovers the twelve phototransistors. By the foregoing arrangement erroneous indicating pulses derived from the exposure of the phototransistors between cards is prevented. The diodes BPD and EPD are covered during the scanning of a card, and a pulse to the timing unit from the translator matrix 606 through the line 634 trips the timing unit 636 and causes an enabling pulse of fifty microseconds' duration to be emitted therefrom to four enable lines 640 after a two hundred microsecond delay, and a reset pulse of fifty microseconds' duration to be emitted therefrom to four reset lines 642 after a three hundred microsecond delay. A second enabling pulse follows immediately after the reset pulse. The enable lines 640 are connected with the eighty registers REG1–80, shown in FIG. 27 as a box 643. The coincidence of an enable pulse from one of the enable lines 640 with a pulse from one of the eighty comparator exits 626 and a signal from a direct current power source, Dummy REG2, or from a preceding register turns on a selected register REG. If a reset suppress pulse, from a source described hereinafter, is not fed to an actuated register coincidently with the reset pulse from one of the lines 642, the register is extinguished.

When a register goes on, it emits pulses which may be used for conditioning other registers, triggering other registers, suppressing resetting of registers or actuating card selection circuits. The registers are described in detail hereinafter.

Reset suppress controls contained in the block 654, shown in FIG. 27, provide reset suppress pulses, when desired, to prevent an actuated register REG from being reset by the reset pulses from the lines 642. Such suppression is desired whenever a desired bit of data is stored in a register. For example, if a coded word CHAR is being searched for and the letter "C" if found, the register that is plugged to the column of the question card that contains the letter "C" goes on when the "C" is sensed in a detail card. The reset suppress pulse suppresses the resetting of the register. If the following column of the detail card contains the letter "H," the next register goes on and again resetting is suppressed. However, if the latter column contains a letter other than the letter "H," the first register is reset since it is apparent that the letter "C" stored therein is not part of the coded word CHAR. If the second letter sensed is the letter "C," the first register is reset by the failure to sense the letter "H," but is turned on again by the enable pulse described hereinbefore as following immediately after the reset pulse, since the last sensed letter "C" may be the beginning of the code word CHAR. The reset suppress unit is actuated by pulses from an actuated register or the Any Symbol delay unit 638. The reset suppress circuit is described in detail hereinafter.

Six selector relays 656–1 through 656–6 are provided, each having six sets of points, and are actuated by single shot multivibrators MV4. Signals for conditioning the multivibrators MV4 are derived from register exits or other relay point outputs in accordance with the panel wiring, and a triggering pulse is derived in response to the sensing of an "end-of-group" signal. The selector relays facilitate interconnection of various components as required, and are described in detail hereinafter.

The hereinbefore described select solenoid 316 is actuated to disable the reject card stacker 16 whenever a card C is to be selected since the rejected cards are removed from the conveyor belt 14 before the selected cards. The solenoid is energized through a circuit that is set up by the actuation of the select magnet 286 and the group magnet 284 through respective multivibrator units MV6 and MV2.

Twelve counters 658–1 through 658–12 are available on the machine, and are actuated by single shot multivibrator units MV1, the inputs to which are pluggable to the control panel in a manner explained hereinafter. A variety of information may be recorded in the counters 658, for example, the number of cards in which a certain bit of information occurs. The question card may be punched with question A and question B, and the control panel 628 wired to select a group of cards containing that data. One counter 658 may be wired to indicate the number of times that data A occurs and another counter to indicate the number of times that data B occurs. The units MV1 derive their control signals from register exits or selector relay points as described hereinafter wtih reference to specific examples. Two of the counters are used in the error check device.

*Card groups*

When one card of a group contains data that are punched in the question card, that card is to be selected, but if that card alone is selected, it is seperated from related cards forming the group. Therefore, when one card of a group is selected, the entire group is selected. The select solenoid 316 and circuits contained in the grouping unit designated 650, including the group magnet 284, and the select magnet 286, accomplish this group selection. The output of the end-of-card photo diode EPD is fed to the grouping unit 650 through the line 604–E to aid in the group selection in a manner described hereinafter.

*Sequence control*

The cards of each group are serially numbered and the machine checks the second digit of this number for proper sequence. The sequence checking unit is indicated in FIG. 27 by the block 644. The sequence unit derives the digit indication from the lines 604–0 to 604–9 through lines numbered 668–0 to 668–9, as shown in FIGS. 27, 86, and 91, and registers the digits with the aid of pulses from the diode matrix 606 through the line 634 and from the photo diode unit BPD through the line 604–B. Other pulses are derived from the grouping unit 650 through lines 648 and 649. In the event of a broken sequence for example, one card being either lost or not in proper sequential order, an indicator light 672 in the sequence unit 644, shown in FIG. 91 goes on and the broken sequence group of cards is selected in response to a pulse from the sequence unit 644, through a line 674 to MV6 and the select magnet 286. The units MV6 and MV2 actuate the magnets 284 and 286, as described, to set up circuits for actuating the select solenoid 316 for selecting cards.

The machine as described herein is adapted for functioning at a rate of eight hundred cards per minute. The card rate may be varied within the scope of this invention by altering the mechanical drive speed and the time factors in the circuits.

*Components*

The control circuits referred to hereinbefore are shown in block form in FIG. 27. The blocks shown in FIG. 27 are further shown, in block form in FIGS. 85 through 92.

Before proceeding with a description of the various control circuits, a brief description of the circuit units or components making up the control circuits will be In each of the unit diagrams the values of the various resistors are given in ohms, or if followed by the letter K, in thousands of ohms, or if followed by the letter M, in millions of ohms, while the values of the various capacitors are indicated in microfarads or if followed by the letter M, in micromicrofarads. Hereinafter, in this specification whenever a conductor or circuit terminal, etc. is referred to as being shifted positive or negative in potential, this does not necessarily mean that the point in question is positive or negative in an absolute sense, but only more positive or more negative relative to its previous state. This principle also applies to any description wherein positive or negative pulses are mentioned.

*Cathode followers*

Figure 28A:
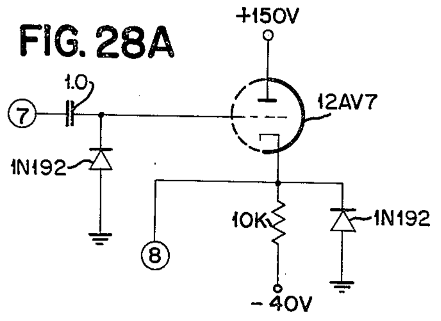
Figure 28B:
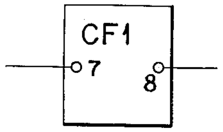

Referring to FIG. 28A, one half of a 12AV7 type dual triode is shown connected as a cathode follower. The plate is tied directly to a plus 150 volt supply, the grid is tied to a ground through a type 1N192 diode and through a 1.0 microfarad condenser to a terminal 7. The cathode is tied through a 10K ohm resistor to a minus 40 volt supply and also is tied through a type 1N192 diode to ground. A cathode follower output terminal 8 is tied to the cathode end of the 10K ohm resistor. The tube is self-biased through the grid diode to ground and is normally operating near cutoff. When a positive pulse is fed from an outside source to the terminal 7, the tube becomes fully conducting, the potential of the cathode end of the resistor rises and a positive potential output pulse appears on the terminal 8. The above described cathode follower circuit, in subsequent figures, is represented by the block shown adjacent thereto in FIG. 28B and is designated CF–1. In the circuit diagrams using the CF–1 block diagram and subsequently described block diagrams, the terminals may be shown elsewhere within the block for convenience in connecting the various blocks, but the terminal numbers shown in the block representations clearly identify each terminal.

Figure 29A:
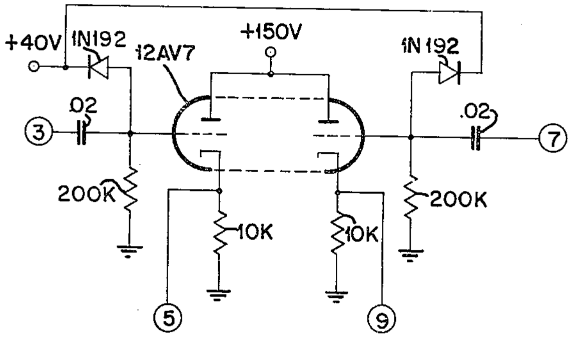
Figure 29B:
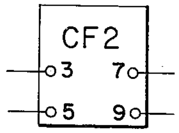

Referring to FIG. 29A, a 12AV7 type dual triode is connected as a pair of identical cathode followers. The plates are commoned and tied to a plus 150 volt supply. Each cathode is tied through a separate 10K ohm resistor to ground. Each control grid is tied through a separate 200K ohm resistor to ground and through a separate type 1N192 diode to a plus 40 volt supply. Each grid is tied through a .02 microfarad condenser to an input terminal 3 (or 7). The output terminal 5 (or 9) is connected to the cathode end of the 10K ohm resistor. Through the diodes and the plus 40 volt supply the grids of the triodes are effectively clamped at a maximum of plus 40 volts thereby limiting the output potential at the terminals 5 and 9. The triodes are normally operating near cutoff and a positive pulse input to the grid 3 (or 7) causes the left (or right) half of the tube to conduct whereby a positive output potential appears at the terminal 5 (or 9) as described hereinbefore with reference to FIG. 28A. The block representation of the two-unit cathode follower is shown in FIG. 29B and is designated CF–2.

Figure 30A:
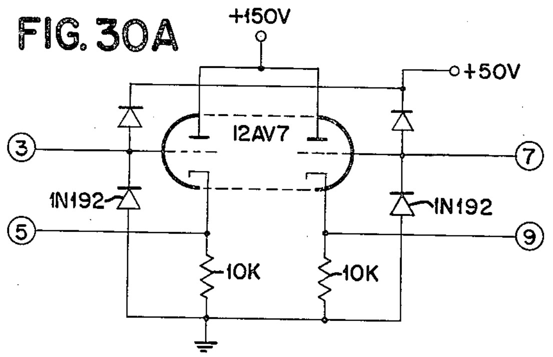
Figure 30B:
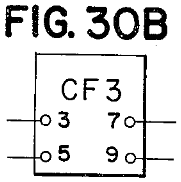

Referring to FIG. 30A, a 12AV7 type dual triode is connected as a pair of cathode followers. The latter unit varies from the one shown in FIG. 29A in that the grids are connected to ground through type 1N192 diodes rather than through 200K ohm resistors, and are connected to a plus 50 volt supply. In other respects the cathode followers shown in FIG. 30A function in a similar manner to those shown in FIG. 29A. The block representation thereof appears adjacent the circuit diagram and is designated CF–3.

Figure 31A:
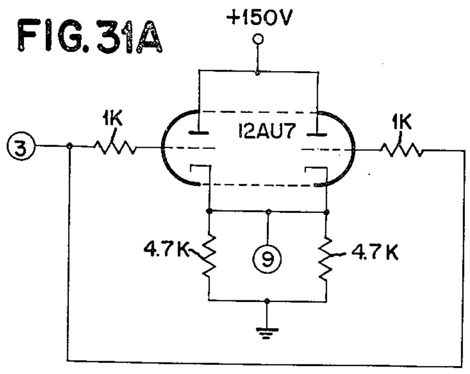
Figure 31B:
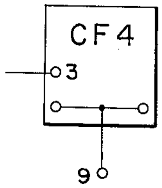

Referring to FIG. 31A, the 12AU7 type dual triode shown connected as a cathode follower varies essentially from the cathode followers described hereinbefore only inasmuch as the control grids are commoned so that the positive pulsing of the terminal 3 will cause both sides of the tube to conduct and the combined output to appear at the common output terminal 9. The block representation is shown in FIG. 31B and is designated CF–4. In four places in the circuitry, the units CF4 are used as constant sources of positive potential and they are designated Dummy Register.

Figures 32A, 32B:
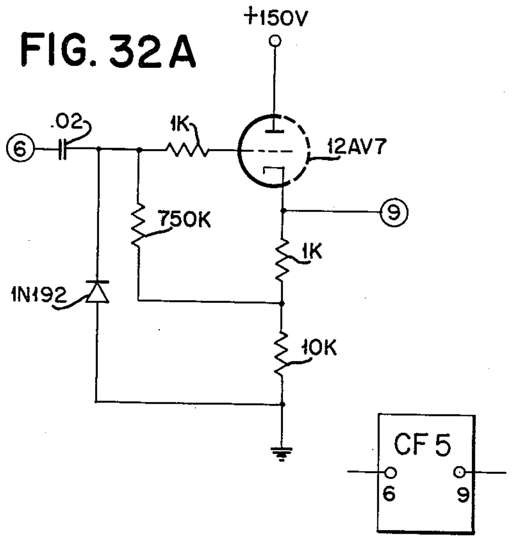

Referring to FIG. 32A, one half of a 12AV7 type dual triode is connected as a cathode follower. The plate is tied directly to a plus 150 volt supply; the cathode is tied through series connected 1K ohm and 10K ohm resistors to ground. The grid is tied through a 1K ohm resistor and a .02 microfarad condenser to a terminal 6. The junction of the latter two components is tied through an 1N192 type diode to ground and through a 750K ohm resistor to the junction of the 1K ohm and 10K ohm resistors in the cathode circuit. The latter connection is a cathode feedback to improve the output wave shape. A terminal 9 is connected to the cathode end of the 1K ohm resistors. When a positive pulse is fed to the terminal 6, the triode conducts and a positive pulse output is available at the terminal 9 as in the case of the hereinbefore described cathode followers. The block representation is shown in FIG. 32B and is designated CF–5.

Figures 33A, 33B:
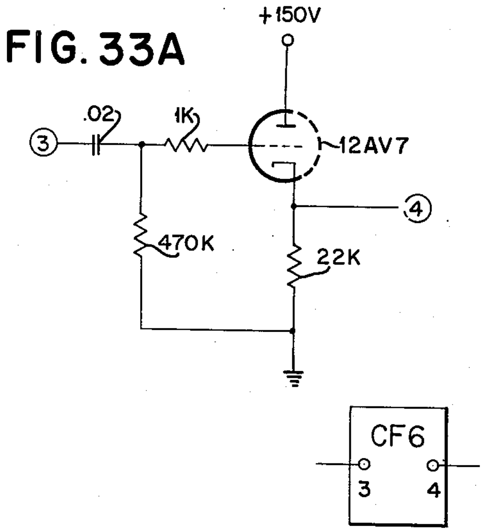

Referring to FIG. 33A, one half of a 12AV7 type dual triode is connected as a cathode follower. The plate is tied to a plus 150 volt supply. The cathode is tied through a 22K ohm resistor to ground. The grid is tied through a 1K ohm resistor and a .02 microfarad condenser to an input terminal 3. The junction of the latter condenser and resistor is tied through a 470K ohm resistor to ground. A positive pulse applied to the terminal 3 causes the triode to conduct and make a positive output pulse available at a terminal 4 tied to the cathode end of a 22K resistor. The block representation is shown in FIG. 33B and is designated CF–6.

Figures 34A, 34B:
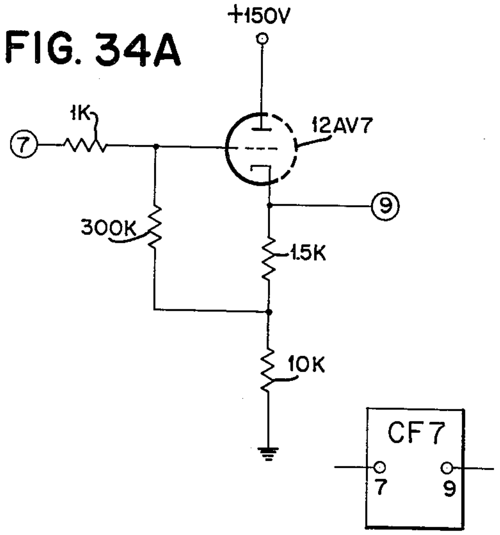

Referring to FIG. 34A, one half of a 12AV7 type dual triode is connected as a cathode follower. The plate is tied directly to a plus 150 volt supply. The cathode is tied to ground through a voltage divider comprising a 1.5K ohm and a 10K ohm resistor. An output terminal 9 is tied to the cathode end of the 1.5K ohm resistor. The control grid is tied through a 1K ohm resistor to a terminal 7 and through 300K ohm resistor to the junction of the 1.5K ohm and 10K ohm resistors. The tube is normally conducting and when a negative potential is impressed on the control grid through the input terminal 7, the tube is cut off and negative potential cathode follower type output is taken off through the terminal 9. The block representation is shown in FIG. 34B and is designated CF7.

Figures 35A, 35B:
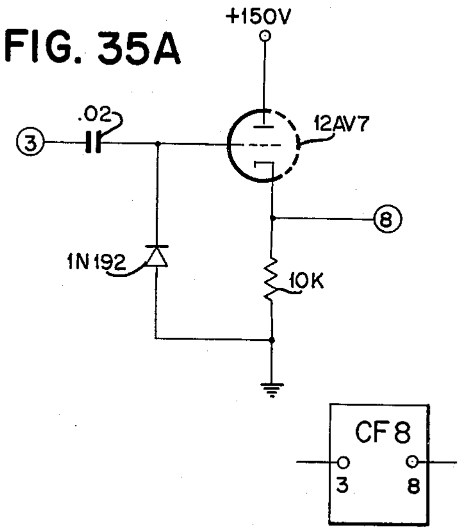
Figure 36A:
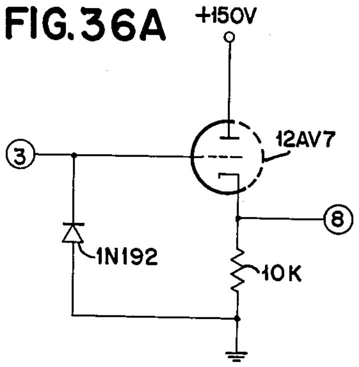
Figure 37A:
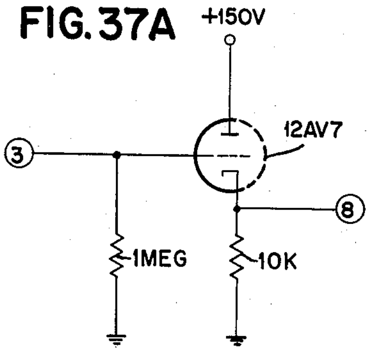
Figure 36B:
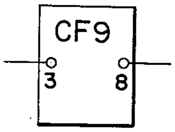
Figure 37B:
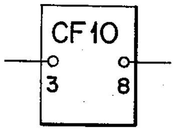

Referring to FIGS. 35A, 36A, 37A, each figure shows one half of a 12AV7 type dual triode connected as a cathode follower. In each case the plate is tied to a plus 150 volt supply and the cathode through a 10K ohm resistor to ground. Each cathode is tied to an output terminal 8. The differences in the three circuits are in the grid connections. In FIG. 35A, the grid is tied to ground through a type 1N192 diode and to a terminal 3 through a .02 microfarad condenser. In FIG. 36A, the grid is tied through a type 1N192 diode to ground and directly to a terminal 3. In FIG. 37A, the grid is tied to ground through a 1 megohm resistor and to a terminal 3. In each of the three foregoing circuits, the tube is normally operating near cutoff and a positive pulse input to the grid causes the tube to increase in conduction and provide a positive output at the terminal 8. The block representations are shown in FIGS. 35B, 36B, and 37B adjacent the corresponding circuits and are designated CF8, CF9, and CF10 respectively.

Figure 38A:
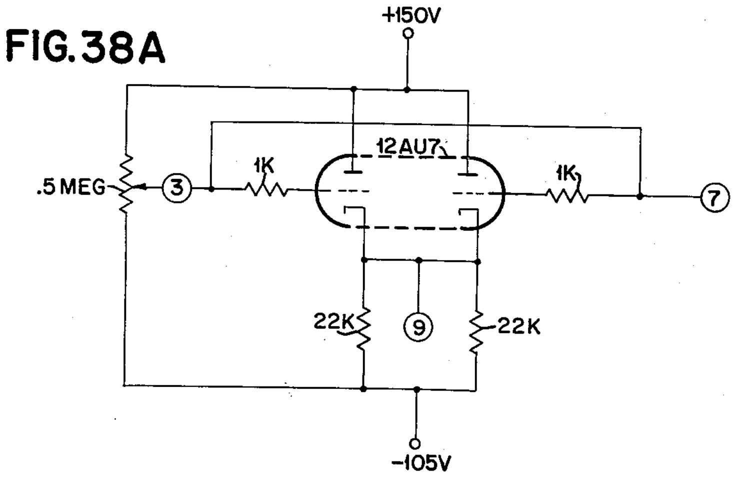
Figure 38B:
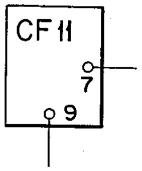

Referring to FIG. 38A, a 12AU7 type dual triode is connected as a cathode follower and is used to supply negative bias to other components. The two plates are commoned and tied to a plus 150 volt supply. Each cathode is tied through an individual 22K ohm resistor to a minus 105 volt supply. The cathodes are tied to a common output terminal 9. The left and right-hand grids are tied through 1K ohm resistors respectively to terminals 3 and 7 which are commoned, and connected to a 0.5 megohm potentiometer that is connected between the plus 150 volt supply and the minus 105 volt supply. The unit provides a steady state negative potential at the terminal 9. The block representation is shown in FIG. 38B and is designated CF11.

Referring to FIG. 39A, one half of a 12AV7 type dual triode is connected as a cathode follower. The plate is tied to a plus 150 volt supply; the cathode is tied to an output terminal 9 and through a 10K ohm resistor to ground; the grid is tied through a 1K ohm resistor and a .02 microfarad condenser to a terminal 7; the junction of the latter condenser and resistor is tied through an 1N192 type diode to ground. The triode is normally operating near cutoff and a positive pulse to the terminal 7 causes a positive output at terminal 9. The block representation is shown in FIG. 39B and is designated CF12.

*Inverter-cathode follower*

Referring to FIG. 40A, a 12AV7 type dual triode is connected as an inverter and cathode follower. The left-hand plate is tied through a 47K ohm resistor to a plus 150 volt supply and through a .02 microfarad condenser and a 4.7K ohm resistor to the right-hand grid. The left-hand cathode is tied through a 2.2K ohm resistor to ground. The left-hand grid is tied through a 1.5K ohm and a 200K ohm resistor to ground. The junction of the latter two resistors are coupled by a .0012 microfarad condenser to an input terminal 3. The right-hand plate is tied directly to the plus 150 volt supply. The right-hand cathode is tied through a 10K ohm resistor to ground. An output terminal 7 is tied to the cathode end of the 10K ohm resistor. The junction of the .02 microfarad condenser and the 4.7K ohm resistor is tied through an 1N192 type diode to ground. The left half of the tube (the inverter half) is normally operating near saturation whereas the right half (the cathode follower half) is operating near cutoff. When a negative pulse is impressed on the left-hand grid through the terminal 3, the left half of the tube is cut off and the inverted output is impressed on the right-hand grid through the .02 microfarad condenser and the 4.7K ohm resistor causing the right half of the tube to become fully conducting and to emit a positive pulse to the terminal 7. The block representation is shown in FIG. 40B and is designated INV CF1.

Referring to FIG. 41A, a 12AV7 type dual triode is connected as an inverter and cathode follower to provide alternating and direct current cathode follower outputs. The left-hand plate is tied through an 18K ohm resistor to a plus 150 volt supply. The left-hand cathode is tied to ground. The left-hand grid is tied through a 1 megohm resistor to a minus 105 volt supply and through a 470K ohm resistor, to a terminal 3. The right-hand plate is tied directly to the plus 150 volt supply. The right-hand cathode is tied through series connected 470 ohm and 4.7K ohm resistors to ground. The left-hand plate is tied through a .001 microfarad condenser and a 700K ohm resistor in series to a minus 105 volt supply. The junction of the latter resistor and condenser is tied through a 1K ohm resistor to the right-hand grid. A 300K ohm resistor is connected in parallel with the latter condenser. The junction of the 300K ohm resistor, the 1K ohm resistor and the .001 microfarad condenser is tied through a 15 micromicrofarad condenser in series with a 470K ohm resistor to the voltage divider comprising the above described 470 ohm and 4.7K ohm series connected resistors. The cathode end of the 470 ohm resistor is connected directly to a terminal 6 and through a .001 microfarad and a type 1N192 diode in series to a terminal 7. The junction of the latter condenser and diode is tied through another type 1N192 diode to ground. The left half of the tube is normally operating at its saturation point due to a positive potential on the terminal 3 while the right half is normally operating near its cutoff point. When the input to the left-hand grid through the terminal 3 is altered negatively, the left half of the tube is cut off. When the left half of the tube cuts off, the positive output from the left-hand plate to the right-hand grid causes the right half of the tube to become fully conducting whereby a positive potential direct current output may be taken off the cathode through the terminal 6 and an alternating output through the terminal 7. The connection from the right-hand cathode circuit voltage divider to the right-hand grid is a voltage feedback to improve the output wave shape. The block representation is shown in FIG. 41B and is designated INV CF2.

Referring to FIG. 42A, a 12AV7 type dual triode is connected as an amplifier, inverter and cathode follower. The left-hand cathode is tied through a 1K ohm resistor to ground. The right-hand cathode is tied through a 1K ohm and a 10K ohm resistor in series to ground. The left-hand plate is tied through a 47K ohm resistor to a plus 150 volt supply whereas the right-hand plate is tied directly to the plus 150 volt supply. The left-hand grid is tied through a 3.9K ohm resistor to a 500K ohm potentiometer that is connected at its lower end to a minus 105 volt supply and at its upper end to a terminal 3. The right-hand grid is condenser coupled to the left-hand plate through a 3.9K ohm resistor and a .02 microfarad condenser. A point between the latter condenser and resistor is connected to ground through a type 1N192 diode and to a point between the hereinbefore described series connected 1K ohm and 10K ohm resistors through a 750K ohm resistor. The above described circuit operates as a cathode follower voltage feedback to provide a more desirable and a more nearly square wave pulse to the right-hand grid. The left half of the 12AV7 tube is normally fully conducting due to positive bias through the terminal 3 whereas the right half is operating near cutoff. When a negative pulse is applied to the terminal 3, the left half of the tube is cut off and the resultant inverted pulse to the right-hand grid causes the right half of the tube to increase its conduction. A positive pulse cathode follower type output is taken off at the terminal 9. Due to the slight conduction of the right half of the tube prior to the cutting off of the left half of the tube, the output at terminal 9 is of a lesser magnitude than if the right half had changed from a non-conducting to a fully conducting state. The block representation is shown in FIG. 42B and is designated INV CF3.

*Inverter*

Referring to FIG. 43A, a 6AH6 type pentode is connected as an alternating current phase inverter. The plate is tied to the junction of series connected 390K ohm and 100K ohm resistors comprising a voltage divider between minus 105 volt and plus 150 volt supplies. The cathode is tied directly to ground. The suppressor grid is tied to the cathode. The screen grid is tied to the plus 150 volt supply. The control grid is tied through a type 1N192 diode to the junction of series connected 75K ohm and 33K ohm resistors that are connected as a voltage divider between a minus 105 volt supply and ground. The junction of the control grid and the diode is coupled by a .02 microfarad condenser to an input terminal 9. The tube is normally operating near cutoff and a positive alternating current pulse impressed on the control grid through the terminal 9 causes the tube to become fully conducting. A negative pulse output is taken from the plate through a terminal 8. The block representation is shown in FIG. 43B and is designated INV1.

Referring to FIG. 44A, a 6AH6 type pentode is connected as a direct current phase inverter. Except for the control grid connections, the inverter shown in FIG. 44A is designed and operates in the same manner as the one shown in FIG. 43A. The control grid is tied to a minus 105 volt supply through a 39K ohm resistor and, through a 10K ohm resistor to a terminal 9. A positive direct current pulse input at the terminal 9 gives a negative pulse output at the terminal 8 as described hereinbefore with reference to FIG. 43A. The block representation is shown in FIG. 44B and is designated INV2.

*Gates*

Figure 45A:
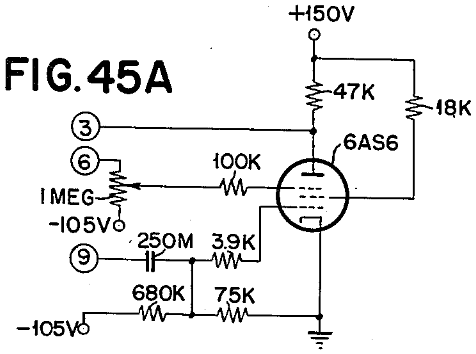
Figure 45B:
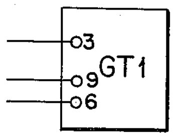

Referring to FIG. 45A, a gate circuit is shown comprising a 6AS6 type pentode. The cathode is tied to ground. The anode is tied through a 47K ohm resistor to a plus 150 volt supply. The tube is normally biased to cutoff by the connection of the control grid through a 3.9K ohm resistor to a voltage divider comprising a 680K ohm and a 75K ohm resistor that are series connected between a minus 105 volt supply and ground. The junction of the 3.9K ohm resistor and the voltage divider is tide through a 250 micromicrofared condenser to an input terminal 9. The number 2 grid is tied through an 18K ohm resistor to the plus 150 volt supply. The number 3 grid is tied through a 100K ohm resistor to a 1 megohm potentiometer that is tied at one end to a minus 105 volt supply and at the other end to a terminal 6. The potential normally impressed on the number 3 grid is such that the tube will conduct when a plus pulse is placed on the number 1 grid through the terminal 9. When the tube conducts, a negative pulse output is emitted from the plate to a terminal 3. If a negative pulse is received at the terminal 6 at the same time that a positive pulse is received at the terminal 9, the tube will remain in a non-conducting state. The block representation is shown in FIG. 45B and is designated GT1.

Figure 46A:
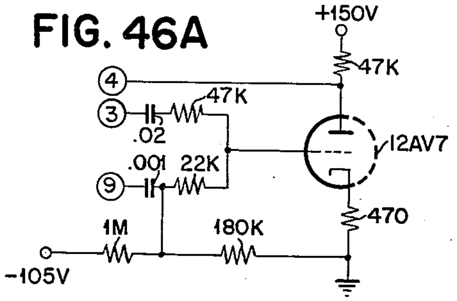
Figure 46B:
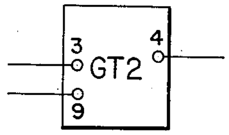

Referring to FIG. 46A, one half of a 12AV7 dual triode is shown connected as a gate. The plate is tied through a 47K ohm resistor to a plus 150 volt supply. The cathode is tied through a 470 ohm resistor to ground. The grid is tied through a 47K ohm resistor and a .02 microfared condenser in series to a terminal 3 and through a 22K ohm and .001 microfarad condenser to a terminal 9. The junction of the latter resistor and condenser is tied to the mid point of a voltage divider comprising a 1 megohm and a 180K ohm resistor connected between a minus 105 volt supply and ground. The tube is normally non-conducting and when a positive pulse is impressed on the grid through the terminal 3, the tube conducts and emits a negative pulse from its plate. If a negative pulse is simultaneously impressed on the grid through the terminal 9, the tube remains in its non-conducting state. The block representation is shown in FIG. 46B and is designated GT2.

Figures 47A, 48A:
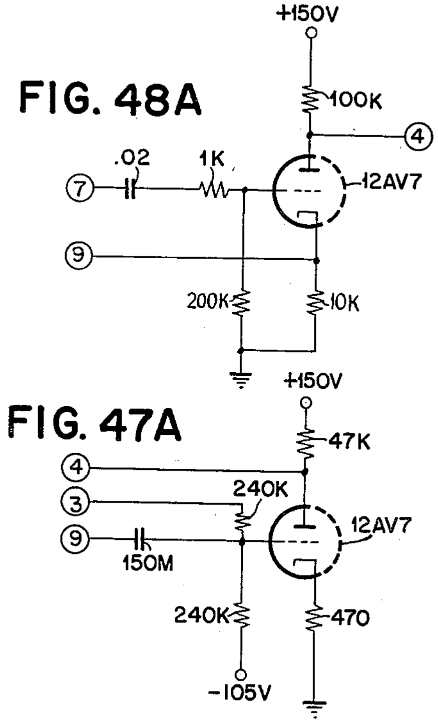
Figure 47B:
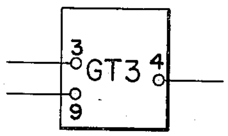

Referring to FIG. 47A, one half of a 12AV7 type dual triode is connected as a gate. The plate is tied through a 47K ohm resistor to a plus 150 volt supply; the cathode is tied through a 470 ohm resistor to ground; the control grid is tied through a 240K ohm resistor to a minus 105 volt supply, through a 240K ohm resistor to an input terminal 3, and through a 150 micromicrofarad condenser to an input terminal 9. The tube is normally non-conducting and when a positive pulse is impressed on the terminal 9, and a positive direct current level on the terminal 3 the tube conducts and a negative output pulse is taken off the plate through an output terminal 4. However, if the direct current level on the terminal 3 is not positive, pulses at the terminal 9 will not cause conduction. The block representation is shown in FIG. 47B and is designated GT3.

Figure 48B:
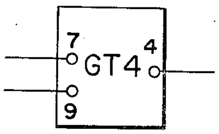

Referring to FIG. 48A, one half of a 12AV7 type dual triode is connected as a gate. The plate is tied through a 100K ohm resistor to a plus 150 volt supply. The cathode is tied through a 10K ohm resistor to ground. The grid is tied through a 200K ohm resistor to ground and through a 1K ohm resistor and a .02 microfarad condenser to a terminal 7. The tube is normally operating near cutoff and when a positive pulse is impressed on the grid through the terminal 7, the tube increases its conduction and a negative pulse output is taken off the plate through a terminal 4. If a positive pulse is placed on the cathode through a terminal 9 at the same time that the terminal 7 is positively pulsed, the state of the tube will not change. The block representation is shown in FIG. 48B and is designated GT4.

Figure 49A:
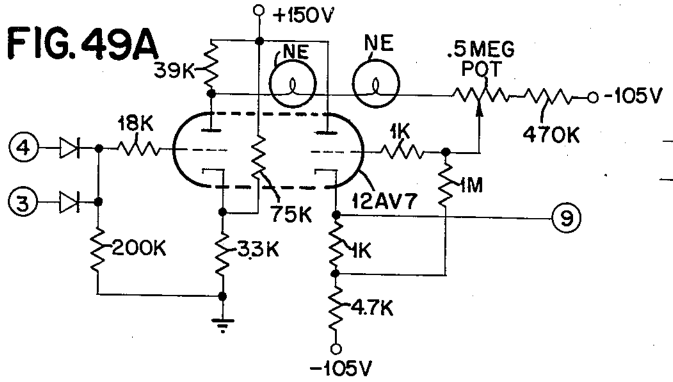

Referring to FIG. 49A, a 12AV7 type dual triode is connected as a gate. The left-hand plate is tied through a 39K ohm resistor to a plus 150 volt supply, the left-hand cathode is tied through a 3.3K ohm resistor to ground and through a 75K ohm resistor to the plus 150 volt supply. The left-hand grid is tide through an 18K ohm resistor and a 200K ohm resistor to ground. The junction of the latter two resistors is connected through a 1N192 type diode to a terminal 3 and through an 1N192 type diode to a terminal 4. The right-hand plate is tied directly to the plus 150 volt supply. The right-hand cathode is tied through series connected 1K ohm and 4.7K ohm resistors to a minus 105 volt supply. The junction of the latter two resistors is tied through series connected 1 megohm and 1K ohm resistor to the right-hand grid. The junction of the latter 1 megohm and 1K ohm resistors is connected to a 0.5 megohm potentiometer and a 470K ohm resistor to a minus 105 volt supply. The other end of the potentiometer is connected through two series connected neon bulbs to the left-hand plate.

Figure 49B:
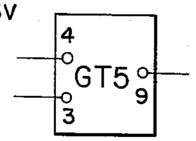

The left half of the tube is normally non-conducting. By controlling the magnitude of the input pulses the tube may be caused to conduct in response to simultaneous positive pulses on the terminals 3 and 4 but not in response to a pulse on only one of the latter terminals. When the left half of the tube conducts, the left-hand plate potential drops and the neon bulbs are extinguished. The potential of the tap point on the potentiometer drops biasing the right-hand grid below its cutoff value. The right half of the tube is cut off and a negative output is taken off the cathode through the terminal 9. The block representation is shown in FIG. 49B and is designated GT5.

*Multivibrators*

Figure 50A:
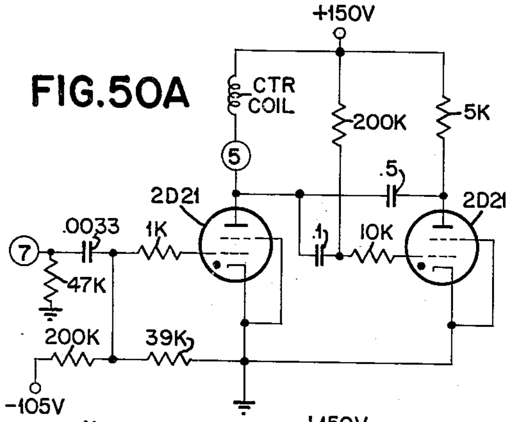
Figure 50B:
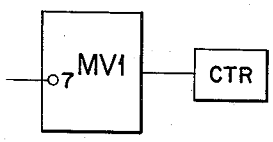

Referring to FIG. 50A a pair of 2D21 type gas tubes are connected as a single shot multivibrator. Referring first to the left-hand tube, the plate thereof is tied through a terminal 5 and a counter coil to a plus 150 volt supply. The cathode is tied to ground and the screen grid is tied to the cathode. The control grid is tied through a 1K ohm resistor and a .0033 microfarad condenser to a terminal 7. The junction of the latter resistor and condenser is tied to a voltage divider comprising a 39K ohm and a 200K ohm resistor that are connected in series between a minus 105 volt supply and ground. The terminal side of the .0033 microfarad condenser is tied through a 47K ohm resistor to ground. The plate of the right-hand tube is tied through a 5K ohm resistor to the plus 150 volt supply. The right-hand cathode is tied to ground and the screen grid is tied to the cathode. The plates of the right and left tubes are coupled together through a 0.5 microfarad condenser. The plate of the left-hand tube also is connected to the control grid of the right-hand tube through a 0.1 microfarad condenser and a 10K ohm resistor. The junction of the latter condenser and resistor is tied through a 200K ohm resistor to the plus 150 volt supply. The left-hand tube is normally non-conducting and the right-hand tube is normally conducting. When a positive pulse is applied to the control grid of the left-hand tube, that tube fires and pulses the counter coil in the plate circuit. A negative pulse from the plate of the left-hand tube is fed through the 0.5 microfarad condenser to the plate of the right-hand tube and through the 0.1 microfarad condenser and the 10K ohm resistor to the control grid of the hight-hand tube. The coincidence of negative pulses on the latter plate and grid cause the right-hand tube to be extinguished. The 0.1 microfarad condenser is then recharged from the plus 150 volt supply through the 200K ohm resistor and when that charge raises the potential of the control grid of the right-hand tube to the firing voltage, the right-hand tube fires. When the right-hand tube fires, a negative pulse is impressed through the 0.5 microfarad condenser to the plate of the left-hand tube thereby dropping the left-hand plate voltage below sustaining voltage whereby the left-hand tube is extinguished and the multivibrator unit stands in its normal condition. The block representation is shown in FIG. 50B and is designated MV1.

Figure 51A:
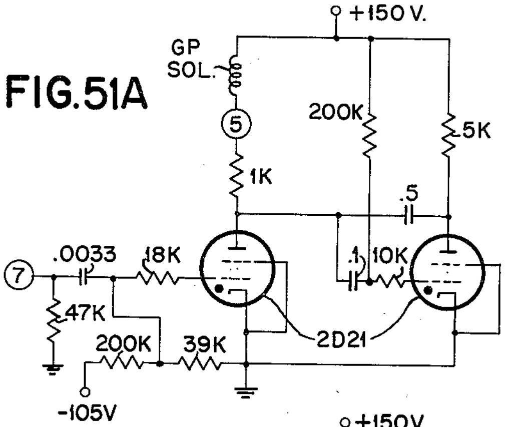
Figure 51B:
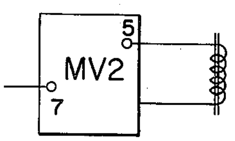

Referring to FIG. 51A, the circuit shown is identical to the one shown in FIG. 50A except for a 1K ohm resistor inserted between the left-hand plate and the terminal 5, the fact that the coil is for a solenoid rather than a counter and the fact that the 1K ohm grid resistor is replaced by an 18K ohm resistor. These minor structural differences between the two circuits results from the different loads which they are intended to drive. The operation is the same as that described with reference to FIG. 50A. The block representation is shown in FIG. 51B and is designated MV2. A unit MV3 (not shown) is identical to MV2 except that the right-hand grid is connected to the plus 150 volt supply through a 75K ohm resistor rather than a 200K ohm resistor thereby changing the time required to recharge the 0.1 microfarad condenser and the magnet coil is removed. The terminal 5 is tied to the plus 150 volt supply through the external resistor 758, shown in FIG. 91. The output is available at the terminal 5 for use in a manner described in the circuit description hereinafter.

Figure 52A:
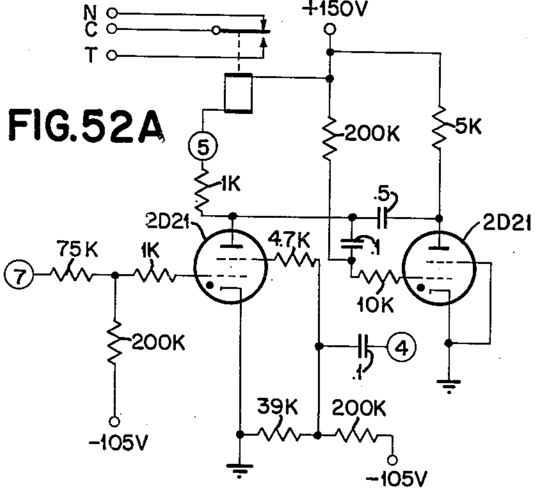
Figure 52B:
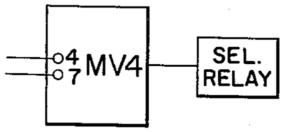

Referring to FIG. 52A, a pair of 2D21 type gas tubes are connected as a single shot multivibrator. Except for the grid circuits of the left-hand tube, the circuit is the same as that shown in FIG. 51A and the circuits function in a similar manner. Actually the left-hand tube is connected as a gate whereby simultaneous positive pulses are required on both grids to initiate the multivibrator action. The control grid of the left-hand tube is tied to a minus 105 volt supply through series connected 1K ohm and 200K ohm resistors and to an input terminal 7 through the 1K ohm resistor and a 75K ohm resistor. The screen grid is tied to the junction of a 39K ohm resistor and a 200K ohm resistor that are series connected as a voltage divider between a minus 105 volt supply and ground. The grid is also tied through a .1 microfarad condenser and the 4.7K ohm resistor to an input terminal 4. The left-hand tube is normally biased to cutoff and when the terminal 7 is positively conditioned, a positive pulse to the terminal 4 causes the tube to fire thereby energizing a relay coil in the plate circuit thereof to operate six sets of points, one set of which is shown in FIG. 52A. As described hereinbefore, the firing of the left-hand tube cuts off the right-hand tube which, after a time delay, refires and cuts off the left-hand tube. The block representation is shown in FIG. 52B and designated MV4.

A unit designated MV5 (not shown) is identical to MV4 except that the 200K ohm resistor between plus 150 volts and the right-hand tube control grid is replaced by a 75K ohm resistor which alters the time required to recharge the 0.1 microfarad condenser.

Figures 53A, 54A, 54B, 58A, 58B, 59A, 59B:
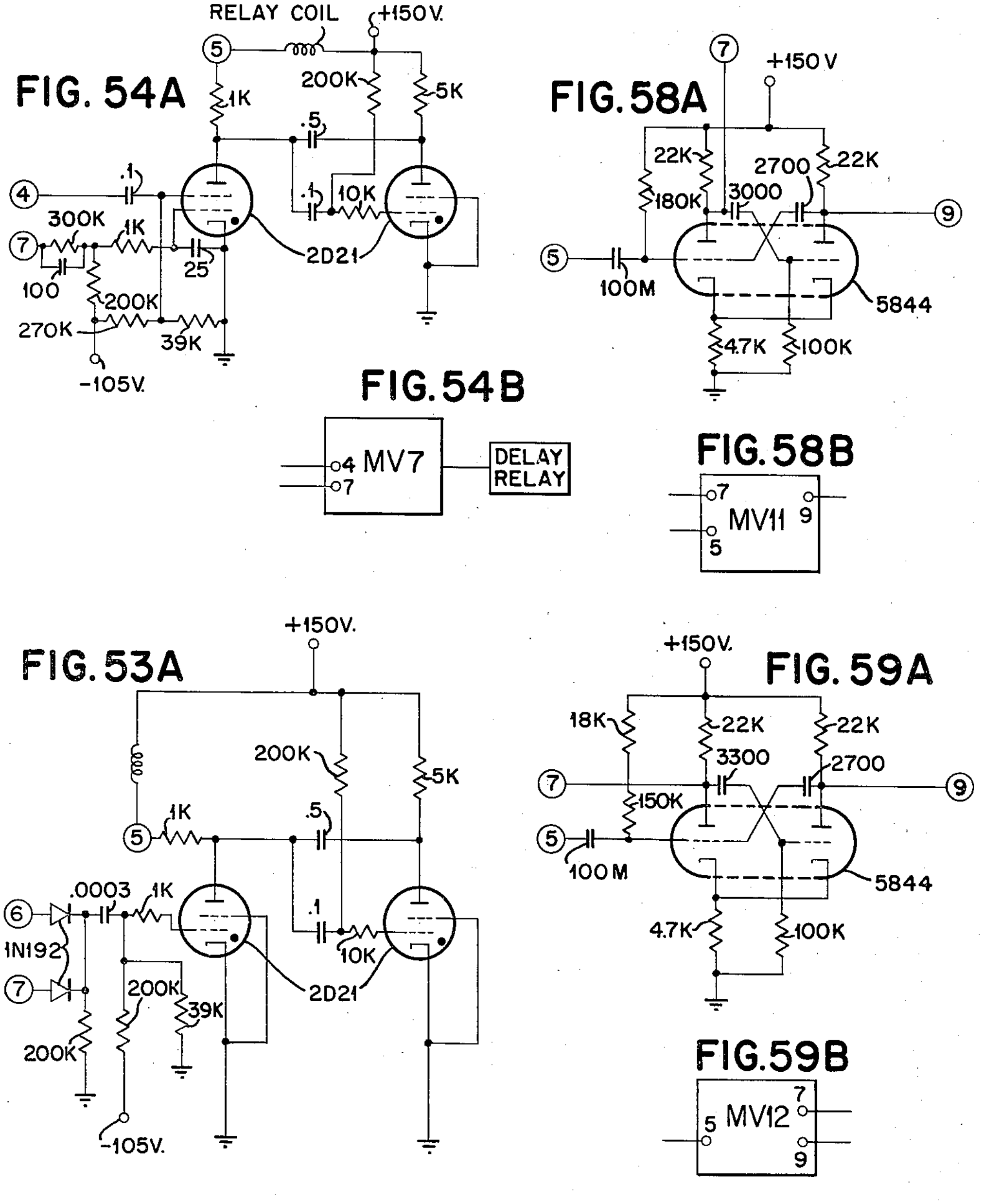
Figure 53B:
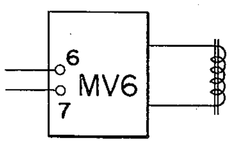

Referring to FIG. 53A, two 2D21 type gas tubes are connected as a single shot multivibrator and, except for additional input circuitry to the left-hand control grid, and a 1K ohm resistor between the plate and the terminal 5, it is identical to the one shown in FIG. 50A, and operates in the same manner. The additional circuitry is required so that the left-hand tube will fire in response to a pulse on either of two input terminals rather than in responce to a single pulse as in the circuit shown in FIG. 50A. The 47K ohm resistor from terminal 7 to ground is replaced by a 200K ohm resistor, terminal 7 is connected through a type 1N192 diode and a terminal 6 is connected through a type 1N192 diode to the same point as the terminal 7. A positive pulse on either of the terminals 6 or 7 causes the left-hand tube to fire. Subsequent operation is identical to that described hereinbefore with reference to the FIG. 50A. The block representation is shown in FIG. 53B and is designated MV6.

Referring to FIG. 54A, two 2D21 type gas tubes are connected as a single shot multivibrator and, except for the control grid circuit of the left-hand tube, is similar to the one described with reference to the FIG. 53A and operates in the same manner. The grid of the left-hand tube is connected to the minus 105 volt supply through a 1K ohm resistor and a 270K ohm resistor connected in series, and the junction of the latter two resistors is tied through a 300K ohm resistor that is in parallel with a 100 microfarad condenser to a terminal 7. The control grid is tied through a 25 microfarad condenser to ground. The screen grid is tied to a voltage divider comprising a 200K ohm and a 39K ohm resistor connected between a minus 105 volt supply and ground. The screen grid also is tied through a 0.1 microfarad condenser to a terminal 4. Coincident positive pulses on the terminals 4 and 7 actuate the unit. The block representation is shown in FIG. 54B and is designated MV7.

Figure 57A:
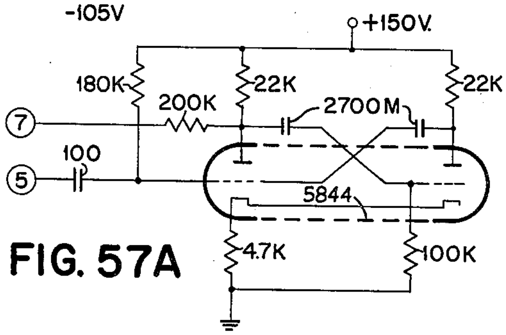
Figure 57B:
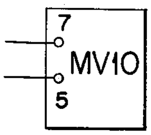
Figure 56A:
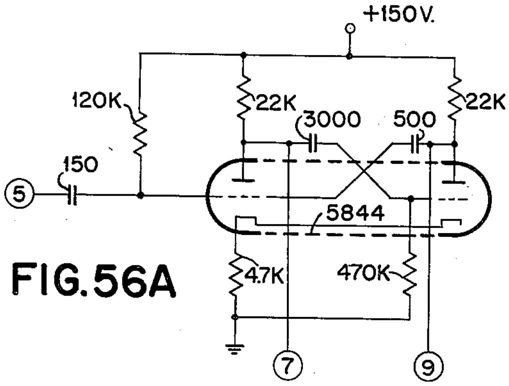
Figure 56B:
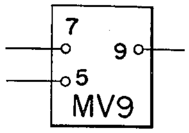
Figure 55A:
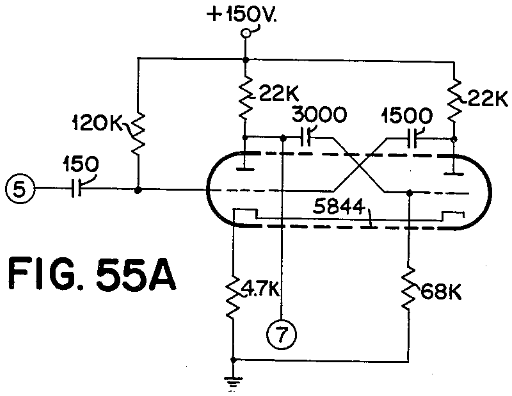
Figure 55B:
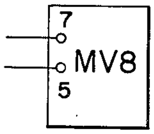

Referring to FIGS. 55A, 56A, and 57A, three type 5844 dual triodes are shown connected as single shot multivibrators. In FIGS. 55A and 57A, a plate output is taken only from the left-hand plates whereas in FIG. 56A outputs are taken from the left-hand plate and the right-hand plate. With the exception of the above described plate outputs, the only difference in the three circuits is in the value of the components whereby the output pulse is delayed varying amounts depending on the particular component values. The description of the unit shown in FIG. 56A will suffice for all three. The two cathodes are serially connected through a 4.7K ohm resistor to ground. The two plates are connected through individual 22K ohm resistors to a plus 150 volt supply. The left-hand plate is coupled through a 3000 microfarad condenser to the right-hand grid and to an output terminal 7. The right-hand plate is coupled through a 500 microfarad condenser to the left hand grid and to an output terminal 9. In the circuits shown in FIGS. 55A and 57A the output terminal 9 is omitted. The left-hand grid also is connected through a 150 microfarad condenser to an input terminal 5 and through a 120K ohm resistor to the plus 150 volt supply. The right-hand grid is tied to ground through a 470K ohm resistor. The left half of tube is normally fully conducting whereas the right half is biased to cutoff by the grid connection to ground.

When a negative pulse is fed to the input terminal 5, the left half of the tube is cut off and a positive pulse is emitted from the left-hand plate through the 3000 microfarad condenser to the right-hand grid causing the right half of the tube to conduct. Just prior to conduction of the right half of the tube, the 500 microfarad condenser was charged to a potential of plus 150 volts. When the right half of the tube commences conducting, the plate potential drops and since the voltage across the 500 microfarad condenser cannot change instantaneously, the left-hand grid potential also drops and the left half of the tube is cut off. The charge on the 500 microfarad condenser leaks off sufficiently in fifty microseconds to raise the potential of the left-hand grid to a point where the left half of the tube will conduct. When the left half of the tube commences conducting a negative pulse is impressed on the right-hand grid through the 3000 microfarad condenser thereby cutting off the right half of the tube. In the foregoing manner, each time a negative pulse is fed to the terminal 5, a negative pulse will be emitted from the terminal 9 and a positive pulse from the terminal 7. Fifty microseconds later a negative pulse will be emitted from the terminal 7 and a positive pulse from the terminal 9. One hundred microseconds after a negative pulse is fed to the terminal 5 of the multivibrator shown in FIG. 55A a negative pulse is emitted from the terminal 7. Similarly the multivibrator shown in FIG. 57A operates with a one hundred and eighty microsecond delay and delivers a negative pulse through a 200K ohm resistor to terminal 7. The block representations are shown adjacent the diagrams and are designated MV8, MV9, and MV10 as shown.

Referring to FIG. 58A, another single shot multivibrator MV11 is shown. MV11 is identical to MV10, shown in FIG. 56A, except that MV11 does not have the 200K ohm resistor between the left-hand plate and the terminal 7 and the time delay in MV11 is 150 microseconds.

Referring to FIG. 59A, still another single shot multivibrator MV12 is shown. MV12 is identical to MV11 except that the 180K ohm resistor between the left-hand grid and the plus 150 volt supply is replaced by 18K ohm and 150K ohm resistors in series to provide a time delay of 170 microseconds.

*OR circuit*

Figure 60A:
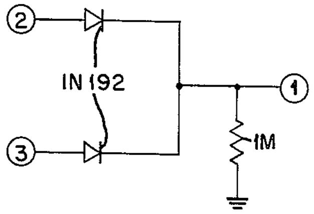
Figure 60B:
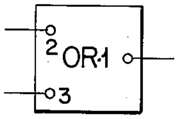
Figure 61A:
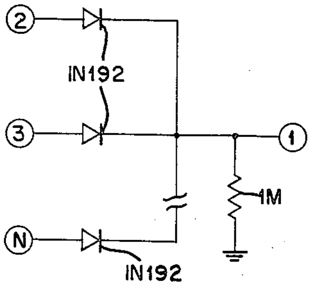
Figure 61B:
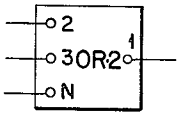

Referring to FIG. 60A, an OR circuit is illustrated. An OR circuit is an arrangement of components whereby two or more input terminals are provided, the pulsing of any one of which will cause an output pulse from a single output terminal. A variety of unidirectionally conducting devices may be employed in such a circuit but as herein applied, solid state rectifiers, for example, germanium diodes are used. The OR circuit shown in FIG. 60A comprises two diodes, but a greater number could be used, as indicated in FIG. 61A, and the description of the illustrated circuit will suffice for all OR circuits hereinafter referred to regardless of the number of diodes and input terminals. The anode of each diode is connected to ground for example, through the terminals 2 and 3 and cathode resistors of cathode follower units (not shown). The cathodes of all diodes are commoned and are tied through a 1 megohm resistor to a ground whereby the cathodes and anodes are at the same potential and the diodes are normally non-conducting. An output terminal is connected to the cathode end of the 1 megohm resistor. When a positive potential pulse is fed to any one of the input terminals, for example by the firing of the tube to whose cathode resistor the anodes of the OR circuit are tied, the associated anode becomes positive with respect to its cathode and the diode conducts through the 1 megohm resistor to ground. The potential of the cathode end of the 1 megohm resistor rises and a positive pulse is emitted from the output terminal. The cathode of the second diode, being tied to the same point as the output terminal, is made more positive thereby making its cathode more positive than its anode and thereby making the second diode appear as an even higher resistance to current flow. In the foregoing manner, the pulsing of any input terminal of an OR circuit causes a positive pulse to be emitted from the output terminal thereof. The block representations of the 2 input terminal OR unit is shown in FIG. 60B and is designated OR1. The block representation shown in FIG. 61B is designated OR2 and represents any OR unit having more than two input terminals.

Figure 62A:
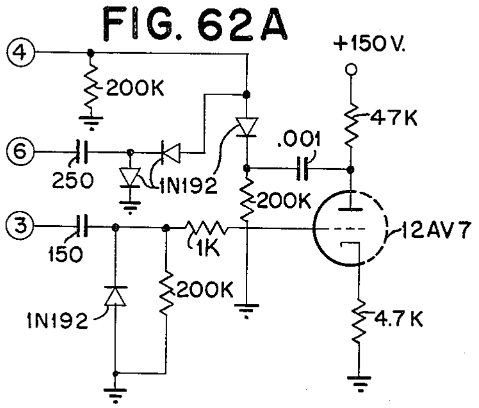
Figure 62B:
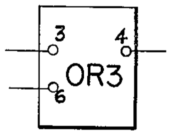

Referring to FIG. 62A, a different type of OR circuit is shown comprising one-half of a 12AV7 type dual triode. The cathode is tied through a 4.7K ohm resistor to ground; the grid is tied through a series connected 1K ohm resistor and a 150 microfarad condenser to a terminal 3; the junction of the latter resistor and condenser is tied to ground through a type 1N192 diode and also to ground through a 200K ohm resistor. The plate is tied through a 47K ohm resistor to a plus 150 volt supply and through a .001 microfarad condenser and a 200K ohm resistor in series to ground. The junction of the latter resistor and condenser is tied through a type 1N192 diode and a 200K ohm resistor to ground and the plate end of the latter 200K resistor is tied to a terminal 4. The junction of the latter diode and resistor is tied through another type 1N192 diode and a 250 microfarad condenser in series to a terminal 6. The junction of the last mentioned diode and condenser is tied to ground through still another type 1N192 diode. When a negative pulse comes into OR3 through terminal 6, it goes directly out terminal 4 through the 250 microfarad condenser and the series connected diode. When the terminal 3 receives a positive pulse, the tube conducts and a negative output is taken off the plate through the terminal 4. The block representation is shown in FIG. 62B and is designated OR3.

Figure 63A:
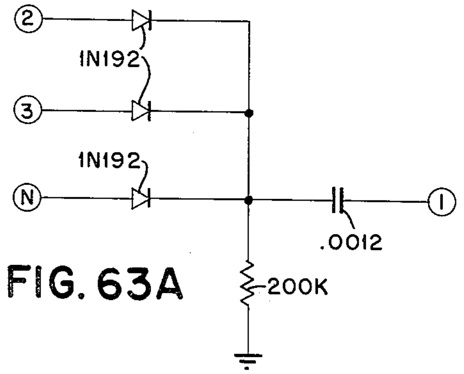
Figure 63B:
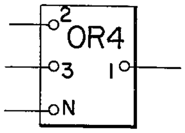

Referring to FIG. 63A, a diode OR unit is shown that is similar to the one shown in FIG. 61A except that the resistor to ground is 200K ohm and the output terminal is connected to the commoned cathodes through a .0012 microfarad condenser.

*AND circuit*

Referring to FIG. 64A, an AND circuit is illustrated. An AND circuit is an arrangement of components whereby two or more input terminals are provided, the simultaneous pulsing of all of which will cause an output pulse from a single output terminal. As in the case of the hereinbefore described OR circuit, solid state rectifiers, for example germanium diodes, are used. The cathode of each of the plurality of diodes is connected to ground for example through the cathode resistors of cathode followers. The ground connections are not illustrated in FIG. 64A since the resistor used is part of another component shown elsewhere. The anodes of the plurality of diodes are commoned and are tied through a 200K ohm resistor to a plus 150 volt supply and to an output terminal. The anodes are at a higher potential than the cathodes so all of the diodes are normally conducting. When a positive pulse of a magnitude greater than the potential of the anode is fed to one of the input terminals, for example by the firing of the connected cathode follower, the cathode of that particular diode becomes more positive than its anode and that diode ceases to conduct. Theoretically, the potential of the output terminal rises, but practically its potential remains essentially the same. When all of the commoned diodes are caused to cease conducting by feeding positive pulses to their cathodes, the current flow from the plus 150 volt supply through the 200K ohm resistor and the diodes to ground ceases and the potential of the output terminal rises to the 150 volt level thereby providing a positive pulse output. Whether the AND circuit comprises two diodes or more, all diodes must be made to cease conducting before a positive pulse output will be emitted from the output terminal. The block representations for the two input terminal AND unit is shown in FIG. 64B and is designated AND1. FIGS. 65A and 65B represent an AND unit having more than two input terminals and is designated AND2.

*Sequence register*

Referring to FIG. 66A, a 2D21 type gas tube is connected as a gate. The plate is tied through 6.8K ohm and 1K ohm resistors in series to a plus 150 volt supply. The cathode is tied to ground through 3.9K ohm and 5.6K ohm resistors in series. The screen grid is tied through a type 1N192 diode and a 150K ohm resistor connected in series to a minus 105 volt supply. The junctions of the latter diode and resistor is tied through a 33K ohm resistor to the cathode. The screen grid also is tied through a 4.7K ohm resistor and a .02 microfarad condenser connected in series to a terminal 4. The control grid is tied through a 100K ohm resistor and a 180K ohm resistor connected in series to the minus 105 volt supply. The junction of the latter two resistors is tied through a 200K ohm resistor to a terminal 8. The control grid also is tied through a 10K ohm resistor and a .02 microfarad condenser in series to a terminal 7. The tube is normally cut off, and when positive pulses are simultaneously impressed on the two grids through the terminals 4, 7, and 8, the tube fires. A negative pulse output is taken off the junctions of the 6.8K ohm and 1K ohm plate resistors. A plus 40 volt output is taken off the cathode through a terminal 3 and a positive direct current output is taken from the junction of the 3.9K ohm and 5.6K ohm resistors through a .001 microfarad condenser and a type 1N192 diode to a terminal 6. The junction of the latter diode and condenser is tied to ground through another type 1N192 diode. A negative pulse input to the terminal 5 will cause the fired tube to be extinguished. The block representation is shown in FIG. 66B and is designated SEQ REG for sequence register.

*Sequence indicator*

Referring to FIG. 67A, a 2D21 type gas tube is connected as a gate. The plate is tied through a 3.9K ohm resistor and a neon indicator bulb to a plus 150 volt supply. An output terminal 6 is tied to the plate. The cathode is tied through a 4.7K ohm resistor to ground and to an output terminal 4. The screen grid is tied to the cathode. The control grid is tied through a 1.5K ohm and a 240K ohm resistor to a minus 105 volt supply. The junction of the latter two resistors is tied through a .001 microfarad condenser to a terminal 7 and through a 470K ohm resistor to a terminal 9. The coincidence of positive pulses at the terminals 7 and 9 causes the tube to fire and emit a negative pulse at the terminal 6, and a positive pulse at the terminal 4. A switch SW1 is provided for manually opening the plate circuit to extinguish the tube. The block representation is shown in FIG. 67B and is designated SEQ IND for sequence indicator.

*Clamping circuit*

Referring to FIG. 68A, a 12AV7 type dual triode is connected in a circuit that is clamped to a minus 50 volt supply to permit an output in response to an 80 volt input pulse but not its response to a 40 volt input pulse. The left-hand and right-hand plates are each connected through individual 47K ohm resistors to a plus 150 volt supply. The right-hand plate is also tied to an output terminal 9. The cathodes are commoned and tied to ground. The left-hand grid is clamped through a 100K ohm resistor, an 1N192 type diode and a 500K ohm potentiometer to a minus 105 volt supply. The potentiometer is regulated to provide a minus 50 volt bias on the left-hand grid. The junction of the 100K ohm resistor and the diode is tied, through a .02 microfarad condenser, to a terminal 4. The left-hand plate is tied through a parallel connected .02 microfarad condenser and a 1 megohm resistor and a series connected 200K ohm resistor to ground. The plate end of the 200K ohm resistor is tied to the right-hand grid. The left half of the tube is normally biased well below cutoff by the minus 50 volt bias whereas the right half of the tube is conducting well up on its operation curve. A plus 40 volt input to the terminal 4 is ineffective whereas a plus 80 volt input to the terminal 4 causes the left half of the tube to conduct and impress a negative pulse output from the left-hand plate to the right-hand grid thereby cutting off the right half of the tube. When the right half of the tube is cut off, a positive pulse output is taken off the right-hand plate through the terminal 9. The block representation is shown in FIG. 68B and is designated CMP for comparator.

*Amplifier*

Referring to FIG. 69A, one-half of a 12AV7 type dual triode is connected as an amplifier. The plate is tied directly to an output terminal 4 and through a 100K ohm resistor to a plus 150 volt supply. The cathode is tied to ground. The grid is coupled through a 0.1 microfarad condenser to an input terminal 3 and is tied in parallel to ground through a 200K ohm resistor and a type 1N192 diode. The tube is normally conducting and when a negative pulse is impressed on the grid through the terminal 3, the tube is cut off and a positive amplified output pulse is taken off the plate through the terminal 4. The block representation is shown in FIG. 69B and is designated AMP1.

Referring to FIG. 70A, a 5965 type dual triode is connected as a two stage amplifier. Each plate is tied through an individual 47K ohm resistor to a plus 150 volt supply. The right-hand plate is tied directly to a terminal 6 and the left-hand plate is tied through a 1 megohm potentiometer to a minus 105 volt supply. The right-hand cathode is tied through a 100 ohm resistor to ground. The left-hand cathode is tied through a 6.8K ohm resistor to ground. The left-hand grid is tied through a 6.8K ohm resistor to an input terminal 3 and to ground through the 6.8K ohm resistor and a 470K ohm resistor in series. The right-hand grid is connected through a 1K ohm resistor to the above described potentiometer. The left half of the tube is normally operating near cut-off whereas the right half is fully conducting. A positive pulse impressed on the left-hand grid through the terminal 3 causes the left half of the tube to become fully conducting and the resultant negative pulse from the left-hand plate through the potentiometer biases the right half of the tube to cutoff. When the right half of the tube is cut off, a positive output pulse appears at the terminal 6. The input pulse to the terminal 3 is inverted and amplified by the left half of the tube and the output of the left half of the tube is inverted and further amplified by the right half of the tube thereby producing as an output a wave of the same phase as the initial input wave but much amplified. The block representation is shown in FIG. 70B and is designated AMP2.

Referring to FIG. 71A, a 12AV7 type dual triode is connected as a Schmitt trigger. The left-hand plate is tied through a 100K ohm resistor to a plus 150 volt supply. The right-hand plate is tied through a 15K ohm resistor to the 150 volt supply. The cathodes are commoned and tied through a 3.3K ohm resistor to ground. The left-hand grid is tied to a terminal 3 and through a 100K ohm resistor to ground. The left-hand plate is tied through two series connected 470K ohm resistors to ground. The junction of the latter two resistors is tied to the right-hand grid. The right-hand plate is tied to a terminal 8. The left half of the tube is normally nonconducting and the right half is normally conducting. When a positive pulse is impressed upon the left-hand grid through the terminal 3, the left half conducts. The potential of the left-hand plate drops and the right-hand grid is negatively biased thereby cutting off the right half of the tube and providing a positive output from the terminal 8. When the positive bias is removed from the left-hand grid, the left half of the tube is cut off and the right half is turned on, and a negative output is taken off the terminal 8. The block representation is shown in FIG. 71B and is designated TR3.

Figure 72A:
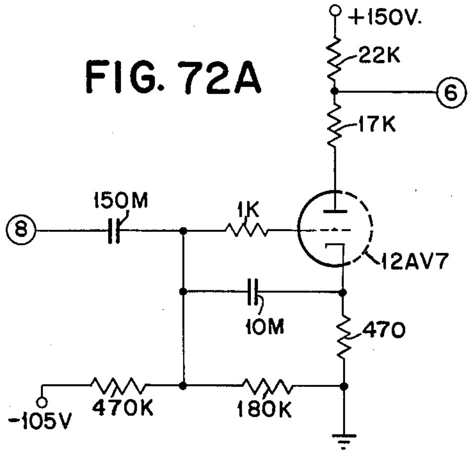
Figure 72B:
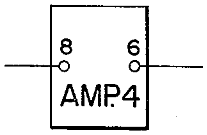

Referring to FIG. 72A, one half of a 12AV7 type dual triode is connected as an amplifier. The plate is tied through series connected 22K ohm and 17K ohm resistors to a plus 150 volt supply. The junction of the latter resistors is tied to a terminal 6. The cathode is tied through a 470 ohm resistor to ground. The grid is tied through a 1K ohm resistor and a 150 micromicrofarad condenser in series to a terminal 8. The junction of the latter resistor and condenser is connected to a voltage divider comprising a 470K ohm and a 180K ohm resistor connected between a minus 105 volt supply and ground, and through a 10 micromicrofarad condenser to the cathode. The tube is normally biased to cut off and a positive pulse on the terminal 8 fires the tube. A negative pulse is taken off the terminal 6. The block representation is shown in FIG. 72B and is designated AMP4.

Figure 73A:
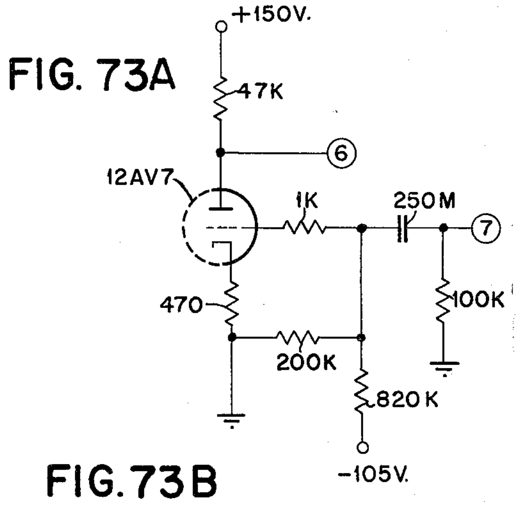
Figure 73B:
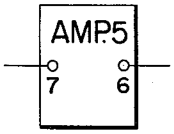

Referring to FIG. 73A, one-half of a 12AV7 type dual triode is connected as an amplifier. The cathode is tied through a 470 ohm resistor to ground. The grid is tied through series connected 1K ohm and 200K ohm resistors to ground. The junction of the latter two resistors is tied through an 820K ohm resistor to a minus 105 volt supply and through a 250 micromicrofarad condenser to an input terminal 7. The terminal end of the latter condenser is tied through a 100K ohm resistor to ground. The plate is tied to a terminal 6 and a 47K ohm resistor to a plus 150 volt supply. A positive pulse input at terminal 7 causes the tube to conduct and a negative output is available at terminal 6. The block representation is shown in FIG. 73B and is designated AMP5.

Figure 74A:
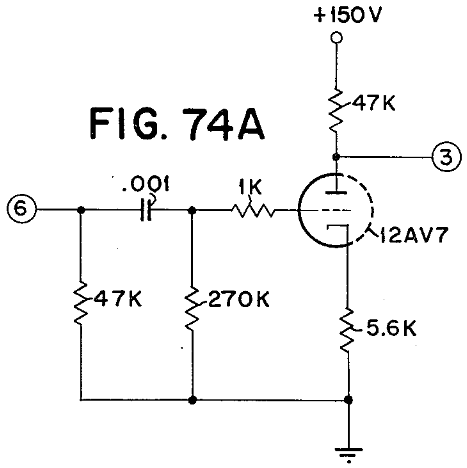
Figure 74B:
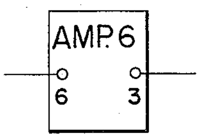

Referring to FIG. 74A, one-half of a 12AV7 type dual triode is connected as an amplifier. The plate is tied through a 47K ohm resistor to a plus 150 volt supply. The cathode is tied through a 5.6K ohm resistor to ground. The grid is tied through series connected 1K ohm and 270K ohm resistors to ground. The junction of the latter two resistors is tied through a .001 microfarad condenser and a 47K ohm resistor to ground. The junction of the latter condenser and resistor is tied to an input terminal 6. The tube is normally operating near cutoff and a positive pulse fed to the terminal 6 brings the tube to a fully conducting state. When the tube is permitted to become fully conducting, a negative potential output is taken off at a terminal 3 that is connected to the plate. The block representation is shown in FIG. 74B and is designated AMP6.

Figure 75A:
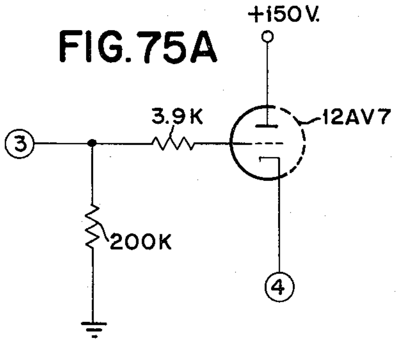
Figure 75B:
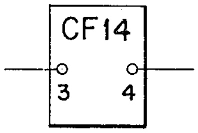

Referring to FIG. 75A, one-half of a 12AV7 type dual triode is connected as a cathode follower. The plate is tied to a plus 150 volt supply. The cathode is tied to a terminal 4, which, in practice, is connected through terminal 9 and the 10K cathode resistor of the component shown in FIG. 48A to ground (ref. FIG. 92). The grid is tied through series connected 3.9K ohm and 200K ohm resistors to ground. The junction of the latter two resistors is tied to an input terminal 3. The tube is normally non-conducting and when a positive pulse is impressed on the grid through the terminal 3, the tube conducts and the potential of the cathode and of the 10K resistor in the cathode circuit of FIG. 48A rises and prevents the tube in FIG. 48A from conducting even though a positive pulse is applied to the control grid thereof. The block representation is shown in FIG. 75B and is designated CF14.

Figure 76A:
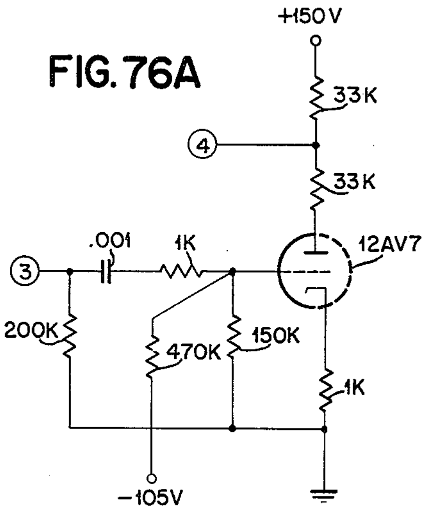
Figure 76B:
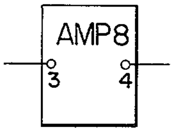

Referring to FIG. 76A, one-half of a 12AV7 type dual triode is connected as an amplifier. The plate is tied through two series connected 33K ohm resistors to a plus 150 volt supply. The junction of the latter two resistors is tied to a terminal 4. The cathode is tied through a 1K ohm resistor to ground. The grid is tied through a 150K ohm resistor to ground, through a 470K ohm resistor to a minus 105 volt supply, and through a series connected 1K ohm resistor, a .001 microfarad condenser and a 200K ohm resistor to ground. The junction of the 200K ohm resistor and the .001 microfarad condenser is tied to a terminal 3. A positive pulse applied to the terminal 3 causes the tube to conduct and an amplified negative output is taken off the terminal 4. The block representation is shown in FIG. 76B and is designated AMP8.

Figure 77A:
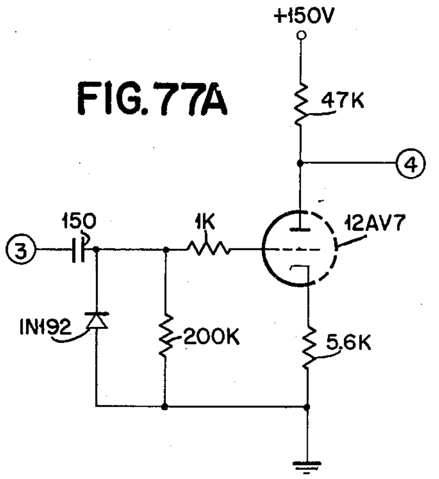
Figure 77B:
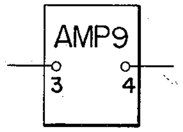

Referring to FIG. 77A, one-half of a 12AV7 type dual triode is connected as an amplifier. The plate is tied to a terminal 4 and through a 47K ohm resistor to a plus 150 volt supply. The cathode is tied through a 5.6K ohm resistor to ground. The grid is tied through 1K ohm and 200K ohm resistors in series to ground and through the 1K ohm resistor and a type 1N192 diode in series to ground. The junction of the 1K ohm resistor and the diode is coupled through a 150 microfarad condenser to a terminal 3. The tube is normally conducting and a negative pulse applied to the terminal 3 cuts off the tube and a positive amplified output is available at terminal 4. The block representation is shown in FIG. 77B and is designated AMP9.

*Trigger*

Referring to FIG. 78A, a 12AV7 type dual triode is connected as a Schmitt trigger. The cathodes are commoned and tied to ground through a 3.3K ohm resistor. The left-hand plate is tied through a 100K ohm resistor to a plus 150 volt supply. The right-hand plate is tied through a 15K ohm resistor to the plus 150 supply. The left-hand plate is tied to ground through a voltage divider comprising series connected 680K ohm and 270K ohm resistors. The right-hand grid is tied to the junction of the latter two resistors. The left-hand control grid is tied to a terminal 3 through a 0.1 micro-microfarad condenser and a 100K ohm resistor in series and in parallel through a 100K ohm resistor and a type 1N192 diode to a terminal 8. The right half of the tube is normally fully conducting whereas the left half is operating near cutoff. A positive pulse impressed on the left grid through the terminal 3 causes the left half of the tube to become fully conducting which causes the left-hand plate voltage to drop thereby biasing the right-hand grid to cutoff. When the right half of the tube cuts off, a positive pulse is emitted from the right-hand plate to a terminal 5. A negative pulse impressed on terminal 8 simultaneously with the positive pulse on terminal 3 prevents the left half of the tube from increasing its conduction. The block representation is shown in FIG. 78B and is designated TR1.

Referring to FIG. 79A, a 5844 type dual triode vacuum tube is connected as a trigger. Each plate is tied through an individual 20K ohm resistor to a plus 150 volt supply. The cathodes are commoned and grounded. Each grid is tied through 1K ohm and 200K ohm resistors in series to a minus 60 volt supply. The junctions of each of the 1K ohm and 200K ohm resistors is tied through a 40 micromicrofarad condenser to a terminal 6 (or 3). The junction of the left-hand 1K ohm and 200K ohm resistors is tied through a 200K ohm resistor and a 100 micromicrofarad condenser connected in parallel to the right-hand plate. The junction of the right-hand 1K ohm and 200K ohm resistors is tied through a 200K ohm resistor and a 100 micromicrofarad condenser connected in parallel to the left-hand plate. An output terminal 7 is connected to the right-hand plate and a terminal 8 to the left-hand plate. Either half of the trigger may be put in a non-conducting state by a negative bias on the grid. Assume that the left half of the trigger is normally conducting. When a negative pulse is fed to the left-hand terminal 6, the left half of the trigger is cut off and the positive output of the left-hand plate raises the potential of the right-hand grid so that the right half of the trigger conducts until a negative pulse to the right-hand grid reverses the condition. The block representation is shown in FIG. 79A and is designated TR2.

*Register*

Referring to FIG. 80A, two 5696 type gas tubes and a 12AV7 type dual triode vacuum tube are connected as a register. The first gas tube is designated 5696–1 and has its plate tied through a 15K ohm resistor to a plus 150 volt supply and also to an output line A. The cathode is tied to ground. The screen grid is tied through a type 1N192 diode B to a voltage divider comprising series connected 33K ohm and 150K ohm resistors that are connected between a minus 105 volt supply and ground. The screen grid also is connected through a 4.7K ohm resistor and a .02 microfarad condenser in series to a terminal 3 that is designated Enable. The control grid is tied through a type 1N192 diode C to a voltage divider comprising a 300K ohm resistor and a 1 megohm resistor connected between a minus 105 volt supply and ground. The junction of the diode C and the resistor D is tied to ground through a .02 microfarad condenser, a diode E and a 47K ohm resistor. The junction of the diode E and the 47K ohm resistor is tied to a terminal 1 that is designated First Entry. The junction of the .02 microfarad condenser and the diode E is tied through a 1 megohm resistor F to the plus 150 volt supply and through a diode G and a 33K ohm resistor to a terminal 2 that is designated Second Entry. The junction of the diode G and the latter 33K ohm resistor is tied through a 3300 microfarad condenser to ground. The gas tube is normally non-conducting and a coincidence of positive pulses on the terminals 1, 2, and 3 is required to cause the tube to fire. When the tube fires, a negative output pulse is taken from the plate through the line A. When the tube is conducting a negative pulse input to the line A will, if it is of sufficient magnitude, drop the plate voltage below the required sustaining voltage and extinguish the tube. The RC unit between the terminal 2 and ground provides a conditioning pulse delay to prevent erroneous firing of registers when double letters are sensed, for example in the word "pool."

The second gas tube is designated 5696–2 and has its plate tied through a 15K ohm resistor to the plus 150 volt supply; through a .0047 microfarad condenser to the line A; and through a 2.2 megohm resistor and a neon bulb NE to ground. The cathode is tied directly to ground. The screen grid is tied through a type 1N192 diode and a 750K ohm resistor in series to ground. The junction of the latter diode and resistor is tied through a .02 microfarad condenser to a terminal 5 that is designated Reset Suppress. The control grid is tied through series connected 10K and 47K ohm resistors to a negative bias supply, CF11 of the type shown in FIGS. 38A and 38B, of sufficient magnitude to normally maintain the tube in a non-conducting state. The junction of the latter two resistors is coupled through an .02 microfarad condenser to a terminal 4 that is designated Reset. When a positive pulse is impressed on the control grid through the terminal 4 the tube fires. When the tube fires, the potential of the plate drops and the normally glowing neon bulb is extinguished; also a negative pulse is taken off the plate through the .0047 microfarad condenser and line A to the plate of 5696–1. When the tube 5696–2 is conducting, a negative pulse of sufficient magnitude impressed on the plate through the line A from the plate of the tube 5696–1 will drop the plate potential below the sustaining value and the tube will be extinguished. When a negative pulse is impressed on the terminal 5 simultaneously with the positive pulse on the terminal 4, the tube 5696–2 will not fire.

The 12AV7 type tube is connected in the manner described with reference to FIG. 41A. The left-hand half of the 12AV7 tube is normally conducting and the right-hand half is normally non-conducting. When the tube 5696–1 fires, the negative pulse from the line A that extinguishes the tube 5696–2 is impressed through a line H onto the left-hand grid of the 12AV7 tube thereby cutting off the left-hand half. The resultant rise in potential of the left-hand plate is impressed on the right-hand grid and causes the right-hand half to conduct. An alternating output is taken from the cathode at a terminal 6 that is designated First Exit and a direct current output is taken from a terminal 7 that is designated Second Exit.

After the tube 5696–1 has fired and the tube 5696–2 has been extinguished, a positive pulse applied to the terminal 4 causes the tube 5696–2 to fire and, as described, to extinguish the tube 5696–1. However, if a negative pulse is applied to the screen grid terminal 5 at the same time that the positive pulse is applied to the terminal 4, the tube 5696–2 will remain extinguished and the tube 5696–1 will remain fired. It is obvious that when the tube 5696–1 is extinguished, the tube 12AV7 will return to its normal condition with the left-hand side conducting. The block representation for the register is shown in FIG. 80B and is designated REG.

*Photo circuits*

Referring to FIG. 81A, a photo diode has its anode connected to ground and its cathode connected through a 2.2 megohm resistor and a 50K ohm potentiometer to a plus 150 volt power supply. The other end of the 50K ohm potentiometer is tied to ground. When the photo diode is exposed to light, current flows from the 150 volt supply through the 2.2 megohm resistor and the photo diode to ground. The potential of the junction of the photo diode and the resistor drops and a negative pulse output is taken therefrom through a 0.1 microfarad condenser. The block representation of the photo diode circuit is shown in FIG. 81B and is designated PD.

Referring to FIG. 82A, a photo transistor circuit is shown. The emitter connection is tied through a 50K ohm rheostat to a plus 12 volt supply. The collector is tied to ground. The base connection is floating free and an output terminal 0 is tied to the emitter. When the base is exposed to light the transistor conducts and a negative pulse is taken off the output terminal. The block representation is shown in FIG. 82B and is designated PT.

Referring to FIG. 83A, a 12AU7 type dual triode is connected as a feedback cathode follower. The plates are commoned and tied to a plus 150 volt supply. Each cathode is tied through series connected 470 ohm and 4.7K ohm resistors to ground. The grids are tied through 680K ohm resistors to the junctions of the 470 ohm and 4.7K ohm resistors in their respective cathode circuits. The grids are connected through 1K ohm resistors to a common terminal 3. The cathodes are tied to a common output terminal 9. Both halves of the tube are normally non-conducting. A positive pulse input to the terminal 3 causes both halves of the tube to conduct and the positive output is taken off the terminal 9. The block representation is shown in FIG. 83B and is designated CF13.

*Circuit description*

The various circuits will now be described with reference only to the block diagrams, using their designated titles, the circuitry for which has been described in detail hereinbefore. When a unit is used in more than one place, the similar units are identified by suffixes. For example, the cathode follower units CF1 are identified as CF1–1, CF1–2, CF1–3, etc. Reference may be made throughout the circuit description to the timing charts shown in FIGS. 96, 97, and 98 which illustrate the time relationship of the various pulses.

Referring to FIG. 86, the twelve photo units PT12 through PT9, and the units BPD and EPD and associated pulse shaping and amplifying units are shown in block form. The fourteen units are identical in operation and the description of one will suffice for all. The output terminal of a photo unit, for example the photo transistor PT–12, is connected by a line 674–12 to the grid of an amplifier AMP1–12 through the terminal 3. The plate terminal 4 of the amplifier is connected to the grid terminal 3 of a Schmitt trigger TR1–12. The plate terminal 5 of TR1–12 is connected to the grid terminal 7 of a cathode follower CF1–12. The cathode output terminal 8 of CF1–12 is connected to the line 604–12, leading into the translator matrix 606. When PT–12 is exposed to light through a 12-hole in a detail card, a negative pulse is fed to the grid of AMP1–12, a positive pulse is fed from the AMP1–12 plate terminal 4 to the input grid 3 of the TR1–12, a positive pulse is fed from the plate terminal 5 of TR1–12 to the grid terminal 7 of CF1–12 and a positive pulse is fed from the cathode terminal 8 of CF1–12 through the line 604–12 to the translator matrix 606. In a similar manner the sensing of the holes 11 through 9 pulses the lines 604–11 through 604–9 that lead to the translator matrix 606. Between cards, all twelve of the photo transistors are lighted and means must be provided to prevent erroneous pulses from reaching the question unit 614. Means described hereinafter are provided for placing negative pulses on terminal 8 of each Schmitt trigger TR–1 during this time so that the positive pulses on the terminals 3 of all units TR–1 do not cause outputs from the units TR1. The negative pulses are fed to the units TR1 through a line 607.

*Code and translator matrix*

In the machine as described herein, the detail cards C are punched in the well-known Hollerith code, shown below, whereas the master or question card is punched in a two out of twelve code, also shown below.

| Symbol | Hollerith Code | Two-of-Twelve-Code |
|---|---|---|
| A | 12, 1 | 12, 1 |
| B | 12, 2 | 12, 2 |
| C | 12, 3 | 12, 3 |
| D | 12, 4 | 12, 4 |
| E | 12, 5 | 12, 5 |
| F | 12, 6 | 12, 6 |
| G | 12, 7 | 12, 7 |
| H | 12, 8 | 12, 8 |
| I | 12, 9 | 12, 9 |
| J | 11, 1 | 11, 1 |
| K | 11, 2 | 11, 2 |
| L | 11, 3 | 11, 3 |
| M | 11, 4 | 11, 4 |
| N | 11, 5 | 11, 5 |
| O | 11, 6 | 11, 6 |
| P | 11, 7 | 11, 7 |
| Q | 11, 8 | 11, 8 |
| R | 11, 9 | 11, 9 |
| / | 0, 1 | 0, 1 |
| S | 0, 2 | 0, 2 |
| T | 0, 3 | 0, 3 |
| U | 0, 4 | 0, 4 |
| V | 0, 5 | 0, 5 |
| W | 0, 6 | 0, 6 |
| X | 0, 7 | 0, 7 |
| Y | 0, 8 | 0, 8 |
| Z | 0, 9 | 0, 9 |
| 0 | 0 | 12, 11 |
| 1 | 1 | 2, 3 |
| 2 | 2 | 3, 5 |
| 3 | 3 | 1, 4 |
| 4 | 4 | 1, 7 |
| 5 | 5 | 1, 2 |
| 6 | 6 | 1, 9 |
| 7 | 7 | 3, 4 |
| 8 | 8 | 3, 9 |
| 9 | 9 | 3, 6 |
| # | 3, 8 | 3, 8 |
| @ | 4, 8 | 4, 8 |
| - | 11 | 8, 9 |
| & | 12 | 1, 3 |
| , | 0, 3, 8 | 2, 4 |
| $ | 11, 3, 8 | 7, 8 |
| . | 12, 3, 8 | 12, 0 |
| % | 0, 4, 8 | 5, 7 |
| * | 11, 4, 8 | 5, 8 |
| □ | 12, 4, 8 | 11, 0 |

In the Hollerith code, the holes designated 12, 11, and 0 are known as zone holes. It will be noted that the two out of twelve code representation for all alphabetic characters, the diagonal and the number and at symbols (# and @), are identical to the Hollerith representation. This is possible because the Hollerith representations for the foregoing characters each comprise two code bits. Only in the instances where the Hollerith code representations comprise one code bit or three code bits was it necessary to change the code representations to a two code bit representation. The two out of twelve code is advantageous because it provides a standard output for every character sensed and the standard output facilitates the control of various circuits. However, the machine, for practical purposes, must read the widely used Hollerith code. If the Hollerith code were used alone, the output from a single code bit character would be of one magnitude, the output from a two code bit character would be of greater magnitude, and the output from a three code bit character would be of a still greater magnitude. Using the two out of twelve code, the matching of both bits of a character code provides an output of a magnitude sufficient to actuate control circuits whereas the matching of only one bit of a character code provides an output of a magnitude that is not sufficient to actuate the control circuits. Circuits are provided as shown and described hereinafter for converting the output from the sensing of the Hollerith code into an output according to the two out of twelve code.

Previously, the amount of related data on any one subject, for purposes of searching, had to be recorded on a single card, and many coding schemes have been conceived for increasing the capacity of a card without increasing the size. One of the desirable features of the machine described herein is that a number of cards, as many as twenty-five, in the described embodiment, may be grouped together and data relating to a single subject may be punched in a plurality of cards forming a group. The data may be placed on the cards in any order and the whole group of cards is treated by the machine as one card. If data corresponding to the data in the question card is found in one or more of the cards within a group, the entire group of cards is selected. The number twenty-five is arbitrary and the principles herein applied could be used in building a machine to handle larger groups of cards.

The machine contains the sequence control unit 644 referred to hereinbefore and described in detail hereinafter for checking to see that all of the cards of each group which are numbered serially are in the proper sequence. The sequence numbers may be located in any two columns since the sequence controls are pluggable. Other identifying data may also be desired in the cards comprising a card group, for example a classification number or various other data. The classification data may be of the type that conceivably could match search data in the question card and erroneously indicate that the data searched for had been found. In order to prevent such erroneous selection, non-search data, for example, classification data or sequence numbers, is preceded by a "stop search" symbol, for example the number symbol (#) and is followed by a "start symbol," for example the special character "total" (□). The sensing of the number symbol disables the timing pulse circuits and the sensing of the total symbol enables the timing pulse circuits in a manner described hereinafter. The search data is followed by the "stop search" symbol, the sensing of which disables the timing pulse circuits. The end of card signal may be plugwired to serve as a "stop search" signal.

An "end of group" symbol, for example, the asterisk (*) is placed on the last card of a card group in the column following the last column of search data and may be plugwired to serve as a stop search signal. Also when the "end of group" signal is sensed, various circuits are actuated to effect selecting of the group of cards if that group contains desired data. The functioning of the foregoing circuits in response to the various signals is described hereinafter.

Hereinafter, in the specifications and in the claims, the words "in sequence," "conjunctive" and "non-conjunctive" are understood to have the following meanings. When desired data is sought "conjunctively," each succeeding bit of data must be found following another desired bit of data without intervening non-desired data. When desired data is sought "non-conjunctively," data other than the desired data may intervene. When data is sought "in sequence," it must be found in the stated order or sequence to satisfy the search. When data is sought "non-sequentially," the desired data if found in any sequence or order will satisfy the search.

In the Hollerith code, the coded digits one through nine and certain special characters (& and –) are represented by single code bits. All of the alphabetic characters and certain special characters, i.e., number (#), at (@) and diagonal (/) are represented by two code bits each. The following special characters, total (□), period (.), asterisk (*), dollar sign ($), percent (%) and comma (,), are represented by three code bits each.

The purpose of the translator matrix is to convert the Hollerith code to the two out of twelve code. The translator matrix must be able to distinguish when a given bit of the Hollerith code is sensed alone or with one additional bit or with two additional bits. For example, when the dollar sign ($) code is sensed thereby pulsing the lines 604–8, 604–3 and 604–11, the matrix must refrain from indicating erroneously that the number signal (#) comprising an 8 bit (hole) and a 3 bit (hole) or the digits 8 or 3 were sensed. A single unit of each type will be described and it will be understood that the others function in a similar manner.

It will be noted that the Hollerith code characters C, D, H, L, M, Q, T, U and Y contain a three hole, a four hole or an eight hole in combination with a zone hole twelve, eleven or zero. For a specific example, the code for the character "C" comprises a twelve hole and a three hole whereas the code for the "period" comprises a twelve hole, a three hole and an eight hole. When the latter three holes are sensed it is desired to pulse an intermediate line 676 that is associated with the two out of twelve code for the period and joins a decoding portion of the translator matrix with an encoding portion thereof, but not to pulse the intermediate line 676 that is associated with the letter C. The decoding portion reads the Hollerith code and supplies a pulse to a corresponding line 676. The encoding portion receives the pulse from the line 676 and converts the single pulse into the two out of twelve code. It will be noted that a unit OR1–1, shown in FIG. 87*a* has its two input terminals connected to the lines 604–3 and 604–4 so that a positive pulse on either of the latter two lines will cause a positive pulse output from OR1–1 to the grid terminal 3 of a cathode follower CF8–3. The positive output from the terminal 8 of CF8–3 is fed to one input terminal of a unit AND1–1. The other input terminal of AND1–1 is connected to the line 604–8. If the line 604–8 is pulsed coincidently with the pulsing of either of the lines 604–3 or 604–4, the output terminal of AND1–1 that is connected to the grid terminal 9 of an inverter INV1–1 is positively pulsed. The negative pulse output from the terminal 8 of INV1–1 is fed to the grid terminal 3 of the cathode follower CF9–1. The negative output from the terminal 8 of CF9–1 is fed to the left-hand input terminal of a second unit AND1–2 and to a line 678 the purpose of which will be explained hereinafter. A three input terminal unit OR2–1 responds to the pulsing of any one of the lines 604–12, 604–11 or 604–0, and since the line 604–12 is pulsed in this example, a plus pulse is emitted from the output terminal of the unit OR2–1 to the grid terminal 3 of a cathode follower CF8–1. The positive pulse output from the terminal 8 of CF8–1 pulses the second input terminal of the unit AND1–2 and also a line 680 that is connected to the left-hand terminal of a unit OR1–2, the purpose of which will be explained hereinafter. The right-hand input terminal of AND1–2 has a plus pulse thereon and the left-hand terminal a negative pulse, therefore the output terminal of the unit AND1–2 and a connecting line 681 remain at a negative potential thereby inhibiting the three-input-terminal units AND2–C, AND2–D, AND2–H, AND2–L, AND2–M, AND2–Q, AND2–T, AND2–U, and AND2–Y, shown in FIG. 87*b*. The unit AND2–C, connected to the lines 604–12 and 604–3 by lines 677 is thereby inhibited in the manner described hereinbefore with reference to FIG. 65 despite the pulsing of the other two input terminals thereof through the lines 604–12 and 604–3.

Similarly, the pulsing of the units AND2–D, H, L, M, Q, T, U, and Y is inhibited whenever a zone hole twelve, eleven, or zero and the eight hole are sensed simultaneously with the sensing of either a three hole or a four hole. In the immediately hereinbefore mentioned instances, it is desirable to pulse the intermediate lines 676 associated with the units AND1 for the characters total (□), period (.), asterisk (*), dollar sign ($), percent (%), and comma (,), since the codes for these characters comprise a zone hole (12, 11, or 0), an eight hole, and either a three hole or a four hole. This group is divided into two sub-groups, one sub-group the code for whose characters comprises a four hole and an eight hole plus a zone hole, and a second sub-group the code for whose characters comprises a three hole and an eight hole plus a zone hole. In the first sub-group are the following characters, total (□), asterisk (*), and percent (%). In the second sub-group are the characters period (.), dollar sign ($) and comma (,). Referring to FIG. 87*a*, a unit AND1–3 of the type described with reference to FIG. 64 is responsive to the coincident pulsing of the lines 604–3 and 604–8 whereas a second unit AND1–4 is responsive to the pulsing of the coincident lines 604–4 and 604–8. The output of the unit AND1–4 pulses the right-hand input terminals of each of the units AND1–□, AND 1–* and AND1–% that are associated respectively with the characters, total (□), asterisk (*), and percent (%) and the second input terminals of the latter AND units are pulsed directly from the respective lines 604–12, 604–11 and 604–0. The output of the unit AND1–3 pulses the right-hand input terminal of each of the units AND 1-period (.), AND1–$, and AND1-comma (,), that are associated respectively with the characters period (.), dollar sign ($) and comma (,) and the second input terminals of the latter AND units are pulses from the respective lines 604–12, 604–11 and 604–0.

The right-hand terminals of the units AND1–# and AND1–@ that are associated respectively with the special characters number (#) and at (@) are pulsed from the output terminals of the respective units AND1–3 and AND1–4. When the right-hand terminal of one of the units AND1–# and AND1–@, that is normally positively biased, does not simultaneously receive negative pulses from a line 682 that is tied to the output terminal 8 of a cathode follower CF9–2, the AND unit AND1–# or AND1–@ emits a positive pulse to the associated intermediate line 676. CF9–2 is actuated in the following manner: The positive pulse output that is fed from the terminal 8 of CF8–1 to the right-hand input terminal of AND1–2 is also fed to the grid terminal 9 of an inverter INV2–1 the negative output of which is fed from the terminal 8 of INV2–1 to the grid terminal 3 of the cathode follower CF9–2. The negative output from the terminal 8 of CF9–2 is fed to the hereinbefore referred to line 682. Therefore, any time a zone hole twelve, eleven or zero is sensed, the line 682 will be negatively pulsed and the units AND1–# and AND1–@ associated with the lines 676 corresponding to the characters number (#) and at (@) will be inhibited so that the latter lines are not erroneously pulsed.

Similarly, the line 676 for the digit zero is pulsed from the line 604–0 every time that a zero hole is sensed if another digit hole is not simultaneously sensed. If another digit hole is simultaneously sensed, a nine input terminal unit OR2–2 emits a positive pulse, to the grid terminal 3 of a cathode follower CF8–2, the positive output of which is fed from the terminal 8 to the grid terminal 9 of inverter INV2–2. The negative output of INV2–2 is fed from the terminal 8 to the grid terminal 3 of a cathode follower CF9–3, the negative output of which is fed through a line 679 to the right-hand input terminal of the unit AND1–Ø (AND1–ZERO). The negative pulse to the unit AND1–Ø inhibits the pulsing of the associated line 676. Similarly the pulsing of the lines 676 associated with the characters minus (—) and ampersand (&) is inhibited whenever the respective holes eleven and twelve are sensed simultaneously with the sensing of a digit hole zero through nine.

The lines 676 associated with the digits one through nine are pulsed from the respective lines 604–1 through 604–9 except when a zone hole is sensed simultaneously therewith. When a zone hole is so sensed, the unit OR2–1 is pulsed and as described hereinbefore causes the line 682 to be negatively pulsed thereby pulsing the right-hand terminals of the units AND1–#1, AND1–#2, AND1–#5, AND1–#6, AND1–#7, AND1–#9 and AND2–#3, AND2–#4 and AND2–#8 (the AND units for the digits 3, 4 and 8 differ from those for the other digits inasmuch as they have three input terminals) and inhibiting the latter AND units from pulsing the associated lines 676.

When an eight hole and either a three hole or a four hole are sensed, as in the case of the special characters number (#) and at (@) comprising respectively the combination of holes three-eight and four-eight it is necessary that the pulsing of the lines 676 associated with the digits 3, 4 and 8 be suppressed. In the hereinbefore described instances where the combinations comprise a zone hole and an eight hole plus a three hole or a four hole, the desired suppression was accomplished through the unit OR2–1 that is responsive to the sensing of any one of the zone holes twelve, eleven or zero. The present combinations (8–3 or 8–4) do not contain a zone hole so that other means are required to suppress erroneous pulsing of the lines 676 associated with the digits 3, 4 and 8. As described hereinbefore, the line 678 is negatively pulsed whenever an eight hole is sensed coincidently with a three hole or a four hole. Therefore, when the character, number (#), comprising a three hole and eight hole is sensed, a negative pulse on the line 678 inhibits the units AND2–#3 and AND2–#8. Similarly, when the character at (@) comprising a four hole and an eight hole is sensed, a negative pulse on the line 678 inhibits the units AND2–#4 and AND2–#8.

As described hereinbefore, the unit OR2–1 emits a pulse through the unit CF8–1 to one input terminal of the unit OR1–2 each time a zone hole, twelve, eleven or zero, is sensed. Similarly, the unit OR2–2 emits a pulse through the unit CF8–2 to the other input terminal of the unit OR1–2 each time a digit zero through nine is sensed. The positive output from OR1–2 is fed to the terminal 3 of a cathode follower CF10 the positive output from the terminal 8 of which is fed to the line 634. Therefore, any time one or more holes in a column or a card are sensed, a positive pulse will appear on the line 634 for use in a manner described hereinafter.

Referring to FIG. 87*c* the hereinbefore described intermediate lines 676 enter a plurality of units OR2–3 through OR2–14. Each of the lines 676 is connected to two of the latter OR units, the number of input terminals on the latter OR units varying in number from four to eleven. The latter OR units function in the same manner as those described hereinbefore inasmuch as a plus pulse is emitted from the single output terminal of an OR unit when a plus pulse is fed to any one of the input terminals of that unit. Since each line 676 is connected to two of the OR units, output pulses appear on two of the twelve output lines 608–12 through 608–9 in accordance with the two out of twelve code shown hereinbefore. For example, the line 676 associated with the unit AND1–A leads to the units OR2–3 and OR2–6 and output pulses are delivered to the lines 608–12 and 608–1.

*Comparing unit*

Referring to FIG. 27, the twelve exit lines 608–12 through 608–9 lead from the translator matrix 606 to the grid terminals 3 (or 7) of twelve cathode followers CF3–12 through CF3–9. The positive pulse outputs from the latter cathode followers are fed through the lines 612–12 through 612–9, into the question card comparator unit 614, shown in FIG. 88. In the comparator unit a brush unit comprises nine hundred and sixty contact brushes 684 that are arranged in eighty columns of twelve brushes each. The twelve brushes of each of the eighty columns have common connecting lines designated 686–1 through 686–80. A resistance network unit comprises nine hundred and sixty 200K ohm resistors 688 that are arranged in twelve rows of eighty resistors each. The eighty resistors of each of the twelve rows have common connecting lines designated 690–12 through 690–9. The lines 612–12 through 612–9 connect respectively with the common lines 690–12 through 690–9. The brush unit is fixed whereas the resistance network unit is hinged in such a manner that the free ends of the nine hundred and sixty resistors 688 may be moved into contact with the nine hundred and sixty brushes 684. The twelve brushes 684 in the column 686–1 contact the first resistors in the twelve rows of resistors 690–12 through 690–9, the brushes in column 686–2 contact the second resistors in the twelve rows 690–12 through 690–9, etc. A question card having eighty columns and twelve rows of punch positions and punched in accordance with the two out of twelve code described hereinbefore is placed between the brush and resistors units which are then locked together. A pulse from the line 612–12 reaches each of the eighty resistors 688 in the row 690–12. In any column of the question card containing a twelve hole, contact is made between a resistor 688–12 and a corresponding brush 684 through the hole and the pulse is transferred to the particular lines 686 that are associated with the columns in which the question card twelve holes appear. The foregoing is true of each of the twelve rows of resistors 690–12 through 690–9 so that each column of a detail card, as it is scanned, is compared simultaneously with each of the eighty question card columns.

Each character is represented by two holes in the two out of twelve code used in punching the question card. If one hole of the code in a question card column, for example, column five is matched by one pulse from the translator matrix 606, the line 686–5 that is associated with that column receives a plus 40 volt pulse from the cathode of one of the units CF3 which is fed to the grid terminal 4 of the comparator output unit CMP–5. The grid is clamped to a minus 50 volt supply and therefore the plus 40 volt supply is not sufficient to operate the output unit CMP–5. If both holes of the code in column five of the question card are matched by pulses from two of the lines 608–12 through 608–9, the line 686–5 receives two plus 40 volt pulses which are sufficient to operate the output unit CMP–5. Therefore, any time that both bits of the code in a column of the question card are matched, an associated comparator output unit CMP is operated. The positive output pulse from the plate of any one of the eighty units CMP–1 through CMP–80 is fed to the grid terminal 3 (or 7) of an associated one of eighty comparator output cathode followers CF2–1 through CF2–80. The positive output pulses from the eighty followers are fed to the eighty comparing exits 626 of the control panel 628.

It will be apparent that means may be provided for translating codes other than the Hollerith code to the two-out-of-twelve code.

*Timing unit*

A start search amplifier AMP8–1, shown in FIG. 90, has its control grid terminal 3 connected to a hub 693, shown also in FIG. 27, that may be connected selectively by plug wires to receive a beginning of card pulse or to a comparing exit 626 to receive a pulse derived in response to the sensing of any selected symbol, for example, the total symbol (□). The output from the terminal 4 of AMP8–1 is fed to the terminal 6 of a search trigger TR2–1, shown in FIG. 90, and causes the latter to emit a positive pulse from its terminal 8 to the terminal 9 of GT1 which in turn, causes GT1 to conduct when a plus pulse is simultaneously received from the line 634 to a terminal 6 of GT1.

A similar amplifier, AMP8–2 is connected to a hub 694, shown in FIGS. 27 and 90, and is a stop search amplifier. The hub 694 may be connected selectively by plug wires to an end of card signal hub, and an end of group signal hub or to a comparing exit 626 to receive a signal derived in response to the sensing of any selected symbol, for example, the number symbol (#). The output from the terminal 4 of AMP8–2 is fed to the terminal 3 of the search trigger TR2–1 thereby placing a negative pulse on the terminal 9 of GT1 and preventing the latter from conducting. The particular signals that are selected as start and stop signals depend upon the requirements of the card file. If a beginning of card signal is used as a start search signal, the search starts with the first column of the card. If a selected start search symbol is used, the search starts in the column following the column in which the "start search" symbol is sensed. If the hub 694 is plugged to receive an end of card signal, the search stops with the pulsing of the end of card line 604–B. If a stop search symbol is used, the search stops when the "stop search" symbol is sensed.

When a positive pulse is fed to the terminal 9 of GT1, the latter conducts and a negative output is taken off the plate terminal 3. The negative output from the plate terminal 3 is fed to the grid input terminal 5 of a one hundred microsecond delay, single shot multivibrator MV8–1 that is shown in FIG. 90. The left-hand plate of MV8–1 emits a positive pulse of one hundred microsecond duration to its terminal 7 followed by a negative spike. The terminal 7 is connected to the grid input terminal 5 of a second unit MV8–2 that is identical to MV8–1. The terminal 7 of MV8–2 is connected to the grid input terminal 5 of a fifty microsecond, single shot multivibrator MV9–1, also shown in FIG. 90. The right-hand plate of MV9–1 emits a negative pulse of fifty microseconds duration to the output terminal 9 followed by a positive spike. The negative fifty microsecond pulse from the terminal 9 of MV9–1 is fed to the grid terminal 3 of the enable amplifier, inverter and cathode follower unit INV CF3–1 shown in FIG. 90. The positive pulse output from the terminal 9 of INV CF3–1 is fed to a terminal 3 of a feed back cathode follower CF13–1. The positive output of CF13–1 is fed from terminal 9 to the grid terminals 3 of four parallel connected enable output cathode followers CF4–1, CF4–2, CF4–3, and CF4–4, shown in FIG. 90. The positive pulse outputs from the terminals 9 of CF4–1, CF4–2, CF4–3, and CF4–4 are fed to four enable lines 640 leading to the eighty registers REG. Each of the four CF4 units is connected to drive twenty registers since one alone cannot reliably drive more than that number. See the timing chart FIG. 96.

Referring back to the unit MV8–2, the negative spike output from the terminal 7 also is fed to the input terminal 6 of an OR unit OR3, shown in FIG. 90. The input terminal 3 of the unit OR3 is connected to a panel board hub designated Reset B and is pluggable to various pulse sources, some of which are a card end signal, a group end signal or the beginning of card signal. The card end and group end signals are described hereinafter. The terminal 3 may be pulsed at any time that it is desired to reset all of the registers. The negative output which is derived from the terminal 4 of OR3 in response to a negative pulse on the terminal 6 or a positive pulse on the terminal 3 is fed to the grid terminal 5 of a unit MV8–3 that is identical to MV8–1. The negative spike output from the terminal 7 of MV8–3 is fed to the grid terminal 5 of a unit MV9–2 that is identical to MV9–1. The positive fifty microsecond output from the terminal 7 of MV9–2 is fed to the grid input terminal 3 of a cathode follower CF6, shown in FIG. 90. The positive pulse output from terminal 4 of CF6 is fed to the grid input terminal 3 of a two-stage amplifier AMP2. The positive pulse output from the plate terminal 6 of AMP2 is fed to the grid input terminal 6 of a cathode follower CF5. The positive pulse output from the cathode terminal 9 of CF5 is fed to the grid input terminal 3 of a cathode follower CF13–2 that is identical to CF13–1. The output from terminal 9 of CF13–2 is fed to the terminals 3 of four cathode followers CF4–5, CF4–6, CF4–7, and CF4–8. The positive outputs from terminals 9 of the latter CF4 units are fed to four reset lines 642, each line 642 leading to twenty of the eighty registers REG. See the timing chart FIG. 96.

The negative spike pulse from the terminal 7 of MV9–2 is fed to the grid terminal 5 of the unit MV9–3 cutting off the normally conducting left half thereof. The negative fifty microsecond pulse from the terminal 9 of MV9–3 is fed to the terminal 3 of an inverter-cathode follower INV CF3–2, that is identical to INV CF3–1. The positive pulse output from terminal 9 of INV CF3– 2 is fed to the grid terminal 3 of a feed back cathode follower CF13–3. The output from the terminal 9 of CF 13–3 is fed to the terminals 3 of four enable output cathods followers CF4–9, CF4–10, CF4–11, and CF4–12. The positive pulse outputs from the terminals 9 of the latter CF4 units are fed through lines **640*a* to the four enable lines 640** leading to eighty registers REG, for a purpose described hereinafter. See the timing chart FIG. 96.

*Reset suppress circuit*

The components shown in FIGS. 34, 48, 57, 74, and 75 are combined to form the reset suppress unit 654, shown in FIGS. 27 and 92. When the amplifier AMP6, receives a positive input pulse through a hub on the panel board 628, that is designated Y for YES, to the grid terminal 6, it becomes fully conducting and a negative pulse is emitted from the plate terminal 3 thereof to the grid terminal 5 of the single shot multivibrator MV10. The negative pulse cuts off the left-hand half of MV10 and a positive pulse of 180 microseconds duration is emitted from the plate terminal 7 thereof to the terminal 7 of the inverter gate GT4, causing GT4 to conduct and emit a negative pulse from its plate terminal 4 to the grid terminal 7 of the cathode follower CF7. A negative output is taken from the cathode terminal 9 of CF7 to an exit hub that is labeled E for "EXIT" and is designated as a reset suppress pulse. If a positive pulse is fed to the grid terminal 3 of the cathode follower CF14 at the same time that the positive pulse described hereinbefore is fed to the grid terminal 6 of AMP6, the positive cathode follower output from the terminal 4 of CF14 is impressed on the cathode of GT4 through its terminal 9 thereby prevent the latter gate from conduting in response to the positive pulse from MV10 to the grid terminal 7. When GT4 fails to conduct, then CF7 fails to emit the negative suppress pulse. Reset pulses are generated in the timing unit 636, FIG. 27, and are operative through the lines 642 after the sensing of a column of a card to reset all registers that were on at the beginning of the column unless a reset suppress pulse is forthcoming from the reset suppress unit 654. The Y hubs may be plug wired to the output from the terminals 6 or 7 of a register, FIG. 80, so that the data recorded in that register will be preserved until the sensing of the next card column. The data may be preserved thereafter by providing a positive pulse to that particular Y hub each time a card column is sensed. The positive pulses may be derived from successively fired registers or from the hereinbefore referred to Any Symbol unit 638 which is shown in FIG. 27 and 93. The unit 638 receives a pulse each time a card column is sensed that contains at least one code hole. The pulse is delayed approximately one hundred and seventy microseconds in the unit 638, and is of one hundred microsecond duration. The hereinbefore described pulses are shown in FIG. 96.

Referring to FIG. 93, the line 634 is positively pulsed each time a code hole in a card is sensed and the positive pulse is fed to the terminal 3 of an amplifier AMP9 that is shown in FIG. 77. A negative output is fed from terminal 4 of AMP9 to the terminal 5 of a single shot multivibrator unit MV12, shown in FIG. 59. A negative spike pulse from the terminal 7 of MV12 is fed to the terminal 5 of a single shot multivibrator unit MV8–4 shown in FIG. 55. A one hundred microsecond positive pulse from the terminal 7 of MV8–4 is fed to the terminal 7 of a cathode follower CF12, shown in FIG. 39. The positive output from terminal 9 of CF12 is fed to a hub on the panel board 628 that is designated Any Symbol. The hub Any Symbol may be plugwired to the Y hubs of the reset suppress units 654 and will suppress resetting of selected registers until a positive pulse is fed to associated N hubs, for example from a Group End B hub. Other sources of pulses for the N hubs will be pointed out hereinafter in specific search examples.

*Registers*

The positive pulses from the enable lines 640 are fed to the suppressor grid terminals 3 of all eighty registers, REG, illustrated in FIGS. 80*a* and 80*b*, approximately two hundred microseconds after the sensing of any hole in a detail card and is of fifty microsecond duration. The control grid input terminal 2 of a register may be connected to one of two sources, either one of which provides a positive D.C. conditioning input of long duration as compared to the input signals to the terminal 1 (First Entry). If a particular register is connected to record the sensing of the first character of a word, the terminal 2 (Second Entry) is connected through panel board plugwiring to a constant D.C. source, Dummy REG2, shown in FIGS. 27 and 31. If the particular register is not connected to record the sensing of the first character of a word, the terminal 2 (Second Entry) is plugged to the D.C. output terminal 6 (Second Exit) of an associated register. The control grid input terminal 1 (First Entry) is connected, through panel board wiring to a selected one of the comparator exits 626–1 through 626–80 that receive the logical comparator output pulses from the units CMP1 through CMP80 when a match is found between columns of the question card and a scanned detail card.

When the three pulses coincidentially appear on the terminals 1 (First Entry), 2 (Second Entry) and 3 (Enable) of a register, that register turns on an A.C. and positive D.C. outputs are derived respectively from the register terminals 7 (First Exit) and 6 (Second Exit). Also when the register goes on, the reset tube 5696–2 of the register is extinguished. The positive reset pulse from the hereinbefore described timing unit reset line 642 is fed to the control grid terminals 4 (Reset) of all registers approximately three hundred microseconds after the sensing of any hole in a detail card and is of fifty microseconds duration. If a particular register is on, the positive reset pulse turns it off. However, if a negative reset suppress pulse is impressed on the suppressor grid terminal 5 (Reset Suppress) at the same time that the reset pulse is impressed on the control grid terminal 4 (Reset), the register remains on. After resetting, the hereinbefore described pulses from the cathode followers CF4–9, CF4–10, CF4–11 and CF4–12 to the enable lines 640 are effective for turning on the register REG that is associated with the first letter of a word, when it is desired to have that register on. For example, if the word being searched for is CHAR and the letter "C" is found and is followed by a second letter "C," it is apparent that the first letter "C" is not part of the word CHAR, but the second letter "C" may be the beginning of the word. Since the second letter sensed is not the letter "H," the "C" register is reset but, since the second letter sensed is the letter "C," it is desired to turn the "C" register on again. The second pulses on the line 640 arrive immediately after the reset pulses end. If, as in the proposed example, the second pulse corresponds to the first letter of a word, the register associated with the first letter is turned on. Registers other than those associated with the first letter of a word are not turned on by the second enable pulse since their conditioning terminals 2 (Second Entry) are not conditioned. The first-letter register is conditioned at all times from Dummy REG2.

The D.C. output from the register terminals 6 (Second Exit) may be connected to the grid conditioning input terminal 2 (Second Entry) of another register, to a reset suppress terminal Y, to a counter unit MV1, or to a selector relay unit MV4 for purposes that are described hereinafter.

*Selectors*

Six relay selector units are provided, each unit having six sets of points, each set comprising a common point C, a normally closed point N, and a normally open point T. When the controlling relay is unenergized, a circuit is complete from the common point through the normally closed point. When the relay is energized, the common point transfers from the normally closed point to the normally open point. A relay is energized in the following manner. When a determination to energize a selector relay is made, in a manner to be described hereinafter, a pulse is fed to the control grid terminal 7 of the relay single shot multivibrator MV4, shown in FIG. 52 and described hereinbefore, thereby conditioning MV4. At the end of a card group a Group End A pulse described hereinafter is fed to the screen grid terminal 4 of the conditioned unit MV4 causing the latter to fire and energize the associated relay 656 which is identified in FIG. 52B as Sel. Relay, and transfer the six sets of associated points. A Group End B pulse following the Group End A pulse is fed through one of the sets of relay points to fire a unit MV6 to actuate the select magnet 286 as described hereinbefore. If one-card groups are used without "end of group" symbols, a Card End A pulse triggers the selector unit MV4 and a Card End B pulse through selector points fires the unit MV6. The use of the selectors is described in greater detail hereinafter with reference to specific search examples.

*Counters*

The counters 658 referred to hereinbefore may be any suitable type, for example the "Small Remote Impulse Counter" manufactured by Sodeco Geneve in Geneva, Switzerland. The Sodeco counter is a suitable one because it is a remote impulse counter and is capable of the high speed operation required in the machine described herein. The counter contains an electromagnet that, upon being pulsed, attracts an armature and through suitable linkages advances one or more number wheels in accordance with the previous total and the newly entered value.

*Grouping*

When the beginning of card and end of card photo diodes BPD and EPD are lighted, the lines 604–B and 604–E are positively pulsed. When a card approaches the photo scanning unit 12, the photo diodes BPD and EPD are lighted and the lined 604–B and 604–E from the cathode follower CF1–B and CF1–E in the unit 602 are positively biased. When the diodes BPD and EPD are covered by the card, the lines 604–B and 604–E are negatively pulsed. See the timing charts, FIGS. 97 and 98. Referring to FIG. 91, the potential of the line 604–B is impressed upon the terminal 3 of a "group trigger," TR2–4 shown in FIG. 79.

A unit AND1–5, shown in FIG. 27, has its two input terminals connected by lines 715 and 716 to the translator exit lines 608–5 and 608–8 that correspond to the two out of twelve code for the asterisk (*). However, the lines for any character could be chosen, depending on which character is selected to indicate "end of group." The "end of group" signal is placed after the last used column in the last card of a card group. When the "end of group" signal is sensed, both of the lines 715 and 716 are positively pulsed and a positive pulse is fed to a panel board hub that is designated GP SYM for Group Symbol. The pulse is fed from the GP SYM hub through a plug wire to a hub 719 on the control panel 628 and then to the Grouping Unit 650, shown in FIGS. 27 and 91, to the terminal 8 of an amplifier AMP4, shown in FIG. 91. A negative pulse is emitted from the terminal 6 of AMP4 to the terminal 6 of the group trigger TR2–4. Normally TR2–4 is conducting on the left-hand side, but the negative going trailing edge of the beginning of card pulse through the lines 604–B and 664 flipped TR2–4 to conducting on the right-hand side. The negative output from AMP4 to the terminal 6 of TR2–4 flips the latter back to conducting on the left side and a positive pulse is emitted from the plate terminal 8 of TR2–4 to the grid input terminal 7 of the delay relay single shot multivibrator MV7–1, shown in FIGS. 91 and 54, thereby conditioning MV7–1. When an "end of card" signal is next received on the line 604–E, it is fed to the input terminal 4 of MV7–1. MV7–1 fires signifying the end of the last card of the group, picking up a delay relay R7 and emitting a pulse from the plate terminal 5 of MV7–1 through a line 724 to the terminal 3 of an inverter cathode follower INV CF2, shown in FIGS. 91 and 41. The positive output from terminal 9 of INV CF2 is fed through a group end line 726 to a panel board hub, that is labeled Group End A, for use in a manner to be described hereinafter. The group relay R7 opens a point R7–L (Lower) and closes a point R7–U (Upper). At the time that the "end of card" pulse fires MV7–1, the same pulse, through a line 728 fires a group relay single shot multivibrator MV5, shown in FIG. 52, the control grid of which is held at plus 40 volts through a bias cathode follower, Dummy REG4, shown in FIGS. 91 and 31. The group relay single shot unit MV5 picks a relay R5 closing a point R5–1 and completing a circuit from Dummy REG4 through a line 730 and the relay points R5–1 and R7–U to a "delayed group end" signal line 732 and a control panel hub, that is labeled Group End B, for use in a manner to be described hereinafter. The unit MV5 is fired at the end of each card thereby completing a circuit from the line 730 through the points R5–1 and R7–L, a line 733, a hub labeled Group Control, and a plug wire 734, shown in FIG. 27, to a group magnet single shot multivibrator unit MV2, shown in FIG. 51, that, when it fires, picks the group magnet 284, referred to hereinbefore. It will be noted, that due to the fact that the point R7–L is opened on the last card of a card group, the Group Control hub is not pulsed and the magnet 284 is not actuated for the last card of a card group. A line 736 is also connected with Dummy REG4 through the point R5–1 and at the end of each card receives a delayed pulse when the relay R5 is picked. The line 736 is connected to a panel board hub that is designated Card End B. The line 604–E terminates in a control panel hub that is designated Card End A and is pulsed instantaneously by the card end pulse whereas the hub Card End B is pulsed after a delay due to the time required to pick up the relay R5.

*Sequencing*

A first column trigger, shown in FIG. 91, is normally conducting on the left-hand side and the second column trigger on the right-hand side. If the sequence data are located in the first two columns of the card, when the group trigger TR2–4 is pulsed through the beginning of card line 604–B the negative going trailing edge of the pulse also is fed through a hub 700, a jumper wire 701 and a hub 702 to the terminal 6 of the first column trigger TR2–2 flipping it to conducting on the right-hand side. If the sequence data are located in columns other than the first two columns of the card it is preceded by a symbol that is punched in the question card. When that symbol is read a pulse appears at an associated exit hub 626 that is plugwired to the hub 702 to initiate the sequence checking. When TR2–2 flips to the right, a positive pulse is fed from the TR2–2 terminal 8 to the TR2–3 terminal 3. TR2–3 is conducting on the right-hand side so the latter positive pulse is ineffective.

When any hole is sensed in column one of the card, a positive pulse is emitted from the translator matrix on the hereinbefore described line 634 (see the timing charts FIGS. 96 and 97) to the grid input terminal 3 of a trigger TR3 that is shown in FIGS. 91 and 71 and through a line 640 to the terminal 9 of a gate GT3, shown in FIG. 47. The positive pulse from the line 634 flips the Schmitt trigger TR3 and causes a positive output from the terminal 8. At the end of column one the negative going pulse on the line 634 flips TR3 back to normal and the negative spike output from terminal 8 of TR3 is fed to the grid input terminal 3 of the first column trigger TR2–2. TR2–2 was flipped to the right by the pulse from the line 604–B and is now flipped back to the left. The negative pulse that flips TR2–2 back to the left also is fed to the grid input terminal 6 of the second column trigger TR2–3. The latter pulse is ineffective since the left half of TR2–3 is normally off. A negative pulse is fed from the terminal 8 of TR2–2 to the terminal 3 of TR2–3 causing TR2–3 to flip from conducting on the right-hand side to conducting on the left-hand side. A positive pulse, starting at the end of column one is emitted from the terminal 7 of TR2–3 to the grid terminal 3 of an enable gate GT3, shown in FIG. 47. The trigger TR2–3 remains on (conducting on the left-hand side) from the end of column one until the end of column two when the negative output from TR3 is fed to the terminal 6 of TR2–3 flipping TR2–3 back to conducting on the right-hand side.

During column two, while TR2–3 is conducting, GT3 receives a positive enabling pulse through the lines 634 and 640 in response to the sensing of data in column two of the card. It is the data in column two that is used to check the sequence of cards. The coincidence of pulses from TR2–3 and the line 640 causes GT3 to conduct and emit a negative pulse from its plate terminal 4 to the terminal 5 of a single shot multivibrator unit MV8–5 shown in FIG. 91, the negative output of which is fed from terminal 7 of MV8–5 to the terminal 5 of a single shot multivibrator unit MV9–4. The negative fifty microsecond output from the terminal 9 of MV9–4 is fed to the terminal 3 of INV CF3–3 and from the terminal 9 thereof a positive pulse (see the timing chart FIG. 96) is fed through a line 753 to a line 754, the purpose of which will be described hereinafter.

The negative output from the terminal 7 of MV9–4 is fed to the terminal 5 of a single shot multivibrator MV8–6. The negative spike output from the terminal 7 of MV8–6 is fed to the terminal 5 of a unit MV9–5 and the fifty microsecond positive pulse from the terminal 7 of MV9–5 is fed to the terminal 3 of a reset gate GT2. When the reset gate GT2 conducts, it emits a negative pulse from its plate terminal 4 to the terminal 3 of an inverter-cathode follower INV CF1–2, that is shown in FIGS. 91 and 40. The positive output from the terminal 7 of INV CF1–2 is fed through a line 759 to one of the three input terminals of an OR unit OR2–15 that is shown in FIGS. 91 and 61. The pulse from terminal 4 of GT2 also is fed through a line 760 to the terminal 6 of a sequence trigger TR2–5 that is identical to TR2 shown in FIG. 79. If a negative pulse is impressed on the grid of GT2 through its terminal 9, from a source to be described presently, at the same time that the positive pulse is impressed on the terminal 3, GT2 remains in a non-conducting state.

Ten sequence registers SEQ REG1 through SEQ REG0, of the type shown in FIG. 66, have their respective terminals 7 connected through the ten lines 668–1 through 668–0 to the respective lines 604–1 through 604–0 that enter the translator matrix 606 as shown in FIGS. 27, 86, and 91. The terminal 8 of SEQ REG1 is connected to a plus 40 volt supply Dummy REG5, shown in FIGS. 91 and 31. The terminals 8 of SEQ REG2 through SEQ REG0 are connected to the terminals 3 of the preceding SEQ REG in such a manner that each sequence register must conduct in its proper sequential order, the preceding one conditioning the succeeding one. The line 753 from INV CF3–3 is connected to the line 754 that is common to the grid terminals 4 of all sequence registers SEQ REG1 through SEQ REG0. A line 755 is common to the plate terminals 5 of all sequence registers, SEQ REG. The line 755 is tied through a line 756 and a 1K ohm resistor 758 to a plus 150 volt supply. When the terminals 7, 8, and 4 of a sequence register are positively pulsed, that register conducts emitting a positive pulse from its cathode terminal 6 through a common line 757 to the terminal 7 of an amplifier AMP5, shown in FIG. 73. A negative output pulse from terminal 6 of AMP5 is fed to the terminal 5 of a one hundred microsecond delay unit MV8–7 that is identical to the hereinbefore described units MV8. The negative output from the terminal 7 of MV8–7 is fed to the terminal 5 of a one hundred and fifty microsecond delay, single shot multivibrator unit MV11, shown in FIG. 58. The negative pulse output from terminal 7 of MV11 is fed through the line 750 to the terminal 9 of the reset gate GT2 where it functions as described hereinbefore.

When a pulse is emitted from INV CF1–2 through the line 759 or from terminal 3 of the tenth sequence register SEQ REG0 through a line 764 or from the terminal 9 of INV CF2 in the grouping unit 650 through the line 648, the three-input-terminal OR unit OR2–15 emits a pulse to the terminal 7 a reset single shot multivibrator MV3 that is described with reference to FIG. 51. The negative output from the plate terminal 5 of MV3 is fed through the line 756 to the plate terminals 5 of all sequence registers SEQ REG1 through SEQ REG0 resetting any or all conducting registers to a non-conducting state.

When the sequence of cards is interrupted, either because a card is missing or is out of order, the associated sequence register fails to conduct, the amplifier AMP5 fails to emit a pulse to MV11 which in turn fails to emit a negative suppress pulse to the terminal 9 of the GT2. GT2 then emits a negative pulse to TR2–5 and to INV CF1–2 where it is inverted and fed to the line 759 effecting the resetting of the preceding sequence registers through OR2–15, MV3 and the lines 756 and 755. The sequence trigger TR2–5 is normally conducting on the left-hand side, and when the negative pulse from the terminal 4 of GT2 reaches the terminal 6 of TR2–5, the latter is flipped to conducting on the right-hand side and a positive conditioning pulse is emitted from its terminal 8 to the terminal 9 of the sequence indicator SEQ IND that is shown in FIGS. 91 and 67. At the end of the last card of the "out of sequence" group, a pulse is fed from Dummy REG4 through the line 730, the normally open point R5–1, the normally open point 7U and the line 649 to the terminal 7 of SEQ IND, causing the latter unit to fire and emit a negative pulse from its terminal 6 to the terminal 3 of TR2–5 causing the latter to flip back to conducting on the left-hand side. A positive pulse is emitted from terminal 4 of SEQ IND through a line 674 to the terminal 7 of the unit MV6 that is shown in FIG. 27. The positive pulse on the terminal 7 actuates MV6 in the manner described hereinbefore thereby actuating the select magnet 286 to cause the "out of sequence" group of cards to be selected in the manner described hereinbefore even though the group does not contain desired data.

The hereinbefore described indicator bulb 672 in the plate circuit of SEQ IND is lighted to indicate the broken sequence. The indicator bulb 672 is extinguished as described hereinbefore in the component description by operation of the manual switch SW1, the operation of which also extinguishes the sequence indicator SEQ IND by breaking the plate circuit.

*Error check circuit*

It is also desired to provide means for checking the accuracy of the mechanical card selecting and rejecting means to ascertain whether all cards that are to be rejected actually are rejected and that all cards that are to be selected actually are selected. To this end, a photoelectric unit 593, is provided having circuitry interconnected with the contacts 244L and 244R of the contact storage drum 26. The physical mounting of the photoelectric unit 593 is shown in FIG. 1 and is described hereinbefore in the mechanical description. The unit 593 is so positioned that when a card has progressed thirty-two spaces along the transit storage belt 14 from its point of entry, it will intercept a beam of light in the unit 593 and will cause a pulse in the error check circuit. If the card was removed to the reject hopper 18 before reaching the unit 593, then a pulse will not be developed in the check circuit. Means are provided for testing to determine whether a pulse should occur or not depending on whether the card should have been selected or rejected. The circuitry for making this determination is as follows.

Referring to FIG. 85A a bridge circuit is shown, one-half of the bridge comprising two 47K ohm resistors having their junction tied to a plus 150 volt supply, and the other half of the bridge comprising the two halves of a 12AV7 type dual triode (hereinafter referred to as the lower triodes). Each cathode is tied to ground through series connected 470 ohm and 4.7K ohm resistors. The grids are tied through 47K ohm resistors to the junctions of the latter 470 and 4.7K ohm resistors. The grids of the lower triodes are also tied through series connected 1K ohm and 300K ohm resistors and a 50K ohm potentiometer to a minus 105 volt supply. The junction of the 1K ohm and 47K ohm resistors of the grids of the lower triodes are tied through 200K ohm resistors to terminals 3 and 7 respectively, and through .02 microfarad condensers to a common terminal 4. A second 12AV7 type dual triode (hereinafter referred to as the upper triode) has its two plates tied through individual 47K ohm resistors to the plus 150 volt supply. The left-hand cathode of the upper triode is tied through a 8.2K ohm resistor to the junction of the left-hand half of the bridge, comprising one of the 47K ohm resistors and one of the lower triodes. The same point of the bridge is tied through a 3.9K ohm resistor to the right-hand grid of the upper triode. The left-hand grid and the right-hand cathode of the upper triode are similarly connected to the right-hand half of the bridge circuit.

The lower triodes are both normally conducting. The circuits are so arranged and balanced that a negative pulse on the terminal 4 will extinguish the left lower triode unless a positive pulse is simultaneously impressed on the terminal 3. Similarly the right lower triode will be extinguished unless a positive pulse is simultaneously impressed on the terminal 7. When the left lower triode is extinguished, the potentials of the left-hand cathode and the right-hand grid of the upper triode are raised. A drop in potential is effected at the right-hand plate terminal of the upper triode designated Error A, and a rise in potential is effected at the left-hand plate terminal, designated Error B. Similarly, when the right lower triode, is extinguished, the potential of terminal Error B drops whereas the potential of terminal Error A rises. The latter two terminals are on the panel board 628 and are pluggable to the terminals 7 of two of the counter units MV1 shown in FIG. 50. Two of the counters 658 are designated to count respectively A and B type errors.

The terminal 4 of the lower triodes is connected through the contacts 312, shown in FIG. 10, to a suitable negative potential supply. The terminal 7 is connected to the contact wiper 315, shown in FIGS. 7, 8, and 11 and the circuit is similar to the one described in detail with reference to the contact 314 in FIG. 11. The terminal 3 is connected to the output of the photo unit 593, that is of the type shown in FIG. 81. It is apparent now that the terminal 7 is pulsed for each card that should be selected and terminal 3 is pulsed for each card that is selected. If both of the terminals 3 and 7 are pulsed at the same time, as they normally are when a card is to be selected and actually is selected, neither of the lower triodes is extinguished and the bridge remains balanced; neither half of the upper triode is effected and the associated counters are not effected.

If a card that is not to be selected erroneously slips by the reject stacker, due to a mechanical or electrical failure, the terminal 3 is pulsed whereas the terminal 7 is not pulsed. The bridge is unbalanced and the panel hub Error A is pulsed thereby entering a one-count in an associated counter 658.

If a card should be selected but is erroneously rejected, the terminal 7 is pulsed whereas the terminal 3 is not pulsed. The bridge again is unbalanced and the panel hub Error B is pulsed thereby entering a one-count in an associated counter 658.

At any time, the counter 658 may be visually checked. If the counter 658 recording A type errors does not read "zero," it indicates that a number of cards equal to the number shown on the counter have been selected that should not have been selected. This indicates that the search is valid but that it includes some extra cards that do not contain pertinent data. If the counter 658 recording B type errors reads other than "zero," the search is not valid because some cards that may contain pertinent data were rejected when they should have been selected.

*Reset A*

Referring to FIG. 84A, means are provided for supplying a positive pulse each time a switch SW2 is closed. One side of the switch SW2 is connected to a suitable positive potential supply and the other side is connected to a terminal 774 through a .02 microfarad condenser and two type IN58 diodes connected in series. The condenser is by-passed by two series connected 200K ohm resistors the junction of the latter two resistors being tied to ground. The switch SW2 is operated by a solenoid 776 having electrical connections 778 and 779. The block representation is shown in FIG. 84B and FIG. 27 and is designated Reset A. The terminal 774 of the Reset A unit is connected to a terminal 780, shown in FIG. 90. The terminal 780 is connected to the terminal 3 of the feedback cathode follower unit CF13–2 to which it supplies a positive pulse each time the solenoid 776 is actuated. The latter solenoid also is shown in FIG. 94 with electrical power connections for driving the machine. Each time the machine Start button is depressed to start the machine, the solenoid 776 is actuated to close SW2. When SW2 closes a single reset pulse is fed through the .02 microfarad condenser to the terminals 774 and 780 to the reset portion of the timing unit 636, as described hereinbefore, to assure that all registers are clear when a record searching operation is started.

In accordance with the foregoing descriptions, cards C are fed serially from the hopper 10 by the vacuum unit 528 past the photo unit 12 and into the transit storage belt 14. When a card comes opposite the reject stacker 16, it is either stacked there or is permitted to continue upwardly in the belt 14 if it is to be selected. If it is to be selected, the card is carried down the back side of the belt 14 to a point where one edge is engaged by a pair of the card pushers 160 and the other edge rests on one of the card supports 177. When the card reaches the card pocket 24, the card pushers 160 and the card support 177 move around the ends of their respective paths and drop the card into the pocket 24. If a card is not to be selected, it is removed by the reject stacker 16 and deposited in the reject hopper 18.

*Timing charts*

Referring to FIG. 96, a timing chart is shown illustrating the time relationship of various electrical pulses during the sensing of the first three columns of a card in which the first two columns contain the sequence data. The chart commences at the left with zero time designated as the time at which the sensing of the first hole commences. At zero time any holes in column one are sensed and a 478 microsecond positive pulse appears on the corresponding lines 604(12–9). An identical pulse appears on the line 634. One hundred and eighty microseconds after the beginning of the column one sensing pulse, the Any Symbol delay unit emits a pulse of one hundred microsecond duration. Two hundred microseconds after the beginning of the column one sensing pulse first enables pulses of fifty microsecond duration appear on the lines 640 and turn On any register whose number 1 and number 2 terminals are then pulsed. At the end of the enable pulses, fifty microsecond pulses appear on the lines 642 and are effective to reset all On registers unless a reset suppress pulse, starting approximately 10 microseconds after the enable pulses on the lines 640, appears at a Reset Suppress Exit that is associated with the registers are to remain On. The coincidence of the latter pulse with the reset pulses on the lines 642 suppresses the resetting. At the end of the reset pulses, second enabling pulses appear on the lines 640.

When a register turns On the D.C. output from the terminal 6 may be impressed on the terminal 2 of another register for conditioning the latter register. Due to an RC delay in the other register, the D.C. effect on the second register builds up slowly and does not reach its peak value until approximately 535 microseconds after the beginning of the column one pulse. The column one pulse ends at 478 microseconds and therefore cannot effect the firing of the second register. The need for this delay has been described hereinbefore and, briefly, is to prevent the firing of two consecutive registers that are wired to indicate the sensing of double letters, for example in the word "POOL." But for this delay, the sensing of a single letter "O" would turn On both registers thereby erroneously indicating the sensing of two consecutive letters "O." The D.C. input will remain at the attained level until removed. Below the latter pulse diagram is shown the D.C. output of the register that is fed to the above described RC delay unit. Below the latter D.C. output diagram is a diagram illustrating the A.C. output from the terminal 7 of a register when the latter is turned On.

The diagram shows that the First Column Trigger TR2–2 is On at zero time and goes off at the end of the first column sensing pulse. The Second Column Trigger TR2–3 is shown coming on when the First Column Trigger goes Off. The pulses on the lines 604, 634, Any Symbol delay, 640, and 642 are repeated for each column of the card in which any holes are sensed. The pulses at the Reset Suppress Exit are selective. The pulse to the Second Entry of a register is the same whenever received. The A.C. and D.C. outputs from any register are as shown and described for column one.

Approximately one hundred microseconds after the beginning of the second column sensing pulse a pulse of fifty microsecond duration appears on the line 753 to the Sequence unit 644 for firing a sequence register SEQ REG. Approximately one hundred microseconds after the latter pulse ends, a reset pulse may appear on the Sequence Reset line 756 to reset all sequence registers that are On. A reset suppress pulse may appear on the line 730 starting approximately fifty microseconds before the reset pulse on the line 756 and ending approximately thirty microseconds after the reset pulse. When the lines 730 and 756 are coincidentally pulsed, the On sequence registers are not reset.

If an error in sequence is detected a pulse starting approximately two hundred and fifty microseconds after the beginning of the second column sensing pulse turns the sequence trigger TR2–5 On.

The foregoing sequence of pulses is repeated for every card.

Referring to FIG. 97, a timing chart is shown illustrating various pulses that are present during the scanning of a card. The pulses from clumn three to column seventy nine are identical and therefore a break is indicated to shorten the diagram and to make possible the use of a larger and more readable scale. The chart commences at the left with time zero which is the point at which the end of the preceding card exposes the end-of-card photo-diode EPD to light and places a positive pulse on the line 604–E. Approximately 2200 microseconds later the trailing edge of the same card exposes the beginning-of-card photo-diode BPD to light thereby pulsing the lin e604–B. Approximately 10,869 microseconds after being exposed to light by the trailing edge of one card the photo-diode EPD is covered by the leading edge of the next and thereby ending the positive pulse. Approximately 2200 microseconds thereafter the card covers the photo-diode BPD thereby ending the positive pulse on the line 604–B. When the latter pulse ends, a positive pulse is emitted from the First Column Trigger TR2–2 and the Group Trigger is cut off. Approximately 13,712 microseconds after zero time the scanning of the card columns commences and pulses of four hundred and seventy-eight microsecond duration spaced two hundred and seventy-eight microseconds apart are emitted to the line 634 if holes are sensed in each card column. At the end of the first column pulse on the line 634, the First Column Trigger TR2–2 is cut off and the Second Column Trigger TR2–3 is turned on. The latter trigger remains on until the end of the second column pulse. The Group Trigger TR2–4 remains off until the sensing of the column, in this example column 80, that contains the group-end symbol.

Referring to FIG. 98, a timing chart is shown illustrating the scanning of a four-card group having the group symbol in column 80 of the fourth card. This chart illustrates the pulsing of the lines 604–E, 604–B, 604(1–12), and Group Control, and the outputs from the units MV7, MV5 and the Group Trigger TR2–4. The chart commences at the left with zero time corresponding to the time at which the leading edge of the first card of the group covers the end-of-card photo-diode EPD. The beginning-of-card photo-diode BPD is covered at 2200 microseconds. Scanning of the card columns occurs between 2817 and 63,019 microseconds. At 64,125 microseconds the photo-diode EPD is exposed to light (between cards) and at 66,325 microseconds the photo-diode BPD is exposed. At 68,325 microseconds the unit MV5 is actuated and at approximately 70,825 microseconds the relay asociated therewith picks up to provide the Group Control pulse. The same sequence of pulses occurs for the following two cards. The pulses for the last card of the group commence in the same manner except that the group relay unit MV7 picks up at approximately 291,800 microseconds to inhibit the Group Control pulse and to provide a Group End B pulse. At approximately 287,523 microseconds, at the beginning of the eightieth column that contains the end-of-group symbol, the Group Trigger TR2–4 is turned on and is held until the leading edge of the first card of the following card group blacks out the photo-diode BPD.

*Alternate method*

As an alternative to the described method in which a question card is used another method also may be employed. The question card method would be best suited to search operations where the same data is searched for a number of time. Where each search operation differs from the one preceding it, it may be more convenient to set up the search entirely by plug wiring rather than by punching a question card. FIG. 106 is a block representation indicating the portions of the block diagram shown in FIG. 27 that must be altered for the alternate method.

In the hereinbefore described method the chain of sensing pulses progresses from the photo unit 602 through the translator matrix 606, the CF unit 610, the question unit 614, the comparator output unit 618, and the CF unit 622 to the comparing exits 626 on the control panel.

In the second method certain portions of this chain are removed as shown in FIG. 106. The remaining or similar portions are designated by the same numbers with a suffix S, for example, 606S, 618S, 622S, 624S, etc. Where a component is associated with a particular character it is so designated by an additional suffix, for example, 624S–A, 624S–B, 624S–C.

Referring to FIG. 106, the decoding matrix 606S is the portion of the translator matrix 606 that is shown in FIGS. 87*a* and 87*b*. The output from the unit 606S is from the character-designated lines 676 in FIG. 87*b*. In the machine described herein, there are forty seven characters, alphabetic, numeric, and special, and therefore forty seven lines 676 emerge from the unit 606S and are fed to forty seven comparator output units CMP in the unit 618S. A unit CMP is shown in detail in FIG. 68. The outputs of the forty seven CMP units are fed through forty-seven lines 620S to forty seven cathode followers CF2 in the unit 622S. A cathode follower CF2 is shown in detail in FIG. 29. The outputs of the unit 622S are fed through forty seven lines 624S to forty-seven character-designated hubs 626S on the control panel 628. The group symbol hub GP SYM is connected directly to the line 676–* so that it is pulsed each time the asterisk code is sensed in a card.

The above described alternate system makes possible a considerable saving in components due to eliminating part of the translator matrix 606 and reducing in some places, the number of sets of components from eighty to forty-seven. A number of register devices REG in excess of the forty-seven comparing exits may be used by providing each register with a pair of commoned number one input terminals. If the three registers in FIG. 107 that are designated "A" are to be connected to the hub 626S–A to be pulsed simultaneously upon the sensing of the code A in a card, the number one input terminals are connected as shown in FIG. 107. Each character-designated register is plug wired to the corresponding character-designated hub 626S either directly or through the pairs of commoned number one terminals of the registers. Subsequent plug wiring and functioning of the registers is identical to that described hereinbefore for the system using question unit 614 and the eighty comparing exits 626,

*Search examples*

Seven specific examples are shown in FIGS. 99, 100, 101, 102, 103, 104, and 105 and are described hereinafter. The plug wiring shown in some of the examples could be altered without affecting the selection process. For example, some registers may be held in an On condition longer than is necessary to the selection process in order to use a smaller number of reset suppress units. It will be apparent that the various exemplary selection problems may be combined to form more complex search problems on the order of Example #6. In the FIGS. 99–105, portions of the panel board are shown schematically to facilitate the showing and description of the plug wiring necessary for the selection of cards according to requirements of the specific search problems. The figures include registers, REG, sets of Reset Suppress Hubs, Comparing Exits 626, Dummy Register Exits, Any Symbol Hubs, counter entry hubs, selector relay units, and sets of relay points for each, the select magnet unit MV6, Card End A, Card End B, Group End A and Group End B hubs. For convenience the terminals on only one register in each drawing have been numbered. The designations for the terminals appear in FIG. 80*b*. Also shown are an enable line 640 and a reset line 642.

EXAMPLE #1

Figure 99:
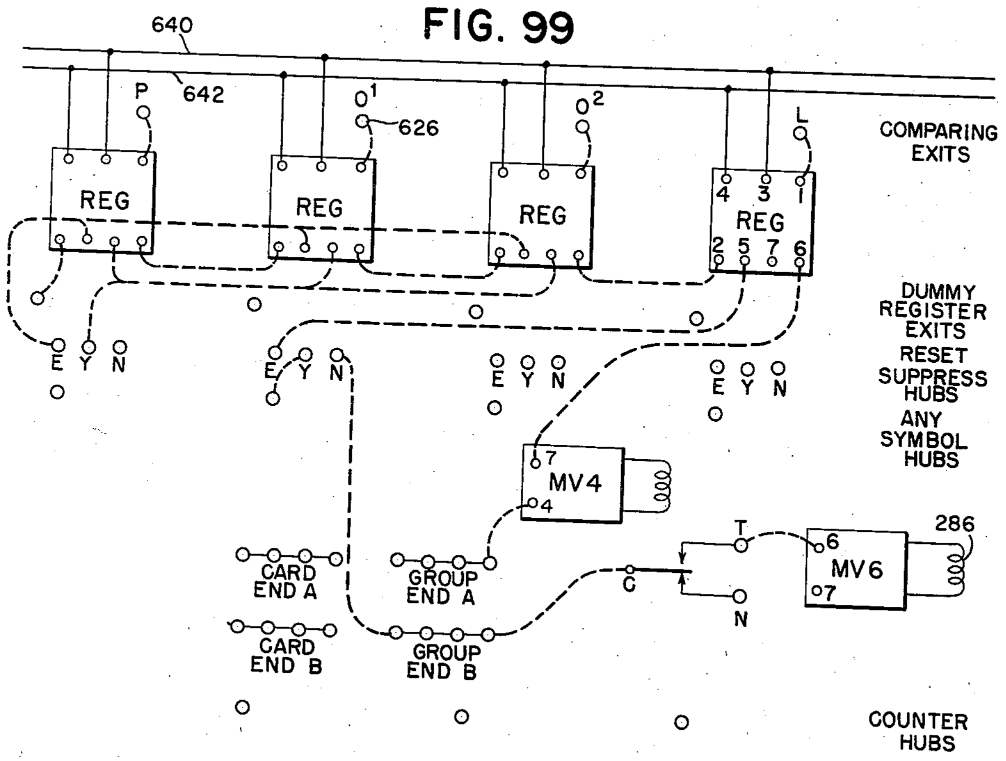

Referring to FIG. 99, the problem is to select a group of cards containing the word POOL. To satisfy the search, the letters P, O, O, and L must be found within the card group and without other letters intervening and in the stated order. For example, the sensing of POOAL does not satisfy the search requirements. Neither does the sensing of POLO satisfy the search. The machine ignores blank columns in the scanned cards so PO OL will satisfy the search. The question card in the question unit 614 is punched POOL so that the sensing of those letters in the photo scanning unit causes pulses to appear on four selected comparing exits 626 that, in this example, are designated respectively P, $O^1$, $O^2$, and L. Each of the four comparing exits 626 is plug wired to the First Entry or logic terminals 1 of the registers hereinafter referred to as the P register, the $O^1$ register, the $O^2$ register and the L register. The Enable terminals 3 of all registers are permanently wired to the enable line 640 from which the hereinbefore described timing pulses are fed in response to the sensing of bits of data in the search cards. The Reset terminals 4 of all registers are permanently wired to the reset line 642 from which reset pulses are automatically fed in response to the sensing of data in the search cards. The Second Entry or conditioning terminal 2 of the P register is plug wired to a Dummy Register exit. The First or D.C. exit, terminal 6 of the P register is plug wired to the conditioning terminal 2 of the $O^1$ register. The D.C. exit of the $O^1$ register is plug wired to the conditioning terminal 2 of the $O^2$ register. The D.C. exit of the $O^2$ register is plug wired to the conditioning terminal 2 of the L register. The Second or A.C. exits of the registers P, $O^1$ and $O^2$ are commoned and plug wired to the Y (yes) input hub of a selected reset suppress unit 654. The corresponding E (Exit) hub of the reset suppress unit 654 is plug wired to the Reset Suppress terminals 5 of the registers P, $O^1$ and $O^2$. The E hub of another reset suppress unit 654 is plug wired to the Reset Suppress terminal 5 of the L register. The corresponding Y hub is plug wired to an Any Symbol hub. The corresponding N hub is plug wired to a Group End B hub. The D.C. exit of the L register is plug wired to the conditioning terminal 7 of a selector relay unit MV4. The terminal 4 of the latter unit MV4 is plug wired to a Group End A hub. A Group End B hub is plug wired to the common point C of one of the sets of points of the unit MV6 and the transfer point T is plug wired to the select magnet unit MV6.

Assume that the letters P, O, O and L appear adjacent one another and in that sequence so that the search will be satisfied and the unit MV6 will be actuated at the end of the card group. First the letter P is sensed and the hub 626 associated with the P register is pulsed. The P register terminal 2 is constantly conditioned from the Dummy Register so that the P register turns on when the enable pulse is received from the line 640. The P register is held in the on condition by its own A.C. output from the terminal 7 through the reset suppress unit and back to the P register reset suppress terminal 5. The D.C. output from the terminal 6 of the P register conditions the $O^1$ register.

When the next card column, containing the letter O is sensed, the conditioned $O^1$ register is turned on; the A.C. output suppresses resetting of the P and $O^1$ registers and the D.C. output conditions the $O^2$ register.

A second letter O is sensed in the next card column and the conditioned register $O^2$ is turned on; the A.C. output suppresses resetting of the P, $O^1$ and $O^2$ registers and the D.C. output conditions the L register.

When the next card column containing the letter L is sensed the conditioned L register is turned On. The L register thereafter is held in its On condition by delayed Any Symbol pulses through another reset suppress unit 654 for the duration of the card group. The D.C. output of the L register is plug wired to the conditioning terminal 7 of one of the six selector relay units MV4. After the L register is turned on, a reset pulse from the line 642 resets the registers P, $O^1$ and $O^2$. The latter three registers could be held in the On condition but it would serve no useful purpose.

At the end of the card group the conditioned unit MV4 is triggered by the instantaneous Group End A pulse and transfers its relay points. After a short delay a Group End B pulse is fed through the transferred point T of the actuated unit MV4 to the select magnet unit MV6. The actuated unit MV6 causes the group of cards to be selected in the manner described hereinbefore. The Group End B pulse also is fed to the N terminal of the reset suppress unit 654 that held the L register and the latter register is reset.

Referring again to FIG. 99, if the sensed character following the letter P had been any character other than the letter O, the $O^1$ register would not have been turned On and the reset suppress unit 654 would not have been pulsed. The P register would have been reset by a pulse from the line 642 and the machine would again be searching for the letter P. For example, if a series of characters PH POOL are arranged in the scanned card, the P register will go On when the first letter P is sensed. When the letter H is sensed the P register will go Off. When the second letter P is sensed the P register will go On and will stay On through the sensing of the two successive letters O and the letter L. After the letter L is sensed and the L register goes On the registers P, $O^1$ and $O^2$ go Off. When the first letter O is sensed, the register $O^2$ is not turned On because it must be conditioned by the register $O^1$ and a delay circuit within each register delays the conditioning pulse so that the logic and the enabling pulses that turned the $O^1$ register On ended before the $O^2$ register was conditioned. If the conditioning were instantaneous, the sensing of a single letter O would fire both O registers thereby indicating erroneously that two successive letters O had been sensed.

EXAMPLE #2

Figure 103:
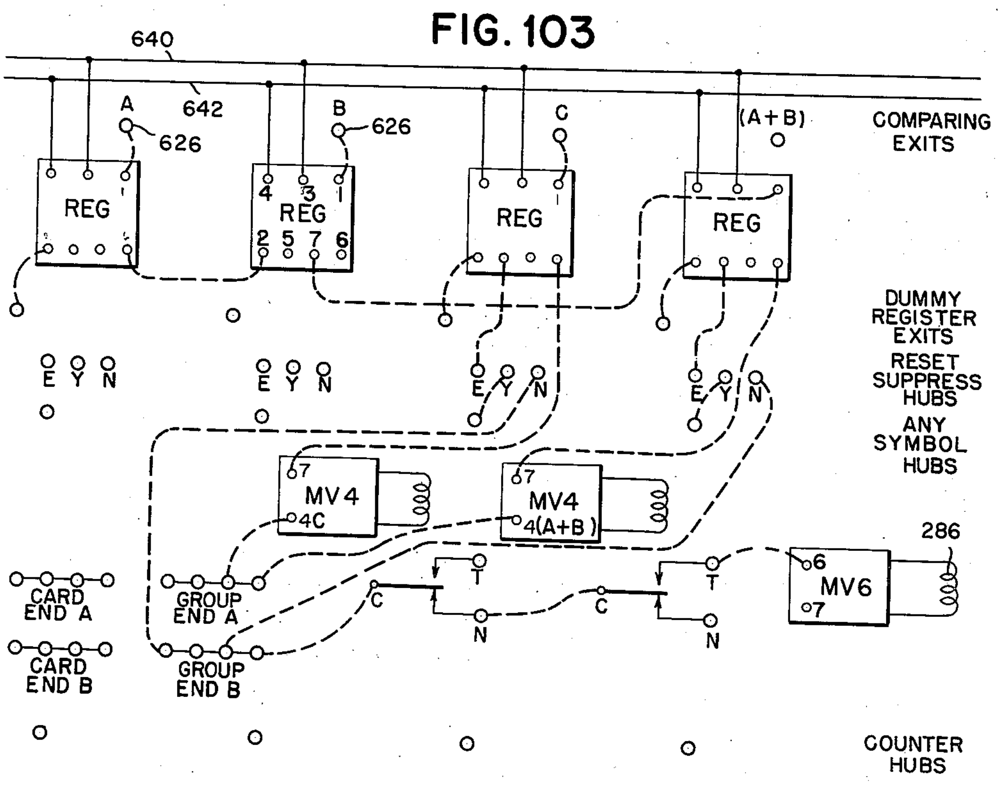

In this example and in following examples, the data required to satisfy the search are designated A, B, C, etc. The designated data may be the characters A, B, C, etc., or in accordance with the Example #1 may represent words, for example, the word POOL in Example #1. A register designated A, B, C, etc., may represent the last register of a word-group of registers so that when, for example, register A is stated to be On, it is understood that the word represented by a group of registers has been found and the last register in that group is On. Register A, for example, may also indicate that a word register is On. A word register is used when it is desired to turn off the register making up the word-group but where the fact that the word has been found must be indicated. In such an instance the last register of a word-group is connected to turn a word register On. An example of a word register is shown in FIG. 103 where it is designated (A and B) and is described hereinafter in Example #5.

The problem in Example #2 is to select a group of cards containing data A and B where A and B may be found in the order AB or BA but other data must not intervene, for example AXB or BXA.

Figure 100:
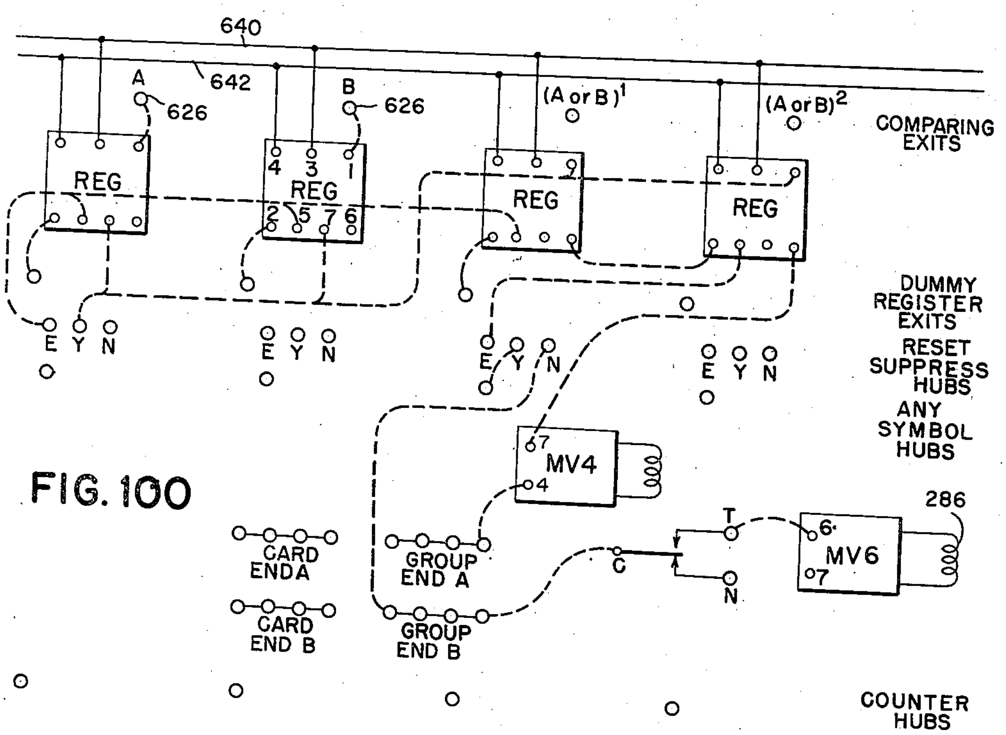

Referring to FIG. 100, the four registers or storage means shown therein are divided into two sub-groups, the registers A and B comprising the first sub-group being designated primary registers, and the registers $(A \text{ or } B)^1$ and $(A \text{ or } B)^2$ comprising the second sub-group being designated intermediate registers. Each register has its terminal 1 plug wired to selected comparing exits 626 in accordance with the search problem and the punching of the question card. The registers A and B, have their A.C. output terminals 7 commoned and connected to the Y hub of a reset suppress unit 654 (FIG. 27) and to the logic terminal 1 of the registers $(A \text{ or } B)^1$ and $(A \text{ or } B)^2$. The corresponding E hub is plug wired to the reset suppress terminal 5 of the registers A, B and $(A \text{ or } B)^1$. The conditioning terminal 2 of the latter three registers are plug wired to Dummy Register exits. The D.C. output of the register $(A \text{ or } B)^1$ is connected to the conditioning terminal 2 of the register $A \text{ or } B)^2$. The D.C. output terminal of the register $(A \text{ or } B)^2$ is connected to the conditioning terminal 7 of a selector relay unit MV4. The reset suppress terminal 5 of the register $(A \text{ or } B)^2$ is connected to the E hub of a second reset suppress unit 654. The Y hub of the latter unit 654 is connected to a delayed Any Symbol hub. The N hub of the latter unit 654 is connected to a Group End B hub. The triggering terminal 4 of the unit MV4 is connected to a Group End A hub.

Assume that data A is found followed by data B. When data A is sensed, the register A that is conditioned from a Dummy Register exit is turned On. The A.C. output from the terminal 7 of the A register pulses the logic terminals 1 of the registers $(A \text{ or } B)^1$ and $(A \text{ or } B)^2$. The register $(A \text{ or } B)^1$ is conditioned from a Dummy Register exit and is turned On whereas the register $(A \text{ or } B)^2$ that is not conditioned is not turned On. The A.C. output of the register A also pulses the reset suppress unit 654 and suppresses resetting of the registers A and $(A \text{ or } B)^1$.

When the immediately following data B is sensed, the B register is turned On; the A.C. output from the terminal 7 of the B register pulses the terminal 1 of the registers $(A \text{ or } B)^1$ and $(A \text{ or } B)^2$. Register $(A \text{ or } B)^1$ is On so the pulse to that register is ineffective. The D.C. output of register $(A \text{ or } B)^1$ is conditioning the register $(A \text{ or } B)^2$ so the pulse from the register B turns the register $(A \text{ or } B)^2$ On. The register $(A \text{ or } B)^2$ is held thereafter by delayed Any Symbol pulses through the second reset suppress unit 654. The register A, B and $(A \text{ or } B)^1$ are reset by a pulse from the line 642. The D.C. output from the register $(A \text{ or } B)^2$ conditions the selector relay unit MV4. At the end of the card group, a Group End A pulse triggers the unit MV4 transferring the relay points. A delayed Group End B pulse through the transferred relay point T actuates the select magnet unit MV6 and, through the reset suppress unit 654 causes the register $(A \text{ or } B)^2$ to be reset. It is apparent that the data B could have been sensed before the data A since both of the registers A and B are conditioned from a Dummy Register exit. The subsequent operation would be the same. It also is apparent that if other data intervened between the data A and B the first register to be turned On would be turned Off when the intervening data was sensed since a reset suppress pulse would not be emitted to suppress resetting.

EXAMPLE #3

Figure 101:
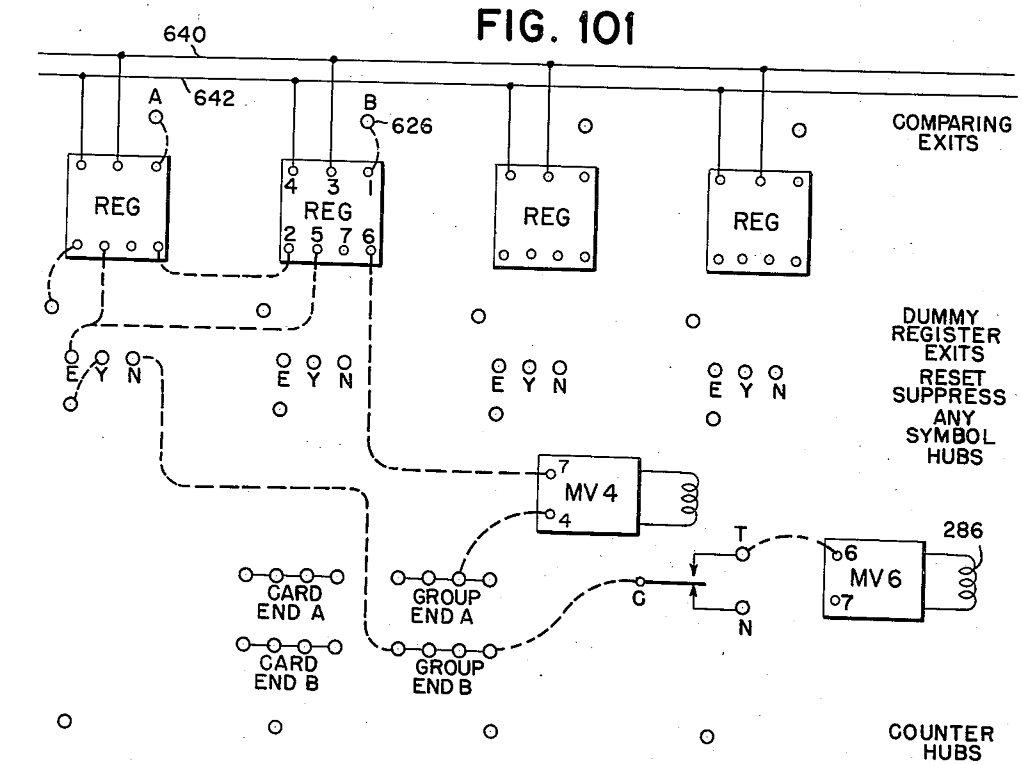

The problem in Example #3 is to select a group of cards containing data A and data B where the data must be sensed in the order AB but where other data may intervene, for example, ACXWB. For this example, only two registers, which may be letter registers, word-group registers or word registers, are required. Referring to FIG. 101, the logic terminals 1 are plug wired to selected comparing exits 626 in accordance with the search problem and the punching of the question card. The A register terminal 2 is connected to a Dummy Register exit. The B register terminal 2 is connected to the D.C. output terminal of the A register. The D.C. output terminal of the B register is connected to the conditioning terminal 7 of a selector relay unit MV4. The triggering terminal of the latter unit MV4 is connected to a Group End A hub. The reset suppress terminals 5 of the A and B registers are commoned and are connected to the E hub of a reset suppress unit 654. The corresponding Y hub is connected to a delayed Any Symbol hub. The corresponding N hub is connected to a Group End B hub. The triggering terminal 4 of the unit MV4 also is connected to a Group End B hub.

When the data A is sensed the conditioned A register is turned On thereby conditioning the B register. The A register will be held by the delayed Any Symbol pulses for the duration of the card group until reset by the Group End B pulse and will not be reset by the sensing of other data. When the data B is sensed, the B register that is conditioned by the A register is turned On conditioning the unit MV4. The B register will be held by delayed Any Symbol pulses for the duration of the card group. It would be possible to turn off the A register under the control of the B register but that would serve no useful purpose and would require the use of additional components such as reset suppress units 654 or selector relay units MV4. At the end of the card group a Group End A pulse triggers the conditioned unit MV4 transferring the relay points. A Group End B pulse through the transferred point T actuates the selector magnet unit MV6. The Group End B pulse also causes the A and B registers to be reset.

EXAMPLE #4

The problem in Example #4 is to select a group of cards containing data A and data B where A and B may occur in the order AB or BA and where the other data may intervene, for example, ACDXB or BCDXA. Since the machine ignores blank columns, they also may intervene.

Figure 102:
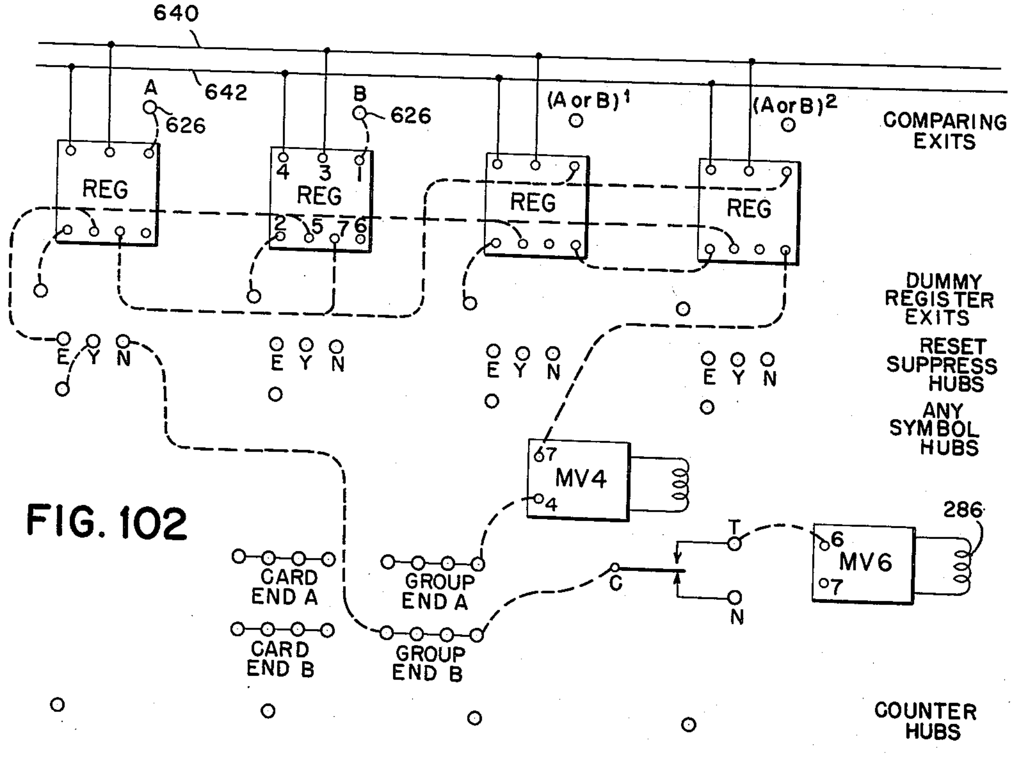

Referring to FIG. 102, four registers or storage means are required and are divided into two sub-groups, the registers A and B comprising the first sub-group being designated primary registers, and the registers $(A \text{ or } B)^1$ and $(A \text{ or } B)^2$ comprising the second sub-group being designated intermediate registers. The logic terminal 1 of the A and B registers are plug wired to selected comparing exits 626 in accordance with the punching of the question card. The A, B, and $(A \text{ or } B)^1$ registers are conditioned from Dummy Register exits. The $(A \text{ or } B)^2$ register conditioning terminal 2 is connected to the D.C. output terminal 6 of the $(A \text{ or } B)^1$ register. The reset suppress terminals 5 of all four registers are commoned and connected to the E hub of a reset suppress unit 654. The corresponding Y terminal is connected to an Any Symbol hub. The corresponding N hub is connected to a Group End B hub. The A.C. output terminals 7 of the A and B registers are commoned and are connected to the logic terminals 1 of the $(A \text{ or } B)^1$ and $(A \text{ or } B)^2$ registers. The D.C. output terminal 6 of $(A \text{ or } B)^2$ register is connected to the conditioning terminal 7 of a selector relay unit MV4. The triggering terminal 4 of the latter unit is connected to a Group End A hub. The common point C of one set of points of the unit MV4 is connected to a Group End B hub. The associated transfer point T is connected to the select magnet unit MV6. Assume that data B is sensed first and is followed some time later by data A, although the operation would be similar if data A were sensed first. When data B is sensed the B register is turned On. The A.C. output from the terminal 7 of the B register is fed to the terminals 1 of the (A or B)$^1$ and (A or B)$^2$ registers. The (A or B)$^1$ register is conditioned from a dummy register exit so it is turned On. The non-conditioned (A or B)$^2$ register is not turned On. The D.C. output from the terminal 6 of the (A or B)$^1$ register conditions the (A or B)$^2$ register. The registers B and (A or B)$^1$ are held by the delayed Any Symbol pulse. The data A may be sensed immediately or after intervening data since the On registers are held by the Any Symbol pulses. When the data A is sensed the conditioned A register is turned On. The A.C. output from the terminal 7 of the A register is fed to the terminal 1 of the (A or B)$^1$ and (A or B)$^2$ registers. The (A or B)$^2$ register, conditioned by the (A or B)$^1$ register, is turned On. The D.C. output from the terminal 6 of the (A or B)$^2$ register conditions the selector relay unit MV4. The registers A, B (A or B)$^1$ and (A or B)$^2$ are held by the delayed Any Symbol pulses.

At the end of the card group the unit MV4 is triggered by a Group End A pulse. A Group End B pulse through the transferred relay point T actuates the select magnet unit MV6. The Group End B pulse also causes the four registers to be reset.

EXAMPLE #5

The problem in the Example #5 is to select a group of cards containing data A and data B where the data A and B occur in the sequence AB and where other data does not intervene between the data A and B. It is also desired that if data C also is found in the same card group that the card group will not be selected. Referring to FIG. 103, four registers are required and are designated A, B, C and (A+B). The logic terminals 1 of the registers A, B and C are plug wired to comparing exits 626 in accordance with the punching of the question card. The conditioning terminals 2 of the A, C and (A+B) registers are plug wired to Dummy Register hubs. The conditioning terminal 2 of the B register is connected to the D.C. output terminal 6 of the A register. The A.C. output terminal 7 of the B register is connected to the logic terminal 1 of the (A+B) register. The reset suppress terminal 5 of the C register is connected to the E hub of a selected reset suppress unit 654. The corresponding Y hub is connected to an Any Symbol hub and the corresponding N hub is connected to a Group End B hub. The D.C. output terminal 6 of the C register is connected to the conditioning terminal 7 of a selected relay unit MV4 that is further designated MV4–C. The triggering terminal 4 of the unit MV4–C is connected to a Group End A hub. The reset suppress terminal 5 of the (A+B) register is connected to the E hub of a second reset suppress unit 654. The corresponding Y and N hubs are connected respectively to an Any Symbol hub and a Group End B hub. The D.C. output terminal 6 of the (A+B) register is connected to the conditioning terminal 7 of a second selector relay unit MV4 that is further designated MV4–(A+B). The triggering terminal 4 of the latter unit MV4 is connected to a Group End A hub. A Group End B hub is connected through a normally closed point N of the selector relay unit associated with the C register to the common point C of a set of relay points of the selector relay associated with the (A+B) register. The transfer point T is connected to the select magnet unit MV6. Assume that the data A and B are found in the specified order and without intervening data and that later in the same card group the data C is found. When the data A is sensed the conditioned A register is turned On by the first enable pulse, is reset by the reset pulse and is turned On again by the second enable pulse. The D.C. output from the terminal 6 of the A register conditions the B register. When the immediately following data B is sensed the conditioned B register is turned On. The A.C. output from the terminal 7 of the B register to the terminal 1 of the (A+B) register that is conditioned from a Dummy Register exit turns the latter register On and it is held thereafter by delayed Any Symbol pulses. The D.C. output from the terminal 6 of the (A+B) register conditions the unit MV4–(A+B). The registers A and B are reset by a reset pulse from the line 642. When the data C is sensed the C register, conditioned from a Dummy Register exit, is turned On and is held thereafter by delayed Any Symbol pulses. The D.C. output from the terminal 6 of the C register conditions the selector relay unit MV4–C. At the end of the card group, Group End A pulses to the terminals 4 of the selector relay units MV4–C and MV4–(A+B) turn on the latter two units and transfer the associated relay points. The Group End B pulse is blocked by the now open point N of the unit MV4–C. If the data A and B is found and the data C is not found, a circuit is complete, at the end of the card group, from the Group End B hub through the C and N points of the unit MV4–C and the points C and T of the unit MV4–(A+B) to the select magnet unit MV6, and the group of cards is selected.

EXAMPLE #6

Figure 104:
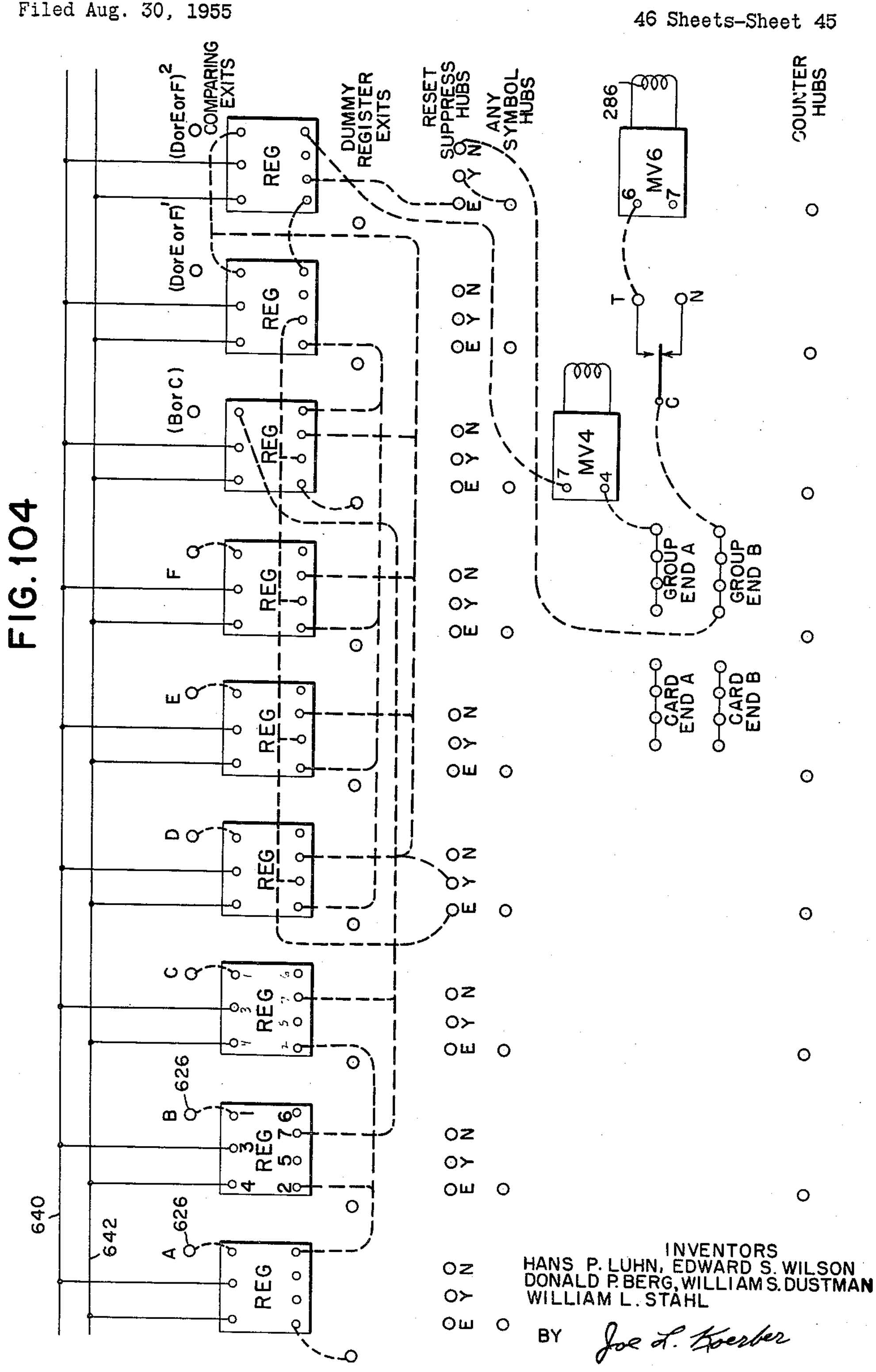

The problem in the Example #6 is to select a group of cards containing data A followed by data B or data C followed by any two of data D, E, and F where data B or C must follow data A without intervening data and where any two of data D, E, and F must follow the data B or C without intervening data. However the required two of the last three bits of data may be in the orders DE, DF, ED. EF, FE or FD. Referring to FIG. 104, nine registers are required and are designated A, B, C, D, E, F, (B or C), (D or E or F)$^1$ and (D or E or F)$^2$. The logic terminals 1 of the registers A, B, C, D, E, and F are connected with selected comparing exits 626 in accordance with the punching of the question card. The conditioning terminals 2 of the registers A and (B or C) are connected to Dummy Register R exits. The conditioning terminals 2 of the registers B and C are commoned and connected to the D.C. output terminal 6 of the A register. The conditioning terminals 2 of the registers D, E, F, and (D or E or F)$^1$ are connected to the D.C. output terminal 6 of the (B or C) register. The conditioning terminal 2 of the register (D or E or F)$^2$ is connected to the D.C. output terminal 6 of the register (D or E or F)$^1$. The reset suppress terminals 5 of the registers D, E, F, (B or C) and (D or E or F)$^1$ are connected to the E hub of a selected reset suppress unit 654. The corresponding Y hub is connected to the commoned A.C. output terminals 7 of the registers D, E, F, and (B or C). The commoned A.C. output terminals of the registers D, E, F, and (B or C) also are connected to the logic terminals 1 of the registers (D or E or F)$^1$ and (D or E or F)$^2$. The A.C. output terminals 6 of the B and C registers are commoned and are connected to the logic terminals 1 of the (B or C) register. The reset suppress terminal 5 of the register (D or E or F)$^2$ is connected to the E hub of another reset suppress unit 654 and the corresponding Y and N hubs are connected respectively to Any Symbol and Group End B hubs. The D.C. output terminal 6 of the register (D or E or F)$^2$ is connected to the conditioning terminal 7 of a selector relay unit MV4. A Group End B hub is connected to a common point C of the unit MV4 and the associated transfer point T is connected to the select magnet unit MV6.

When the data A is sensed the A register is turned On by the first enable pulse, Off by the reset pulse and On again by the second enable pulse. The B and C registers are conditioned by the A register. The next step is the same if either data B or data C is sensed without other data intervening between it and the data A. Assume that data C is sensed. The C register is turned On and the A.C. output from the terminal 7 thereof to the terminal 1 of the (B or C) register turns the latter On. The A and C registers are reset by the reset pulse from the line 642 but through the first mentioned reset suppress unit 654 the resetting of the (B or C) register is suppressed. The next step will be the same if any data D or E or F is sensed immediately after the data C. Assume that data F is sensed. The F register is conditioned by the (B or C) register and is turned On. The A.C. output from the terminal 7 of the F register turns On the register (D or E or F)$^1$ that is conditioned from a Dummy Register exit. The registers F, (B or C), and (D or E or F)$^1$ are held through the reset suppress unit by the A.C. output from the terminal 7 of the F register. The sensing of either data D or data E will complete the search requirements. If the F register were permitted to turn Off then the sensing of data F a second time would erroneously indicate that the search requirements had been met. Assume that data D is sensed. The D register is conditioned by the (B or C) register that is still On and is turned On by the sensing of the data D. The A.C. output from the terminal 7 of the D register turns On the register (D or E or F)$^2$ that is conditioned by the register (D or E or F)$^1$ and, through the reset suppress unit 654 holds the register D, F, (B or C) and (D or E or F)$^1$. The holding of the latter register serves no useful purpose at this time but the holding circuits were necessary to meet the requirements of the search. The register (D or E or F)$^2$ is held thereafter through the second mentioned reset suppress unit 654 by delayed Any Symbol pulses. The D.C. output from the terminal 6 of the register (D or E or F)$^2$ conditions the unit MV4. When the next data is sensed in the scanned card, the registers D, F, (B or C) and (D or E or F)$^1$ are reset by a pulse from the line 642. At the end of the card group a Group End A pulse triggers the unit MV4 transferring the associated contacts. A Group End B pulse through the points of the unit MV4 actuates the select magnet unit MV6 and also causes the register (D or E or F)$^2$ to be reset.

EXAMPLE #7

Figure 105:
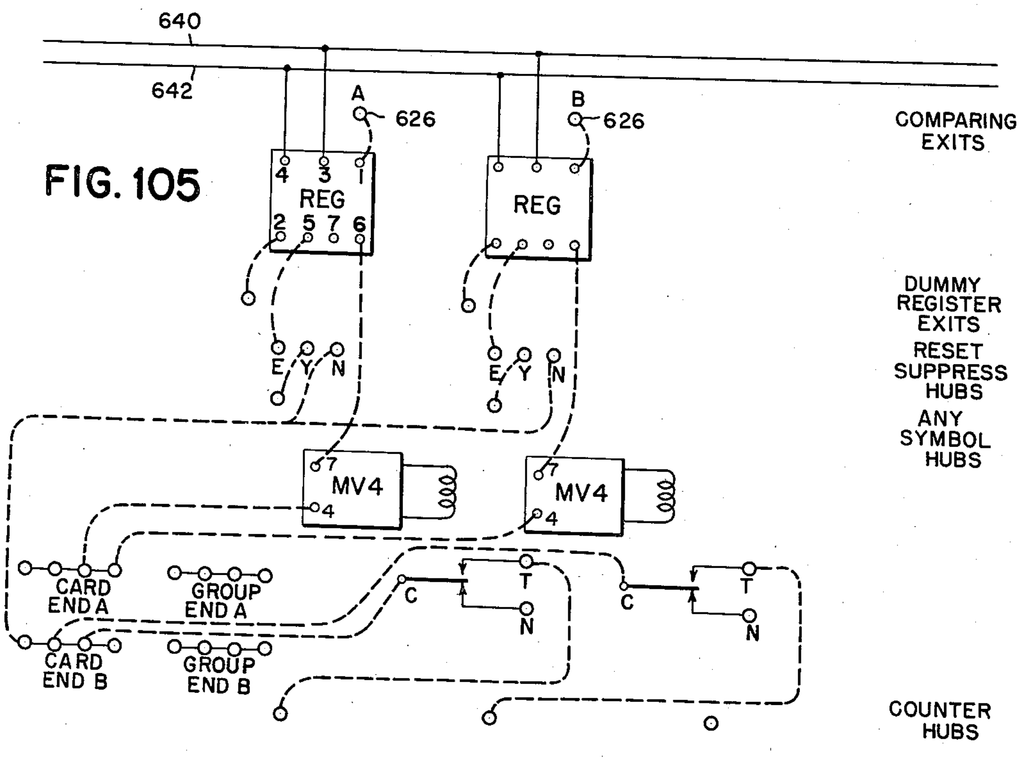

Referring to the FIG. 105, the problem is to count the number of cards in which the data A occurs and the number of cards in which the data B occurs. The logic terminals 1 of the A and B registers are connected to hubs 626 associated with columns of the question card that are punched A and B respectively. Each time data A or B is sensed the corresponding register that is conditioned from a Dummy Register exit is turned On. The register is held by Any Symbol pulses. The D.C. output from the terminal 6 is fed to a conditioning terminal 7 of a selector relay unit MV4. At the end of the card a Card End A pulse triggers the conditioned unit MV4 and a Card End B pulse is fed through a transfer point T to a counter hub. The Card End B hub also causes the register to be reset. In this manner a selected counter may be pulsed for each card that contains a desired bit of data, for example data A or data B.

It will be appreciated that even more complex search problems than the foregoing examples may be handled by the subject searching machine but that the solving of such problems is accomplished by combining the fundamental operations illustrated by the examples described in detail hereinbefore.

Single-card groups without group end symbols punched therein may be handled. In the handling of single-card groups, the Card End A and Card End B pulses are used in the same manner as the respective Group End A and Group End B pulses in the handling of multiple card groups.

It will be apparent that a single card containing the actuating data may be selected from a multiple card group by altering the plug wiring. The plug wire 734, shown in FIG. 27, may be removed so that the unit MV2 and the group magnet 284 will not be actuated. A selector relay unit MV4 may be conditioned by the actuated registers as in group selection and may be triggered by a Card End A pulse rather than a Group End A pulse. A Card End B pulse rather than a Group End B pulse through the actuated relay points may trigger the select magnet unit MV6 and will reset the actuated registers. In this manner only the card containing the actuating data will be selected. Whereas such selection is possible it is not expected to be generally desirable since it requires that the actuating data be located in a single card, and one of the great advantages of this machine is that data may be spread over a large number of cards and still be selected as though the group of cards was actually a single card.

While there have been shown and described and pointed out the fundamental novel features of the invention as applied to a preferred embodiment, it will be understood that various omissions and substitutions, and changes in the form and details of the device illustrated and in its operation may be made by those skilled in the art without departing from the spirit of the invention. It is the intention therefore, to be limited only as indicated by the scope of the following claims.

What is claimed is:

1. A record selecting machine comprising a photo-electric record scanning unit, a record selecting unit, means for successively feeding multiple column records through said scanning unit and then to said selecting unit, said scanning unit containing a source of light and a plurality of light responsive devices and being adapted for emitting discrete electrical impulses in response to the scanning of coded data on said records, a columnar comparing unit comprising plural columns of question data, operable by said electrical impulses and having means for comparing each column of said records simultaneously with all columns of said question data, means operable by said comparing unit for indicating when data in a scanned record matches data in said comparing unit, and means operable by said comparing unit for operating said selecting unit for selecting said matching record.

2. A record card selecting machine, comprising a photo-electric card scanning unit, a card selecting unit including a select hopper and a reject hopper, means for successively feeding multiple column record cards through said scanning unit and then to said selecting unit, said scanning unit comprising a source of light and a plurality of light responsive devices that emit electrical impulses when lighted through coded holes in said record cards, a columnar comparing unit comprising plural columns of question data, operable by said electrical impulses and having means for comparing each card column simultaneously with all columns of said question data, means operable by said comparing unit for indicating when data in a scanned record card matches data in said comparing unit, means operable by said comparing unit for actuating said selecting unit for depositing said non-matching record cards in said reject hopper, and for depositing matching cards in said select hopper.

3. A record card selecting machine comprising a photo-electric card scanning unit, a card selecting unit including a selected card pocket and a non-selected card pocket, means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, indicating means actuated by said comparing unit when data in a scanned record card matches any of said question data, and means included in said selecting unit and actuated by said indicating means for directing said matching record card to said selected card pocket and non-matching record cards to said non-selected card pocket.

4. A record card selecting machine comprising a photo-electric card scanning unit, a card selecting unit, means for successively feeding multiple column record cards through said scanning unit in a manner whereby scanning occurs column by column, and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of indicating means that are selectively actuated by said comparing unit when matching data are scanned in a record card, and means operable by said actuated indicating means for actuating said selecting unit for selecting said card containing said matching data.

5. A record card selecting machine comprising a photo-electric card scanning unit, a record card selecting unit, means for successively feeding multiple column record cards through said scanning unit in a manner whereby scanning occurs column by column, and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively, each with one of said columns of question data, for actuation when corresponding said columns of question data are matched by data in said multiple column cards, means for connecting selected ones of said registers in a group containing at least one register device wherein said grouped registers are serially connected, and where the actuation of each register within said group, after the first register, is dependent upon the prior actuation of the immediately preceding register, and means operable, in response to the actuation of the last register of said group, for actuating said selecting unit for selecting said cards that contain the data that effected the actuation of the registers in said group of registers.

6. A record card selecting machine comprising a photo-electric card scanning unit, a record card selecting unit, means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively, each with one of said columns of question data, for actuation when corresponding said columns of question data are matched by data in said cards, means for connecting selected ones of said registers in groups, each group containing at least one register, wherein the registers are serially connected and where the actuation of each register within a group, after the first register, is dependent upon the prior actuation of the immediate preceding register, and means operable, in response to the actuation of the last register of any one of said groups of registers alternatively, for actuating said selecting unit for selecting said cards that contain the data that caused the actuation of the registers within the actuated one of said groups of registers.

7. A record card selecting machine comprising a photo-electric card scanning unit, a record card selecting unit, means for successively feeding multiple column record cards through said scanning unit in a manner whereby scanning occurs column by column, and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively each with one of said columns of question data for actuation when corresponding said columns of question data are matched by data in said multiple column cards, means for operatively connecting selected ones of said registers in groups, each group containing at least one register, wherein the actuation of each register within said groups, after the first register, is dependent upon the prior actuation of the immediately preceding register, means operable for actuating said selecting unit, and means operable in response to the actuation of a selected number, not less than two, of said groups of registers for controlling last said operable means for selecting the cards containing the data that cause the actuation of all registers within said groups, when the actuating data are scanned conjunctively and in a selected sequence.

8. A record card selecting machine comprising a photo-electric card scanning unit a record card selecting unit, means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively each with one of said columns of question data for actuation when corresponding said columns of question data are matched by data in said multiple column cards, means for operatively connecting selected ones of said registers in groups, each group containing at least one register, wherein the actuation of each register within said groups, after the first register, is dependent upon the prior actuation of the immediately preceding register, means operable for actuating said selecting unit, and means operable in response to the actuation of a selected number, not less than two, of said groups of registers for controlling last said operable means for selecting the cards containing the data that cause the actuation of all registers within said groups, when the actuating data are scanned conjunctively and in any sequence.

9. A record card selecting machine comprising a photo-electric card scanning unit, a record card selecting unit means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively each with one of said columns of question data for actuation when corresponding said columns of question data are matched by data in said multiple column cards, means for operatively connecting selected ones of said registers in groups, each group containing at least one of said registers, wherein the actuation of each register within said groups, after the first register, is dependent upon the prior actuation of the immediately preceding register, means operable for actuating said selecting unit, and means operable in response to the actuation of a selected number not less than two, of said groups of registers for controlling last said operable means for selecting the cards containing the data that cause the actuation of all registers within said groups, when the actuating data are sensed non-conjunctively and in a selected sequence.

10. A record card selecting machine comprising a photo-electric card scanning unit, a record card selecting unit, means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses and having means for comparing each card column simultaneously with all columns of said question data, a plurality of registers, means for operatively connecting said registers selectively each with one of said columns of question data for actuation when corresponding said columns of question data are matched by data in said multiple column cards, means for operatively connecting selected ones of said registers in groups, each group containing at least one of said registers, wherein the actuation of each register within said groups, after the first register, is dependent upon the prior actuation of the immediately preceding register, means operable for actuating said selecting unit, and means operable in response to the actuation of a selected number, not less than two, of said groups of registers for controlling said last operable means for selecting the cards containing the data that cause the actuation of all registers within said groups, when the actuating data are sensed non-conjunctively and in any sequence.

11. A record card selecting machine comprising a photo-electric card scanning unit, a record card selecting unit, means for successively feeding multiple column record cards through said scanning unit in a manner whereby scanning occurs column by column and then to said selecting unit, said scanning unit comprising a source of light and a plurality of light responsive devices that emit electrical impulses when lighted through coded holes in said record cards, a columnar comparing unit comprising plural columns of question data, operable by said electrical impulses, and having means for comparing each card column simultaneously with all columns of said question data, a plurality of registers, means for operatively connecting said registers selectively each with one of said columns of question data for actuation when corresponding said columns of question data are matched by data in said multiple column cards, means for operatively connecting selected ones of said registers to form a plurality of groups of said registers, each group containing at least one of said registers, wherein the actuation of each register within said groups, after the first register, is dependent upon the prior actuation of the immediately preceding register, means operable for actuating said card selecting unit, and means operable in response to the actuation of any selected number of said groups of registers for controlling last said operable means for selecting the cards containing the data that cause the actuation of all registers within all of said selected groups.

12. A record card selecting machine comprising a photo-electric scanning unit, means for feeding groups of multiple column cards in a card by card manner through said scanning unit, each of said groups containing at least one card, whereby scanning of each card occurs in a column by column manner, said scanning unit comprising a source of light and a plurality of light responsive devices that emit electrical impulses when lighted through coded holes in said record cards, a columnar comparing unit comprising plural columns of question data, operable by said electrical impulses, and containing means for comparing each card column simultaneously with all columns of said question data, a plurality of registers, means for operatively connecting said registers selectively each with one of said columns of question data for actuation when corresponding said columns of question data are matched by data in said cards, means for operatively connecting selected ones of said registers in a group containing at least one register, where the actuation of each register within said group, after the first register, is dependent upon the prior actuation of the immediately preceding register, means for receiving said cards after they pass through said scanning unit and for temporarily storing said cards in transit, means adjacent said transit storage means operable for removing said cards therefrom, means operable selectively for disabling said card removing means, other means adjacent said transit storage means operative to remove therefrom all cards not removed by first said removing means, and means operable in response to the actuation of the last register of said group of registers for actuating said disabling means whereby the group of cards containing the actuating data is removed from said transit storage means by said other removing means.

13. An interrogation device comprising a group of resistor elements arranged in rows, the resistor elements of each row being common connected at one end, a group of contact elements arranged in rows disposed at right angles relative to said rows of resistor elements and in corresponding space relationship with said resistor elements, the contact elements of each row being common connected, and each said contact elements corresponding to a related one of said resistor elements a plurality of code element input lines each of said input lines being connected to a different one of the common connections of one of said groups, a plurality of character output lines each of said output lines being connected to a different one of the common connections of the other of said groups, means operable for pulsing said input lines in accordance with a predetermined code, a code plate positioned between said resistor elements and said contact elements having an array of index points corresponding in space relationship to said resistor and contact elements and operative to complete circuits therebetween at selected index points whereby said coded pulsing of said code element input lines effects the pulsing of said character output lines in accordance with the pulsing of the said code element input lines and the coding of said code plate.

14. A data comparing device comprising an interrogation unit, a plurality of input lines to said unit, a plurality of output lines from said unit, said unit comprising a resistor sub-unit having a plurality of rows of resistor elements each of said rows being connected with a different one of said input lines, a contact sub-unit having a plurality of columns of contact elements each of said columns being connected with a different one of said output lines, there being a contact element in each column corresponding to a resistor element in each of said rows, said interrogation unit being adapted for receiving between said resistor elements and said contact elements an interrogation record having an array of index points corresponding in space relationship to said resistor and contact elements, said interrogation record being marked at certain of said index points to provide connection between corresponding resistor and contact elements in accordance with a fixed number element code, and means for pulsing said input lines in accordance with said fixed number element code whereby said output lines are pulsed in accordance with the pulsing of said input lines and the marking of said interrogation record.

15. A rotatable contact storage drum comprising a common contact ring, a contact brush for wiping said common contact ring, a plurality of pairs of contacts, evenly spaced along the surface of said storage drum, means for connecting said pairs of contacts, a contact brush for successively wiping said contact connecting means, means for grouping said pairs of contacts, said means comprising means for actuating one contact of said pairs of contacts to make electrical contact with said connecting means of the next adjacent pairs of contacts, and means for suppressing the actuation of said one contacts on the last contact pairs of said groups, means selectively operable for actuating one of the other contacts of said pairs of contacts in said groups for contacting said common contact ring whereby circuits are completed from said common ring contact brush through said common ring, through the actuated one of said other contacts, and successively through said contact connecting means and said one contacts to the contact connecting means under said connecting means contact brush and out said connecting means contact brush, and means for opening said one contacts and said other contacts after said circuits are completed.

16. A rotatable contact storage drum comprising, in combination, a common bar, a plurality of first switching elements actuatable selectively for connection with said common bar in parallel relationship with one another, a plurality of second switching elements actuatable selectively for connection in series relationship with one another, circuit means connecting each of said first switch elements with a corresponding one of said second switching elements to form pairs of switching elements evenly spaced along the surface of said storage drum, means operable selectively for producing grouping signals, means operable by said grouping signals for actuating said second switching elements for connecting said second switching elements serially in groups, means operable selectively for producing group select signals, means operable by said group select signals for actuating said first switching elements for connecting said first switching elements with said common bar, and means operable for contacting said second switching elements successively whereby circuits are successively completed from said common bar, through an actuated one of said first switching elements, through said circuit means connected to said actuated first switching element and through said serially connected second switching elements to said contacting means.

17. A card handling device comprising means for transporting cards in a predetermined path, a stacker drum positioned adjacent said path, and rotatable tangentially to said card transporting means, said drum comprising a plurality of circumferentially disposed picker elements, each element operable normally at said tangent point for removing a card from said card transporting means, means selectively operable for suppressing said normal removal of cards from said transporting means, said suppressing means comprising means for disabling said picker elements as they arrive at said tangent point and means for enabling said disabled picker elements before arrival again at said tangent point.

18. In a card handling device, in combination circulating card transporting means, means operable for inserting cards in said card transporting means in a direction transversely of the direction of movement of said card transporting means, means positioned adjacent said card transporting means and selectively operable for removing cards from said card transporting means, said card removing means comprising a plurality of pairs of card gripper elements each pair being actuable for selectively gripping and removing a card from said card transporting means and means for selectively actuating said pairs of gripper elements.

19. In a card handling device, in combination, circulating card transit storage means, means operable for inserting cards in said card transit storage means in a direction transversely of the direction of movement of said card transit storage means, and means positioned adjacent said card transit storage means for removing therefrom all cards arriving at said card removing means, said latter means comprising a pair of counter rotating units, one of said units carrying a plurality of card pusher elements adapted for pushing cards from said card transit storage means, and the other of said units carrying a plurality of card support elements adapted for supporting said cards as they are being pushed from said card transit storage means, said pair of counter rotating units being adapted for dropping each of said cards at a predetermined point after it has been completely removed from said card transit storage means.

20. A record selecting machine comprising a photoelectric record scanning unit, means for feeding groups of records having coded sequential numbers through said unit, said unit containing a source of light and a plurality of light responsive devices and being adapted for emitting electrical impulses in response to the scanning of said coded numbers on said records, transit storage means operable for receiving said records from said feeding means, means adjacent said transit storage means operable for selecting said groups of records thereon, and means operable by said electrical impulses for detecting a discontinuity in said sequential numbers within said groups and for actuating said selecting means to select said discontinuous groups of records.

21. The invention set forth in claim 20 wherein said means for detecting a discontinuity in said sequential numbers comprises a plurality of sequential registers corresponding respectively each to a coded sequential number on said groups of records, means conditioning the first of said registers, means operable by actuation of the immediately preceding one of said sequential registers for conditioning each of said registers after the first one, and means responsive to said electrical impulses corresponding to the sensing of sequential numbers for triggering successive ones of said sequential registers when said sequential registers are conditioned.

22. In an article handling machine in combination, means for feeding articles serially past a sensing station and then past a selection station, means at said sensing station operable for sensing indicia in said articles, means at said selecting station operable by said sensing means for selecting articles marked with particular indicia patterns, article detecting means positioned adjacent said feeding means and subsequent to said selecting station operable for detecting selected articles, and means operable jointly by said sensing means and said article detecting means for indicating whether all articles bearing said particular indicia patterns and only such articles are selected.

23. In an article handling machine in combination, means operable for sensing indicia in said articles, means operable by said sensing means for selecting articles marked with particular indicia patterns, means operable for feeding articles serially past said sensing means and then on to said selecting means, checking means cooperating with said selecting means for indicating whether all articles having said indicia patterns and only such articles are selected, said checking means comprising a normally balanced bridge circuit, means operable for periodically shifting said bridge circuit to another balanced condition, means for supplying a signal from said selecting means to said bridge circuit for each article that should be selected, said signal unbalancing said bridge circuit in one direction, article detecting means adjacent said feeding means, for detecting articles which are selected, said detecting means supplying a signal for each article that is selected, for unbalancing said bridge circuit in another direction, said unbalancing signals occurring no earlier than said periodically shifting means, the coincidence of said unbalancing signals being effective to nullify the effect of said periodically shifting means whereby said bridge circuit remains in first said balanced condition, indicating means operable in response to first said unbalanced condition of said bridge circuit for indicating an erroneous nonselection of one of said articles, and indicating means operable in response to second said unbalanced condition of said bridge circuit for indicating the erroneous selection of one of said articles.

24. An interrogation device comprising a group of impedance elements arranged in rows, the impedance elements of each row being common connected at one end, a group of contact elements arranged in rows disposed at right angles relative to said rows of impedance elements and in corresponding space relationship with said impedance elements, the contact elements of each row being common connected, and each said contact elements corresponding to a related one of said impedance elements, a plurality of code element input lines each of said input lines being connected to a different one of the common connections of one of said groups, a plurality of character output lines each of said output lines being connected to a different one of the common connections of the other of said groups, means operable for pulsing said input lines in accordance with a predetermined code, a code plate positioned between said impedance elements and said contact elements having an array of index points correpsonding in space relationship to said impedance and contact elements, and operative to complete circuits therebetween at selected index points whereby said coded pulsing of said code element input lines effects the pulsing of said character output lines in accordance with the pulsing of the said code element input lines and the coding of said code plate.

25. A data comparing device comprising an interrogation unit, a plurality of input lines to said unit, a plurality of output lines from said unit, said unit comprising an impedance sub-unit having a plurality of rows of impedance elements each of said rows being connected with a different one of said input lines, a contact sub-unit having a plurality of columns of contact elements each of said columns being connected with a different one of said output lines, there being a contact element in each column corresponding to an impedance element in each of said rows, said interrogation unit being adapted for receiving between said impedance elements and said contact elements an interrogation record having an array of index points corresponding in space relationship to said resistor and contact elements, said interrogation record being marked at certain of said index points to provide connection between corresponding resistor and contact elements in accordance with a fixed number element code, and means for pulsing said input lines in accordance with said fixed number element code whereby said output lines are pulsed in accordance with the pulsing of said input lines and the marking of said interrogation record.

26. In a machine for selecting groups of data bearing multicolumn record cards, said groups containing at least one record card each, scanning means for sensing the data designations on said groups of record cards and emitting coded output signals in response to the sensing of the data on said record cards, means for feeding said groups of record cards through said scanning means in a card by card, column by column manner, a columnar comparing unit operable by said output signals comprising plural columns of question data, and containing means for comparing each card column simultaneously with all columns of said question data, a plurality of storage means, means for operatively connecting said storage means selectively each with one of said columns of question data of actuation when corresponding said columns of question data are matched by data in said cards, means for operatively grouping selected ones of said storage means, said group containing at least one storage means, means responsive to the actuation of each storage means in the group to condition the next following storage means of the group to be actuated by said comparing unit, transit means for receiving said cards after they pass through said scanning means and for temporarily storing said cards in transit, card selecting means adjacent said transit storage means and means operable in response to the actuation of the last storage means of a said group of storage means for actuating said selecting means to select the group of cards containing the data for actuating said selecting means.

27. In a machine for selecting groups of data bearing multicolumn record cards, said groups containing at least one record card each, scanning means for sensing the data designations on said groups of record cards, said scanning means emitting coded output signals when corresponding data is sensed on said record cards, means for feeding said groups of record cards through said scanning means in a card by card, column by column manner, means for setting up multiposition coded question data, means for comparing said coded output signals with coded data in the positions of said setup means, a plurality of output means from said comparing means respectively associated with positions of said setup means, a plurality of storage means selectively connected with said output means, said output means supplying set pulses to said storage means on a successful comparison between coded output signals and coded data in the associated position of said setup means, means for operatively grouping selected ones of said storage means, said group containing at least one storage means, means responsive to the actuation of each storage means in the group to condition the next following storage means of the group to be actuated by said comparing unit, transit means for receiving said cards after they pass through said scanning means and for temporarily storing said cards in transit, card selecting means adjacent said transit storage means and means operable in response to the actuation of the last storage means of a said group of storage means for actuating said selecting means to select the group of cards containing the data for actuating said selecting means.

28. In a machine for selecting groups of data-bearing multiposition records, said groups containing at least one record each, means for scanning the data on said groups of records in a record-by-record, position-by-position manner, means for setting up multiposition question data, means for comparing said scanned data with data in the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively grouping selected ones of said storage means to yield an output signal when all said storage means in a group have been set, record selecting means, means operable for feeding successive record cards past said scanning means, transit means for receiving said records after they pass through said scanning means and for temporarily storing said records in transit and means responsive to said output signal for actuating said selecting means to select from said transit means the group of records containing the successfully compared scanned data.

29. In a machine for selecting groups of data-bearing multiposition records, said groups containing at least one record each, means for scanning the data on said groups of records in a record-by-record, position-by-position manner, means for setting up multiposition question data, means for comparing said scanned data with data in any of the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively grouping selected ones of said storage means to yield an output signal when all said storage means in a group have been set, record selecting means, means operable for feeding successive record cards past said scanning means and then to said selecting means, and means responsive to said output signal for activating said selecting means to select the group of records containing the successfully compared scanned data.

30. In a machine for selecting groups of data-bearing multiposition records, said groups containing at least one record each, means for scanning the data on said groups of records in a record-by-record, position-by-position manner, means for setting up multiposition question data, means for comparing said scanned data with data in any of the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups to yield an output signal when all said storage means in a given group have been set, record selecting means, means operable for feeding successive record cards past said scanning means and then to said selecting means, and means responsive selectively to said output signals from a predetermined number of said groups of storage means, said predetermined number being at least one for activating said selecting means to select the group of records containing the data for actuating said selected groups of storage means.

31. The invention set forth in claim 30 having means operable in response to the actuation of at least one selected group of said groups of registers whereby the selection of said group of cards is inhibited.

32. In a machine for selecting groups of data-bearing multiposition records, said groups containing at least one record each, means for scanning the data on said groups of records in a record-by-record, position-by-position manner, means for setting up multiposition question data, means for comparing said scanned data with data in any of the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups to yield an output signal when all said storage means in a given group have been set, record selecting means, means operable for feeding successive record cards past said scanning means and then to said selecting means, and means operable in response to output signal of any one of a selected plurality of said groups of storage means alternatively for activating said selecting means to select the group of records containing the data for actuating said alternatively set group of storage means.

33. In a machine for selecting groups of data-bearing multiposition records, said groups containing at least one record each, means for scanning the data on said groups of records in a record-by-record, position-by-position manner, means for setting up multiposition question data, means for comparing said scanned data with data in any of the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups to yield an output signal when all said storage means in a given group have been set, record selecting means, means operable for feeding successive record cards past said scanning means and then to said selecting means, and means operable in response to output signals from any N of M selected groups of storage means, where M is a number at least as great as N but not greater than the total number of storage means groups, for activating said selecting means to select the group of records containing the data for activating said N storage means.

34. In a machine for selecting groups of data-bearing multiposition records, said groups containing at least one record each, means for scanning the data on said groups of records in a record-by-record, position-by-position manner, means for setting up multiposition question data, means for comparing said scanned data with data in the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups, means responsive to the setting of a given storage means in a group for conditioning the next succeeding storage means in said group, means for subsequently tending to reset all of said storage means, means for suppressing the resetting of a given storage means in a group in response to the setting of the adjacent succeeding storage means in said group, said group of storage means yielding an output signal on the setting of the last storage means of said group, record selecting means, means operable for feeding successive records past said scanning means and then to said selecting means, and means operable in response to output signals from a predetermined number of said groups of storage means for actuating said selecting means to select a group of records containing data matching said question data in selected sequence and conjunctively.

35. In a machine for selecting groups of data-bearing multiposition records, said groups containing at least one record each, means for scanning the data on said groups of records in a record-by-record, position-by-position manner, means for setting up multiposition question data, means for comparing said scanned data with data in the positions of said setup means, a plurality of output means from said comparing means respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups, means responsive to the setting of a given storage means in a group for conditioning the next succeeding storage means in said group, said group of storage means yielding an output signal on the setting of the last storage means of said group, record selecting means, means operable for feeding successive records past said scanning means and then to said selecting means, and means operable in response to output signals from a predetermined number of said groups of storage means for activating said selecting means to select a group of records containing data matching said question data in selected sequence.

36. In a machine for selecting groups of data-bearing multiposition records, said groups containing at least one record each, means for scanning the data on said groups of records in a record-by-record, position-by-position manner, means for setting up multiposition question data, means for comparing said scanned data with data in the positions of said setup means, a plurality of output means from said comparing means, respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups, each group comprising sub-groups consisting, respectively, of a plurality of primary storage means and a plurality of intermediate storage means, means responsive to the setting of any one of said primary storage means in a given one of said groups for setting one of said intermediate storage means in said group, means responsive to the setting of said last mentioned intermediate storage means for conditioning a succeeding one of said intermediate storage means in said group, means responsive to the setting of another one of said primary storage means for setting said succeeding intermediate storage means, means responsive to the setting of the last of said intermediate storage means of said group of storage means for emitting an output pulse, means for subsequently tending to reset all of said storage means, means responsive to the setting of one of said primary storage means for suppressing the resetting of said storage means, record selecting means, means operable for feeding successive records past said scanning means and then to said selecting means, and means operable in response to output signals from a predetermined number of said groups of storage means for actuating said selecting means to select a group of records containing data matching said question data in any sequence and conjunctively.

37. In a machine for selecting groups of data-bearing multiposition records, said groups containing at least one record each, means for scanning the data on said groups of records in a record-by-record, position-by-position manner, means for setting up multiposition question data, means for comparing said scanned data with data in the positions of said setup means, a plurality of output means from said comparing means, respectively associated with positions of said setup means, a plurality of storage means selectively connected with said output means, said output means supplying set pulses to said storage means on a successful comparison between said scanned data and the associated position of said setup means, means for operatively connecting selected ones of said storage means in groups, each group comprising sub-groups consisting, respectively, of a plurality of primary storage means and a plurality of intermediate storage means, means responsive to the setting of any one of said primary storage means in a given one of said groups for setting one of said intermediate storage means in said group, means responsive to the setting of said last mentioned intermediate storage means for conditioning a succeeding one of said intermediate storage means in said group, means responsive to the setting of another one of said primary storage means for setting said succeeding intermediate storage means, means responsive to the setting of the last of said intermediate storage means of said group of storage means for emitting an output pulse, record selecting means, means operable for feeding successive records past said scanning means and then to said selecting means, and means operable in response to output signals from a predetermined number of said groups of storage means for actuating said selecting means to select a group of records containing data matching said question data in any sequence.

38. In an article handling machine in combination, means operable for sensing indicia in said articles, means operable by said sensing means for selecting articles marked with particular indicia patterns, means operable for feeding articles serially past said sensing means and then on to said selecting means, checking means cooperating with said selecting means for indicating whether all articles having said indicia patterns and only such articles are selected, said checking means comprising a normally balanced bridge circuit, means operable for periodically shifting said bridge circuit to another balanced condition, means for supplying a signal from said selecting means operable for each article that should be selected for suppressing the shifting of one leg of said bridge circuit so as to unbalance said bridge circuit in one direction, article detecting means adjacent said feeding means for detecting articles which are selected, said detecting means supplying a signal for each article that is selected for suppressing the shifting of another leg of said bridge circuit so as to unbalance said bridge circuit in another direction, said suppressing signals occurring no earlier than said periodically shifting means, the coincidence of said suppressing signals being effective to nullify the effect of said periodically shifting means whereby said bridge circuit remains in first said balanced condition, indicating means operable in response to first said unbalanced condition of said bridge circuit for indicating an erroneous non-selection of one of said articles, and indicating means operable in response to second said unbalanced condition of said bridge circuit for indicating the erroneous selection of one of said articles.

References Cited in the file of this patent

UNITED STATES PATENTS

| | | |
|---|---|---|
| 1,656,999 | Bull | Jan. 24, 1928 |
| 2,286,812 | Keefe | June 16, 1942 |
| 2,369,794 | Phinney et al. | Feb. 20, 1945 |
| 2,448,830 | Robbins et al. | Sept. 7, 1948 |
| 2,539,998 | Holland-Martin et al. | Jan. 30, 1951 |
| 2,602,544 | Phelps et al. | July 8, 1952 |
| 2,693,277 | Wagner et al. | Nov. 2, 1954 |
| 2,730,233 | Coleman et al. | Jan. 10, 1956 |
| 2,732,896 | Lundahl | Jan. 31, 1956 |
| 2,738,874 | Wilson | Mar. 20, 1956 |
| 2,749,484 | Levitt | June 5, 1956 |
| 2,749,533 | Daniels | June 5, 1956 |
| 2,795,328 | Tyler et al. | June 11, 1957 |
| 2,804,974 | Noon | Sept. 3, 1957 |

FOREIGN PATENTS

| | | |
|---|---|---|
| 430,393 | Great Britain | June 18, 1935 |

UNITED STATES PATENT OFFICE
CERTIFICATION OF CORRECTION

Patent No. 2,994,429 August 1, 1961

Hans P. Luhn et al.

It is hereby certified that error appears in the above numbered patent requiring correction and that the said Letters Patent should read as corrected below.

Column 3, line 61, for "eschematic" read -- schematic --; column 5, line 54, for "forerly" read -- formerly --; column 13, line 12, for "432" read -- 532 --; column 17, line 29, after "be" insert -- given to facilitate the overall description hereinafter. --; column 21, line 46, for "tide" read -- tied --; column 23, line 25, for "hight-hand" read -- right-hand --; line 44, for "results" read -- result --; column 24, lines 21, and 22, for "responce" read -- response --; column 35, line 30, for "signal" read -- sign --; column 36, line 27, for "linto" read -- into --; column 40, line 40, for "cathods" read -- cathode --; column 49, line 30, for "clumn" read -- column --; line 40, for "lin e604-B" read -- line 604-B --; column 50, line 21, for "time" read -- times --; column 61, line 40, for "said last" read -- last said --; column 65, line 29, for "correpsonding" read -- corresponding --; line 72, for "of" read -- for --.

Signed and sealed this 10th day of April 1962.

(SEAL)
Attest:

ERNEST W. SWIDER
Attesting Officer

DAVID L. LADD
Commissioner of Patents